US009579789B2

(12) United States Patent
Passot et al.

(10) Patent No.: US 9,579,789 B2
(45) Date of Patent: Feb. 28, 2017

(54) APPARATUS AND METHODS FOR TRAINING OF ROBOTIC CONTROL ARBITRATION

(71) Applicant: BRAIN CORPORATION, San Diego, CA (US)

(72) Inventors: Jean-Baptiste Passot, La Jolla, CA (US); Patryk Laurent, San Diego, CA (US); Eugene Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 88 days.

(21) Appl. No.: 14/040,520

(22) Filed: Sep. 27, 2013

(65) Prior Publication Data

US 2015/0094850 A1    Apr. 2, 2015

(51) Int. Cl.
*B25J 9/16*    (2006.01)
*G06N 3/00*    (2006.01)
*G06N 3/04*    (2006.01)

(52) U.S. Cl.
CPC .............. *B25J 9/163* (2013.01); *G06N 3/008* (2013.01); *G06N 3/049* (2013.01);
(Continued)

(58) Field of Classification Search
CPC ....................... G06F 15/18; G05B 2219/40499
See application file for complete search history.

(56) References Cited

U.S. PATENT DOCUMENTS 3,920,972 A    11/1975  Corwin, Jr. et al.
4,468,617 A    8/1984   Ringwall
(Continued)

FOREIGN PATENT DOCUMENTS

CN    102226740    10/2011
EP    2384863 A2   11/2011
(Continued)

OTHER PUBLICATIONS

PCT International Search Report and Written Opinion for PCT/US14/48512 dated Jan. 23, 2015, pp. 1-14.
(Continued)

*Primary Examiner* — Khoi Tran
*Assistant Examiner* — Ryan Rink
(74) *Attorney, Agent, or Firm* — Gazdzinski & Associates, PC

(57) ABSTRACT

Apparatus and methods for arbitration of control signals for robotic devices. A robotic device may comprise an adaptive controller comprising a plurality of predictors configured to provide multiple predicted control signals based on one or more of the teaching input, sensory input, and/or performance. The predicted control signals may be configured to cause two or more actions that may be in conflict with one another and/or utilize a shared resource. An arbitrator may be employed to select one of the actions. The selection process may utilize a WTA, reinforcement, and/or supervisory mechanisms in order to inhibit one or more predicted signals. The arbitrator output may comprise target state information that may be provided to the predictor block. Prior to arbitration, the predicted control signals may be combined with inputs provided by an external control entity in order to reduce learning time.

20 Claims, 17 Drawing Sheets

(52) U.S. Cl.
CPC .............. *G05B 2219/39271* (2013.01); *G05B 2219/39307* (2013.01); *G05B 2219/40499* (2013.01); *Y10S 901/03* (2013.01)

(56) References Cited

U.S. PATENT DOCUMENTS

| | | | |
|---|---|---|---|
| 4,617,502 A | 10/1986 | Sakaue et al. | |
| 4,638,445 A | 1/1987 | Mattaboni | |
| 4,706,204 A | 11/1987 | Hattori | |
| 4,763,276 A | 8/1988 | Perreirra et al. | |
| 4,852,018 A | 7/1989 | Grossberg | |
| 5,063,603 A | 11/1991 | Burt | |
| 5,092,343 A | 3/1992 | Spitzer | |
| 5,121,497 A | 6/1992 | Kerr et al. | |
| 5,245,672 A | 9/1993 | Wilson | |
| 5,303,384 A | 4/1994 | Rodriguez et al. | |
| 5,355,435 A | 10/1994 | DeYong | |
| 5,388,186 A | 2/1995 | Bose | |
| 5,408,588 A | 4/1995 | Ulug | |
| 5,467,428 A | 11/1995 | Ulug | |
| 5,579,440 A | 11/1996 | Brown | |
| 5,602,761 A | 2/1997 | Spoerre et al. | |
| 5,612,883 A | 3/1997 | Shaffer et al. | |
| 5,638,359 A | 6/1997 | Peltola | |
| 5,673,367 A | 9/1997 | Buckley | |
| 5,687,294 A | 11/1997 | Jeong | |
| 5,719,480 A | 2/1998 | Bock | |
| 5,739,811 A | 4/1998 | Rosenberg et al. | |
| 5,841,959 A | 11/1998 | Guiremand | |
| 5,875,108 A | 2/1999 | Hoffberg | |
| 5,994,864 A | 11/1999 | Inoue et al. | |
| 6,009,418 A | 12/1999 | Cooper | |
| 6,014,653 A | 1/2000 | Thaler | |
| 6,169,981 B1 | 1/2001 | Werbos | |
| 6,218,802 B1 | 4/2001 | Onoue et al. | |
| 6,259,988 B1 | 7/2001 | Galkowski et al. | |
| 6,272,479 B1 | 8/2001 | Farry et al. | |
| 6,363,369 B1 | 3/2002 | Liaw | |
| 6,366,293 B1 | 4/2002 | Hamilton | |
| 6,442,451 B1 | 8/2002 | Lapham | |
| 6,458,157 B1 | 10/2002 | Suaning | |
| 6,489,741 B1 | 12/2002 | Genov | |
| 6,493,686 B1* | 12/2002 | Francone et al. .............. 706/12 |
| 6,545,705 B1 | 4/2003 | Sigel | |
| 6,545,708 B1 | 4/2003 | Tamayama et al. | |
| 6,546,291 B2 | 4/2003 | Merfeld | |
| 6,581,046 B1 | 6/2003 | Ahissar | |
| 6,601,049 B1 | 7/2003 | Cooper | |
| 6,636,781 B1 | 10/2003 | Shen | |
| 6,643,627 B2 | 11/2003 | Liaw | |
| 6,697,711 B2 | 2/2004 | Yokono | |
| 6,703,550 B2 | 3/2004 | Chu | |
| 6,760,645 B2 | 7/2004 | Kaplan et al. | |
| 6,961,060 B1 | 11/2005 | Mochizuki et al. | |
| 7,002,585 B1 | 2/2006 | Watanabe | |
| 7,024,276 B2 | 4/2006 | Ito | |
| 7,243,334 B1 | 7/2007 | Berger et al. | |
| 7,324,870 B2 | 1/2008 | Lee | |
| 7,342,589 B2 | 3/2008 | Miserocchi | |
| 7,398,259 B2* | 7/2008 | Nugent .............. 706/33 |
| 7,426,501 B2 | 9/2008 | Nugent | |
| 7,426,920 B1 | 9/2008 | Nugent | |
| 7,668,605 B2 | 2/2010 | Braun | |
| 7,672,920 B2 | 3/2010 | Ito | |
| 7,752,544 B2 | 7/2010 | Cheng | |
| 7,849,030 B2 | 12/2010 | Ellingsworth | |
| 8,015,130 B2 | 9/2011 | Matsugu | |
| 8,145,355 B2 | 3/2012 | Danko | |
| 8,214,062 B2* | 7/2012 | Eguchi et al. .............. 700/30 |
| 8,271,134 B2 | 9/2012 | Kato et al. | |
| 8,315,305 B2 | 11/2012 | Petre | |
| 8,364,314 B2 | 1/2013 | Abdallah et al. | |
| 8,380,652 B1 | 2/2013 | Francis, Jr. | |
| 8,419,804 B2 | 4/2013 | Herr et al. | |
| 8,452,448 B2 | 5/2013 | Pack et al. | |
| 8,467,623 B2 | 6/2013 | Izhikevich | |
| 8,509,951 B2 | 8/2013 | Gienger | |
| 8,571,706 B2 | 10/2013 | Zhang et al. | |
| 8,639,644 B1 | 1/2014 | Hickman et al. | |
| 8,655,815 B2 | 2/2014 | Palmer et al. | |
| 8,751,042 B2 | 6/2014 | Lee | |
| 8,793,205 B1 | 7/2014 | Fisher | |
| 8,924,021 B2 | 12/2014 | Dariush et al. | |
| 8,958,912 B2 | 2/2015 | Blumberg et al. | |
| 8,972,315 B2 | 3/2015 | Szatmary et al. | |
| 8,990,133 B1 | 3/2015 | Ponulak et al. | |
| 9,008,840 B1 | 4/2015 | Ponulak et al. | |
| 9,015,092 B2 | 4/2015 | Sinyavskiy et al. | |
| 9,015,093 B1 | 4/2015 | Commons | |
| 9,047,568 B1 | 6/2015 | Fisher et al. | |
| 9,056,396 B1 | 6/2015 | Linnell | |
| 9,070,039 B2 | 6/2015 | Richert | |
| 9,082,079 B1 | 7/2015 | Coenen | |
| 9,104,186 B2 | 8/2015 | Sinyavskiy et al. | |
| 9,144,907 B2 | 9/2015 | Summer et al. | |
| 9,177,245 B2 | 11/2015 | Richert et al. | |
| 9,186,793 B1 | 11/2015 | Meier | |
| 9,189,730 B1 | 11/2015 | Coenen et al. | |
| 9,193,075 B1 | 11/2015 | Cipollini et al. | |
| 9,195,934 B1 | 11/2015 | Hunt et al. | |
| 9,213,937 B2 | 12/2015 | Ponulak | |
| 9,242,372 B2 | 1/2016 | Laurent et al. | |
| 2001/0045809 A1 | 11/2001 | Mukai | |
| 2002/0038294 A1 | 3/2002 | Matsugu | |
| 2002/0103576 A1 | 8/2002 | Takamura et al. | |
| 2002/0158599 A1* | 10/2002 | Fujita et al. .............. 318/568.11 |
| 2002/0169733 A1 | 11/2002 | Peters | |
| 2002/0175894 A1 | 11/2002 | Grillo | |
| 2002/0198854 A1* | 12/2002 | Berenji et al. .............. 706/12 |
| 2003/0023347 A1 | 1/2003 | Konno | |
| 2003/0050903 A1 | 3/2003 | Liaw | |
| 2003/0108415 A1 | 6/2003 | Hosek et al. | |
| 2003/0144764 A1 | 7/2003 | Yokono et al. | |
| 2003/0220714 A1 | 11/2003 | Nakamura et al. | |
| 2004/0030449 A1 | 2/2004 | Solomon | |
| 2004/0036437 A1 | 2/2004 | Ito | |
| 2004/0051493 A1 | 3/2004 | Furuta | |
| 2004/0128028 A1 | 7/2004 | Miyamoto et al. | |
| 2004/0131998 A1 | 7/2004 | Marom et al. | |
| 2004/0136439 A1 | 7/2004 | Dewberry | |
| 2004/0158358 A1 | 8/2004 | Anezaki et al. | |
| 2004/0162638 A1 | 8/2004 | Solomon | |
| 2004/0167641 A1 | 8/2004 | Kawai et al. | |
| 2004/0172168 A1 | 9/2004 | Watanabe et al. | |
| 2004/0193670 A1 | 9/2004 | Langan | |
| 2004/0267404 A1 | 12/2004 | Danko | |
| 2005/0004710 A1 | 1/2005 | Shimomura | |
| 2005/0008227 A1 | 1/2005 | Duan et al. | |
| 2005/0015351 A1 | 1/2005 | Nugent | |
| 2005/0036649 A1 | 2/2005 | Yokono | |
| 2005/0049749 A1 | 3/2005 | Watanabe et al. | |
| 2005/0065651 A1 | 3/2005 | Ayers | |
| 2005/0069207 A1 | 3/2005 | Zakrzewski et al. | |
| 2005/0113973 A1 | 5/2005 | Endo et al. | |
| 2005/0119791 A1 | 6/2005 | Nagashima | |
| 2005/0125099 A1 | 6/2005 | Mikami et al. | |
| 2005/0283450 A1* | 12/2005 | Matsugu et al. .............. 706/20 |
| 2006/0069448 A1 | 3/2006 | Yasui | |
| 2006/0082340 A1 | 4/2006 | Watanabe et al. | |
| 2006/0094001 A1 | 5/2006 | Torre | |
| 2006/0129277 A1 | 6/2006 | Wu et al. | |
| 2006/0129506 A1* | 6/2006 | Edelman et al. .............. 706/12 |
| 2006/0149489 A1 | 7/2006 | Joublin et al. | |
| 2006/0161218 A1 | 7/2006 | Danilov | |
| 2006/0161300 A1 | 7/2006 | Gonzalez-Banos et al. | |
| 2006/0167530 A1 | 7/2006 | Flaherty et al. | |
| 2006/0181236 A1 | 8/2006 | Brogardh et al. | |
| 2006/0189900 A1 | 8/2006 | Flaherty et al. | |
| 2006/0207419 A1 | 9/2006 | Okazaki et al. | |
| 2006/0250101 A1 | 11/2006 | Khatib et al. | |
| 2007/0022068 A1 | 1/2007 | Linsker | |
| 2007/0074177 A1 | 3/2007 | Kurita et al. | |
| 2007/0100780 A1* | 5/2007 | Fleischer et al. .............. 706/15 |
| 2007/0112700 A1 | 5/2007 | Den Haan et al. | |

(56) References Cited

U.S. PATENT DOCUMENTS

| | | |
|---|---|---|
| 2007/0151389 A1 | 7/2007 | Prisco et al. |
| 2007/0176643 A1 | 8/2007 | Nugent |
| 2007/0200525 A1 | 8/2007 | Kanaoka |
| 2007/0208678 A1 | 9/2007 | Matsugu |
| 2007/0250464 A1 | 10/2007 | Hamilton |
| 2007/0255454 A1 | 11/2007 | Dariush et al. |
| 2007/0260356 A1 | 11/2007 | Kock |
| 2008/0024345 A1 | 1/2008 | Watson |
| 2008/0040040 A1* | 2/2008 | Goto et al. .................... 701/301 |
| 2008/0097644 A1 | 4/2008 | Kaznov |
| 2008/0100482 A1 | 5/2008 | Lazar |
| 2008/0112596 A1 | 5/2008 | Rhoads et al. |
| 2008/0133052 A1 | 6/2008 | Jones |
| 2008/0140257 A1 | 6/2008 | Sato et al. |
| 2008/0154428 A1 | 6/2008 | Nagatsuka |
| 2008/0162391 A1 | 7/2008 | Izhikevich |
| 2008/0294074 A1 | 11/2008 | Tong et al. |
| 2008/0319929 A1 | 12/2008 | Kaplan et al. |
| 2009/0037033 A1 | 2/2009 | Phillips et al. |
| 2009/0043722 A1 | 2/2009 | Nugent |
| 2009/0069943 A1 | 3/2009 | Akashi et al. |
| 2009/0105786 A1 | 4/2009 | Fetz et al. |
| 2009/0231359 A1 | 9/2009 | Bass II et al. |
| 2009/0234501 A1 | 9/2009 | Ishizaki |
| 2009/0265036 A1 | 10/2009 | Jamieson et al. |
| 2009/0272585 A1 | 11/2009 | Nagasaka |
| 2009/0287624 A1 | 11/2009 | Rouat |
| 2009/0299751 A1 | 12/2009 | Jung |
| 2009/0312817 A1 | 12/2009 | Hogle et al. |
| 2010/0036457 A1 | 2/2010 | Sarpeshkar |
| 2010/0081958 A1 | 4/2010 | She |
| 2010/0086171 A1 | 4/2010 | Lapstun |
| 2010/0152896 A1 | 6/2010 | Komatsu et al. |
| 2010/0152899 A1 | 6/2010 | Chang et al. |
| 2010/0166320 A1 | 7/2010 | Paquier |
| 2010/0169098 A1 | 7/2010 | Patch |
| 2010/0198765 A1 | 8/2010 | Fiorillo |
| 2010/0222924 A1 | 9/2010 | Gienger |
| 2010/0225824 A1 | 9/2010 | Lazar |
| 2010/0228264 A1 | 9/2010 | Robinson et al. |
| 2010/0286824 A1 | 11/2010 | Solomon |
| 2010/0292835 A1 | 11/2010 | Sugiura et al. |
| 2010/0299101 A1 | 11/2010 | Shimada |
| 2010/0305758 A1 | 12/2010 | Nishi et al. |
| 2010/0312730 A1 | 12/2010 | Weng et al. |
| 2011/0010006 A1 | 1/2011 | Tani et al. |
| 2011/0016071 A1 | 1/2011 | Guillen |
| 2011/0026770 A1 | 2/2011 | Brookshire |
| 2011/0035052 A1 | 2/2011 | McLurkin |
| 2011/0035188 A1 | 2/2011 | Martinez-Heras et al. |
| 2011/0040405 A1 | 2/2011 | Lim et al. |
| 2011/0060460 A1 | 3/2011 | Oga et al. |
| 2011/0060461 A1 | 3/2011 | Velliste et al. |
| 2011/0067479 A1 | 3/2011 | Davis et al. |
| 2011/0071676 A1 | 3/2011 | Sanders et al. |
| 2011/0107270 A1 | 5/2011 | Wang et al. |
| 2011/0110006 A1 | 5/2011 | Meyer et al. |
| 2011/0119214 A1 | 5/2011 | Breitwisch |
| 2011/0119215 A1 | 5/2011 | Elmegreen |
| 2011/0144802 A1 | 6/2011 | Jang |
| 2011/0158476 A1 | 6/2011 | Fahn et al. |
| 2011/0160741 A1 | 6/2011 | Asano et al. |
| 2011/0160906 A1 | 6/2011 | Orita et al. |
| 2011/0160907 A1 | 6/2011 | Orita |
| 2011/0196199 A1 | 8/2011 | Donhowe |
| 2011/0208350 A1 | 8/2011 | Eliuk et al. |
| 2011/0218676 A1 | 9/2011 | Okazaki |
| 2011/0231016 A1 | 9/2011 | Goulding |
| 2011/0244919 A1 | 10/2011 | Aller et al. |
| 2011/0282169 A1 | 11/2011 | Grudic et al. |
| 2011/0296944 A1 | 12/2011 | Carter |
| 2011/0319714 A1 | 12/2011 | Roelle et al. |
| 2012/0008838 A1 | 1/2012 | Guyon et al. |
| 2012/0011090 A1 | 1/2012 | Tang |
| 2012/0011093 A1 | 1/2012 | Aparin et al. |
| 2012/0017232 A1 | 1/2012 | Hoffberg et al. |
| 2012/0036099 A1 | 2/2012 | Venkatraman et al. |
| 2012/0045068 A1 | 2/2012 | Kim et al. |
| 2012/0053728 A1 | 3/2012 | Theodorus |
| 2012/0071752 A1 | 3/2012 | Sewell et al. |
| 2012/0109866 A1 | 5/2012 | Modha |
| 2012/0143495 A1 | 6/2012 | Dantu |
| 2012/0144242 A1 | 6/2012 | Vichare et al. |
| 2012/0150777 A1 | 6/2012 | Setoguchi et al. |
| 2012/0150781 A1 | 6/2012 | Arthur |
| 2012/0173021 A1 | 7/2012 | Tsusaka |
| 2012/0185092 A1 | 7/2012 | Ku |
| 2012/0197439 A1 | 8/2012 | Wang |
| 2012/0209428 A1 | 8/2012 | Mizutani |
| 2012/0209432 A1 | 8/2012 | Fleischer |
| 2012/0221147 A1 | 8/2012 | Goldberg et al. |
| 2012/0296471 A1 | 11/2012 | Inaba et al. |
| 2012/0303091 A1 | 11/2012 | Izhikevich |
| 2012/0303160 A1 | 11/2012 | Ziegler et al. |
| 2012/0308076 A1 | 12/2012 | Piekniewski |
| 2012/0308136 A1 | 12/2012 | Izhikevich |
| 2013/0000480 A1 | 1/2013 | Komatsu et al. |
| 2013/0006468 A1 | 1/2013 | Koehrsen et al. |
| 2013/0019325 A1 | 1/2013 | Deisseroth |
| 2013/0066468 A1 | 3/2013 | Choi |
| 2013/0073080 A1 | 3/2013 | Ponulak |
| 2013/0073484 A1 | 3/2013 | Izhikevich |
| 2013/0073491 A1 | 3/2013 | Izhikevich |
| 2013/0073492 A1 | 3/2013 | Izhikevich |
| 2013/0073493 A1 | 3/2013 | Modha |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0096719 A1 | 4/2013 | Sanders |
| 2013/0116827 A1 | 5/2013 | Inazumi |
| 2013/0151442 A1 | 6/2013 | Suh et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0172906 A1 | 7/2013 | Olson et al. |
| 2013/0173060 A1 | 7/2013 | Yoo et al. |
| 2013/0218339 A1 | 8/2013 | Maisonnier et al. |
| 2013/0218821 A1 | 8/2013 | Szatmary |
| 2013/0245829 A1 | 9/2013 | Ohta et al. |
| 2013/0251278 A1 | 9/2013 | Izhikevich |
| 2013/0297541 A1 | 11/2013 | Piekniewski et al. |
| 2013/0297542 A1 | 11/2013 | Piekniewski |
| 2013/0310979 A1 | 11/2013 | HERR; Hugh M. et al. |
| 2013/0325244 A1 | 12/2013 | Wang |
| 2013/0325766 A1 | 12/2013 | Petre et al. |
| 2013/0325768 A1 | 12/2013 | Sinyavisky |
| 2013/0325773 A1 | 12/2013 | Sinyavisky |
| 2013/0325774 A1 | 12/2013 | Sinyavskiy et al. |
| 2013/0325775 A1 | 12/2013 | Sinyavisky |
| 2013/0325776 A1 | 12/2013 | Ponulak |
| 2013/0325777 A1 | 12/2013 | Petre |
| 2013/0345718 A1 | 12/2013 | Crawford et al. |
| 2013/0346347 A1 | 12/2013 | Patterson et al. |
| 2014/0012788 A1 | 1/2014 | Piekniewski |
| 2014/0016858 A1 | 1/2014 | Richert |
| 2014/0025613 A1 | 1/2014 | Ponulak |
| 2014/0027718 A1 | 1/2014 | Zhao |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0081895 A1 | 3/2014 | Coenen |
| 2014/0089232 A1 | 3/2014 | Buibas |
| 2014/0114479 A1 | 4/2014 | Okazaki |
| 2014/0122397 A1 | 5/2014 | Richert et al. |
| 2014/0122398 A1 | 5/2014 | Richert |
| 2014/0156574 A1 | 6/2014 | Piekniewski et al. |
| 2014/0163729 A1 | 6/2014 | Shi et al. |
| 2014/0187519 A1 | 7/2014 | Cooke et al. |
| 2014/0193066 A1 | 7/2014 | Richert |
| 2014/0222739 A1 | 8/2014 | Ponulak |
| 2014/0229411 A1 | 8/2014 | Richert et al. |
| 2014/0244557 A1 | 8/2014 | Piekniewski et al. |

(56) References Cited

U.S. PATENT DOCUMENTS

| | | |
|---|---|---|
| 2014/0277718 A1 | 9/2014 | Izhikevich |
| 2014/0277744 A1 | 9/2014 | Coenen |
| 2014/0309659 A1 | 10/2014 | Roh et al. |
| 2014/0350723 A1 | 11/2014 | Prieto et al. |
| 2014/0358284 A1 | 12/2014 | Laurent et al. |
| 2014/0358828 A1 | 12/2014 | Phillipps et al. |
| 2014/0369558 A1 | 12/2014 | Holz |
| 2014/0371907 A1 | 12/2014 | Passot et al. |
| 2014/0371912 A1 | 12/2014 | Passot et al. |
| 2015/0032258 A1 | 1/2015 | Passot et al. |
| 2015/0094850 A1 | 4/2015 | Passot et al. |
| 2015/0094852 A1 | 4/2015 | Laurent et al. |
| 2015/0127149 A1 | 5/2015 | Sinyavskiy et al. |
| 2015/0127154 A1 | 5/2015 | Passot et al. |
| 2015/0127155 A1 | 5/2015 | Passot et al. |
| 2015/0148956 A1 | 5/2015 | Negishi |
| 2015/0204559 A1 | 7/2015 | Hoffberg et al. |
| 2015/0283701 A1 | 10/2015 | Izhikevich et al. |
| 2015/0283702 A1 | 10/2015 | Izhikevich et al. |
| 2015/0283703 A1 | 10/2015 | Izhikevich et al. |
| 2015/0306761 A1 | 10/2015 | O'Connor et al. |
| 2015/0317357 A1 | 11/2015 | Harmsen et al. |
| 2015/0338204 A1 | 11/2015 | Richert et al. |
| 2015/0339589 A1 | 11/2015 | Fisher |
| 2015/0339826 A1 | 11/2015 | Buibas et al. |
| 2015/0341633 A1 | 11/2015 | Richert |
| 2016/0004923 A1 | 1/2016 | Piekniewski et al. |
| 2016/0014426 A1 | 1/2016 | Richert |

FOREIGN PATENT DOCUMENTS

| | | |
|---|---|---|
| JP | 4087423 | 3/1992 |
| JP | 2003175480 | 6/2003 |
| RU | 2108612 C1 | 10/1998 |
| WO | 2008083335 | 7/2008 |
| WO | 2010136961 | 12/2010 |
| WO | WO-2011039542 A1 | 4/2011 |
| WO | WO-2012151585 A2 | 11/2012 |

OTHER PUBLICATIONS

Abbott et al. (2000), "Synaptic plasticity: taming the beast", Nature Neuroscience, 3, 1178-1183.

Bartlett et al., "Convexity, Classification, and Risk Bounds" Jun. 16, 2005, pp. 1-61.

Bartlett et al., "Large margin classifiers: convex loss, low noise, and convergence rates" Dec. 8, 2003, 8 pgs.

Bohte, "Spiking Nueral Networks" Doctorate at the University of Leiden, Holland, Mar. 5, 2003, pp. 1-133 [retrieved on Nov. 14, 2012]. Retrieved from the internet: <URL: http://homepages.cwi.nl/-sbohte/publication/phdthesis.pdf>.

Brette et al., Brain: a simple and flexible simulator for spiking neural networks, The Neuromorphic Engineer, Jul. 1, 2009, pp. 1-4, doi: 10.2417/1200906.1659.

Cessac et al. "Overview of facts and issues about neural coding by spikes." Journal of Physiology, Paris 104.1 (2010): 5.

Cuntz et al., "One Rule to Grow Them All: A General Theory of Neuronal Branching and Its Paractical Application" PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. "Probability distributions of the logarithm of inter-spike intervals yield accurate entropy estimates from small datasets." Journal of neuroscience methods 173.1 (2008): 129.

Fidjeland et al. "Accelerated Simulation of Spiking Neural Networks Using GPUs" WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: <URL:http://www.doc.ic.ac.ukl-mpsha/IJCNN10b.pdf>.

Floreano et al., "Neuroevolution: from architectures to learning" Evol. Intel. Jan. 2008 1:47-62, [retrieved Dec. 30, 2013] [retrieved online from URL:<http://inforscience.epfl.ch/record/112676/files/FloreanoDuerrMattiussi2008.pdf>.

Gewaltig et al., NEST (Neural Simulation Tool), Scholarpedia, 2007, pp. 1-15, 2( 4 ): 1430, doi: 1 0.4249/scholarpedia.1430.

Gleeson et al., ) NeuroML: A Language for Describing Data Driven Models of Neurons and Networks with a High Degree of Biological Detail, PLoS Computational Biology, Jun. 2010, pp. 1-19 vol. 6 Issue 6.

Gollisch et al. "Rapid neural coding in the retina with relative spike latencies." Science 319.5866 (2008): 11 08-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Izhikevich, "Polychronization: Computation with Spikes", Neural Computation, 25, 2006, 18, 245-282.

Izhikevich et al., "Relating STDP to BCM", Neural Computation (2003) 15, 1511-1523.

Izhikevich, "Simple Model of Spiking Neurons", IEEE Transactions on Neural Networks, vol. 14, No. 6, Nov. 2003, pp. 1569-1572.

Jin et al. (2010) "Implementing Spike-Timing-Dependent Plasticity on SpiNNaker Neuromorphic Hardware", WCCI 2010, IEEE World Congress on Computational Intelligence.

Karbowski et al., "Multispikes and Synchronization in a Large Neural Network with Temporal Delays", Neural Computation 12, 1573-1606 (2000)).

Khotanzad, "Classification of invariant image representations using a neural network" IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Laurent, "The Neural Network Query Language (NNQL) Reference" [retrieved on Nov. 12, 2013]. Retrieved from the Internet: <URL https://code.google.com/p/nnql/issues/detail?id=1>.

Laurent, "Issue 1—nnql—Refactor Nucleus into its own file—Neural Network Query Language" [retrieved on Nov. 12, 2013]. Retrieved from the Internet: <URL:https:1/code.google.com/p/nnql/issues/detail?id=1 >.

Lazar et al. "A video time encoding machine", in Proceedings of the 15th IEEE International Conference on Image Processing (ICIP '08}, 2008, pp. 717-720.

Lazar et al. "Consistent recovery of sensory stimuli encoded with MIMO neural circuits." Computational intelligence and neuroscience (2010): 2.

Lazar et al. "Multichannel time encoding with integrate-and-fire neurons." Neurocomputing 65 (2005): 401-407.

Masquelier, Timothee. "Relative spike time coding and Stop-based orientation selectivity in the early visual system in natural continuous and saccadic vision: a computational model." Journal of computational neuroscience 32.3 (2012): 425-441.

Nguyen et al., "Estimating divergence functionals and the likelihood ratio by penalized convex risk minimization" 2007, pp. 1-8.

Nichols, A Reconfigurable Computing Architecture for Implementing Artificial Neural Networks on FPGA, Master's Thesis, The University of Guelph, 2003, pp. 1-235.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Pavlidis et al. Spiking neural network training using evolutionary algorithms. In: Proceedings 2005 IEEE International Joint Confer-

(56) References Cited

OTHER PUBLICATIONS ence on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.
Sato et al., "Pulse interval and width modulation for video transmission." Cable Television, IEEE Transactions on 4 (1978): 165-173.
Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.
Simulink® model [online], [Retrieved on Dec. 10, 2013] Retrieved from <URL: http://www.mathworks.com/products/simulink/index.html>.
Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8.
Szatmary et al., "Spike-timing Theory of Working Memory" PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2F10.1371%2Fjournal.pcbi.1000879#>.
Wang "The time dimension for scene analysis." Neural Networks, IEEE Transactions on 16.6 (2005): 1401-1426.
Sjostrom et al., "Spike-Timing Dependent Plasticity" Scholarpedia, 5(2):1362 (2010), pp. 1-18.
Lazar et al. "Consistent recovery of sensory stimuli encoded with MIMO neural circuits." Computational intelligence and neuroscience (2009): 2.
Alvarez, 'Review of approximation techniques', PhD thesis, chapter 2, pp. 7-14, University of Bradford, 2000.
Makridakis et al., 'Evaluating Accuracy (or Error) Measures', INSEAD Technical Report, 1995/18/TM.
Miller III, "Real-Time Application of Neural Networks for Sensor-Based Control of Robots with Vision", IEEE Transactions on Systems, Man, and Cypernetics Jul./Aug. 1989, pp. 825-831, vol. 19, No. 4.
Walters, "Implementation of Self-Organizing Neural Networks for Visuo-Motor Control of an Industrial Robot", IEEE Transactions on Neural Networks, vol. 4, No. 1, Jan. 1993, pp. 86-95.
Froemke et al., "Temporal Modulation of Spike-Timing-Dependent Plasticity", Frontiers in Synaptic Neuroscience, vol. 2, article 19, Jun. 2010, pp. 1-16.
Grollman et al., 2007 "Dogged Learning for Robots" IEEE International Conference on Robotics and Automation (ICRA).
PCT International Search Report for PCT/US2014/040407 dated Oct. 17, 2014.
PCT International Search Report for International Application PCT/US2013/026738 dated Jul. 21, 2014.
Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet: <http://msc.berkely.edu/wjchen/publications/DSC12_8726_Fl.pdf>.
Bouganis et al., Training a Spiking Neural Network to Control a 4-DoF Robotic Arm based on Spiking Timing-Dependent Plasticity in WCCI 2010 IEEE World Congress on Computational Intelligence Jul. 2010 [Retrieved on Jun. 24, 2014] Retrieved from internet: http://www.doc.ic.ac.uk/~mpsha/IJCNN10a.pdf>.
Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from internet: <http://ncs.ethz.ch/projects/evospike/publications/evolving-spiking-neural-networks for-spatio-and-spectro-temporal-pattern-recognition-plenary-talk-ieee-is>.
Branca, et al. (1995), A Neural Network for Ego-motion Estimation from Optical Flow BMC'95 Proceedings of the 1995 British conference on machine vision (vol. 1), pp. 247-256.
Graham The Surf Hippo User Manual Version 3.0 B". Unite de Neurosciences Integratives et Computationnelles Institut Federatif de Neurobiologie Alfred Fessard CNRS. France. Mar. 2002 [retrieved Jan. 16, 2014]. [retrieved biomedical.univ-paris5.fr ] ".
Hatsopoulos, Visual Navigation with a Neural Network, Published 1991.
http://www.braincorporation.com/specs/13StemSpecSheet_Rev_Nov11_2013. pdf.
Huang, Fall Detection Using Modular Nueral Networks with Back-projected Optical Flow, Published 2007.
Park., et al., Transfer of Skills between Human Operators through Haptic Training with Robot Coordination. International Conference on Robotics and Automation Anchorage Convention District, Anchorage, Alaska, USA, pp. 229-235 [online ], 2010 [retreived Dec. 3, 2015]. Retrieved from the Internet:<url:https:></url:https:>.
Specification, figures and EFS receipt of U.S. Appl. No. 14/244,888, filed Apr. 3, 2014 and entitled "Learning apparatus and methods for control of robotics devices via spoofing" (100 pages).
Specification, figures and EFS receipt of U.S. Appl. No. 14/244,890, filed Apr. 3, 2014 and entitled "Apparatus and methods for remotely controlling robotic devices" (91 pages).
Specification, figures and EFS receipt of U.S. Appl. No. 14/244,892, filed Apr. 3, 2014 and entitled "Spoofing remote contrl apparatus and methods" (95 pages).
Specification, figures and EFS receipt of U.S. Appl. No. 14/265,113, filed Apr. 29, 2014 and entitled "Trainable convolutional network apparatus and methods for operating a robotic vehicle" (71 pages).
Specification, figures and EFS receipt of U.S. Appl. No. 14/285,385, filed May 22, 2014 and entitles "Apparatus and methods for real time estimation of differential motion in live video" (42 pages).
Specification, figures and EFS receipt of U.S. Appl. No. 14/285,414, filed May 22, 2014 and entitled "Apparatus and methods for distance estimation using multiple image sensors" (63 pages).
Specification, figures and EFS receipt of U.S. Appl. No. 14/285,466, filed May 22, 2014 and entitled "Apparatus and methods for robotic operation using video imagery" (64 pages).
Specification, figures and EFS receipt os U.S. Appl. No. 14/321,736, filed Jul. 1, 2014 and entitled "Optical detection apparatus and methods" (49 pages).
Specification, figures and EFS receipt of U.S. Appl. No. 14/326,374, filed Jul. 8, 2014 and entitles "Apparatus and methods for distance estimation using stereo imagery" (75 pages).
Specification, figures and EFS receipt of U.S. Appl. No. 14/489,242, filed Sep. 17, 2014 and entitles "Apparatus and methods for remotely controlling robotic devices"(100 pages).
Specification, figures and EFS receipt of U.S. Appl. No. 14/542,391, filed Nov. 14, 2014 and entitled "Feature detection apparatus and methods for training of robotic navigation" (83 pages).
Specification, figures and EFS receipt of U.S. Appl. No. 14/588,168, filed Dec. 31, 2014 and entitled -Apparatus and methods for training robots (101 pages).
Specification, figures and EFS receipt of U.S. Appl. No. 14/637,138, filed Mar. 3, 2015 and entitled "Salient features tracking apparatus and methods using visual initialization" (66 pages).
Specification, figures and EFS receipt of U.S. Appl. No. 14/637,164, filed Mar. 3, 2015 and entitled "Apparatus and methods for tracking salient features" (66 pages).
Specification, figures and EFS receipt of U.S. Appl. No. 14/637,191, filed Mar. 3, 2015 and entitled "Apparatus and methods for saliency detection based on color occurrence analysis" (66 pages).
Specification, figures and EFS receipt of U.S. Appl. No. 14/705,487, filed May 6, 2015 and entitled -Persistent predictor apparatus and methods for task switching (119 pages).
Zhou, Computation of Optical Flow Usinga Neural Network, Published 1988.

\* cited by examiner

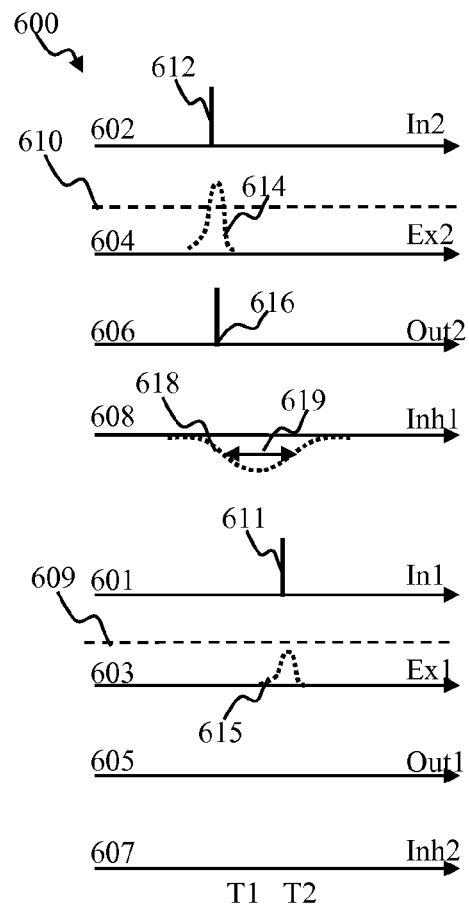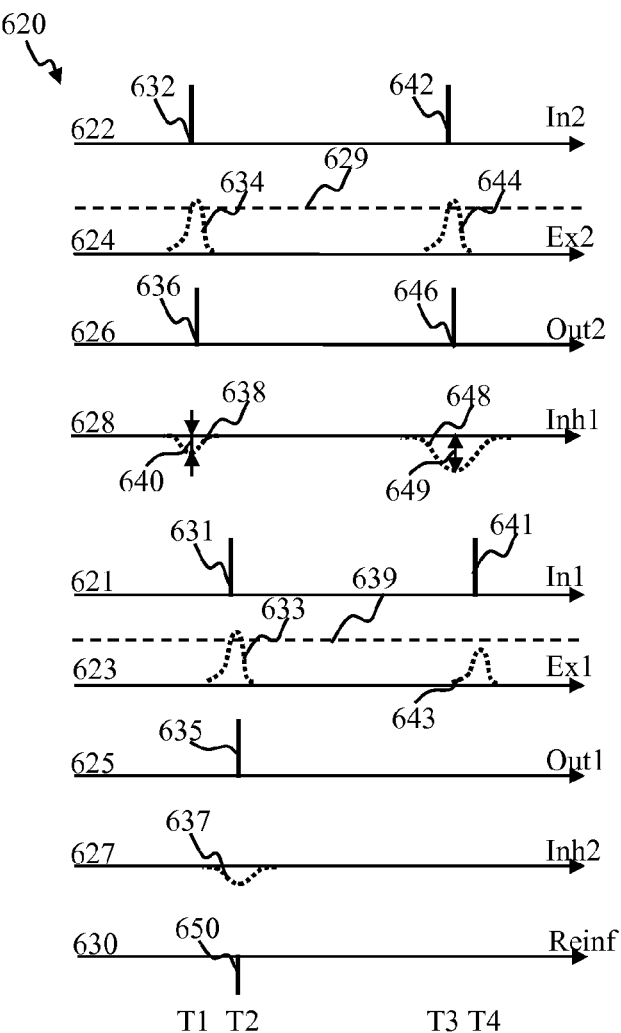
FIG. 6A                              FIG. 6B

APPARATUS AND METHODS FOR TRAINING OF ROBOTIC CONTROL ARBITRATION

CROSS-REFERENCE TO RELATED APPLICATIONS

This application is related to co-pending and/or co-owned U.S. patent application Ser. No. 14/040,498 entitled "ROBOTIC CONTROL ARBITRATION APPARATUS AND METHODS", filed concurrently with this application; U.S. patent application Ser. No. 13/953,595 entitled "APPARATUS AND METHODS FOR CONTROLLING OF ROBOTIC DEVICES", filed Jul. 29, 2013; U.S. patent application Ser. No. 13/918,338 entitled "ROBOTIC TRAINING APPARATUS AND METHODS", filed Jun. 14, 2013; U.S. patent application Ser. No. 13/918,298 entitled "HIERARCHICAL ROBOTIC CONTROLLER APPARATUS AND METHODS", filed Jun. 14, 2013; U.S. patent application Ser. No. 13/918,620 entitled "PREDICTIVE ROBOTIC CONTROLLER APPARATUS AND METHODS", filed Jun. 14, 2013; U.S. patent application Ser. No. 13/907,734 entitled "ADAPTIVE ROBOTIC INTERFACE APPARATUS AND METHODS", filed May 31, 2013; U.S. patent application Ser. No. 13/842,530 entitled "ADAPTIVE PREDICTOR APPARATUS AND METHODS", filed Mar. 15, 2013; U.S. patent application Ser. No. 13/842,562 entitled "ADAPTIVE PREDICTOR APPARATUS AND METHODS FOR ROBOTIC CONTROL", filed Mar. 15, 2013; U.S. patent application Ser. No. 13/842,616 entitled "ROBOTIC APPARATUS AND METHODS FOR DEVELOPING A HIERARCHY OF MOTOR PRIMITIVES", filed Mar. 15, 2013; U.S. patent application Ser. No. 13/842,647 entitled "MULTICHANNEL ROBOTIC CONTROLLER APPARATUS AND METHODS", filed Mar. 15, 2013; and U.S. patent application Ser. No. 13/842,583 entitled "APPARATUS AND METHODS FOR TRAINING OF ROBOTIC DEVICES", filed Mar. 15, 2013; each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to adaptive control and training of robotic devices.

Background

Robotic devices may be used in a variety of applications, such as manufacturing, medical, safety, military, exploration, and/or other applications. Some existing robotic devices (e.g., manufacturing assembly and/or packaging) may be programmed in order to perform desired functionality. Some robotic devices (e.g., surgical robots) may be remotely controlled by humans, while some robots may learn to operate via exploration.

Programming robots may be costly and remote control may require a human operator. Furthermore, changes in the robot model and/or environment may require changes in the programming code of the robot.

SUMMARY

One aspect of the disclosure relates to a processor-implemented method of learning arbitration for two tasks by a controller of a robot. The method may be performed by one or more processors configured to execute computer program modules. The method may comprise: during a first training trial of a plurality of trials: evaluating, using one or more processors, a first performance associated with contemporaneous execution of the two tasks by the robot, the two tasks including a first task and a second task; based on the first performance being within a range from a second performance obtained during a second training trial of the plurality of trials and prior to the first training trial, receiving a teaching signal conveying information associated with a target task, the target task being one of the two tasks; and based on the teaching signal, determining an association between the context and the target task, the association being configured to cause the robot to execute the target task based on (1) an occurrence of the context after the first training trial during a third training trial of the plurality of trials, and (2) an absence of receiving the teaching signal during the third training trial.

In some implementations, execution of the first task may be based on a first predicted control signal and execution of the second task is based on a second predicted control signal. The first predicted control signal and the second predicted control signal may be determined based on the context. Execution of the first task may obtain a first outcome. The execution of the first task may be separated in time from execution of the second task. The execution of the second task may obtain a second outcome that is distinct from the first outcome. The first control signal and the second control signal may be both configured to activate a given controllable resource of the robot so that contemporaneous execution of the two tasks prevents attaining the first outcome and the second outcome.

In some implementations, the association between the context and the target task is a basis for selecting the target task from the two tasks. The selection may be based on a learning process characterized by a competition between (i) a first process associated with the first predicted control signals, and (ii) a second process associated with the second predicted control signal. Selection of the first task as the target task may be configured to oppose selection of the second task as the target task. The teaching signal may be configured to increase the competition.

In some implementations, the opposition may be configured based on a selectivity range. The target task may correspond to the one of the two tasks based on (i) the one of the two predicted control signals being within the selectivity range; and (ii) the other of the two predicted control signals being outside the selectivity range.

In some implementations, individual ones of the two predicted control signals may be characterized by one or more of a signal time of occurrence, a signal magnitude, a signal frequency, or a signal phase. The selectivity range may correspond to a range of values of one or more of the signal time of occurrence, signal magnitude, signal frequency, or signal phase being evaluated as a part of determining the association. Increasing the opposition may be based on a reduction of the selectivity range.

In some implementations, increasing the competition results in a selection of the first task of the two tasks based on one or more of: (i) the first predicted control signal occurring prior to the second predicted control signal, and (ii) the first predicted control signal having a greater magnitude relative to the second predicted control signal.

In some implementations, the learning process may comprise a reinforcement learning process. The teaching signal may comprise a reinforcement signal configured to promote the first process relative the second process based on the first task corresponding to the target task. The reinforcement signal may be configured to demote the first process relative the second process based on the second task corresponding to the target task.

In some implementations, the two tasks may comprise a target approach task and an obstacle avoidance task. The target task may comprise the obstacle avoidance task. The reinforcement signal may be provided based on a collision indication associated with the robot colliding with the obstacle.

In some implementation, the learning process may comprise a supervised learning process. The teaching signal may comprise a supervisor signal configured to increase a probability of one of the first process or the second process winning the competition over the other one of the first process or the second process responsive to one of the two tasks associated with either the first process or the second process corresponding to the target task.

In some implementations, for a number of training trials of the plurality of trials, the learning process may be configured to cause execution of a task other than the target task. The supervisor signal may be configured to enable selection of the target task from the two tasks during a training trial of the plurality of trials occurring subsequent to a last-performed training trial of the number of training trials.

In some implementation, individual ones of the two predicted control signals may comprise an output of a predictor module configured based on a reinforcement learning process. The reinforcement learning process may be configured based on the context and a reinforcement signal configured based on another output of the predictor module determined at another training trial of the plurality of trials occurring prior to the first training trial.

In some implementations, individual ones of the two predicted control signals may comprise an output of a predictor module operable in accordance with a reinforcement learning process. The reinforcement learning process may be configured based on the context and a reinforcement signal configured based on an output of a combiner module determined at another training trial occurring prior to the first training trial. The output of the combiner module may be determined based on a combination of (i) another output of the predictor module determined at another training trial; and (ii) a control input communicating information relating the target task.

In some implementations, individual control signals may be outputs of a controller programmed in advance prior to the first training trial.

Another aspect of the disclosure relates to a processor-implemented method of selecting a motor actuator signal from a first actuator signal and a second actuator signal. The method may be performed by one or more processors configured to execute computer program modules. The method may comprise: based on a sensory context, providing the first actuator signal and the second actuator signal, the first actuator signal being configured to effectuate execution of a first action and the second actuator signal being configured to effectuate execution of a second action; at a first time instance, contemporaneously applying the first actuator signal and the second actuator signal to a motor; determining, using one or more processors, a first performance value associated with the contemporaneous application of the first actuator signal and the second actuator signal; and based on a comparison of the first performance value to a second performance value, selecting the first actuator signal or the second actuator signal as the motor actuator signal. The comparison may be indicative of a mismatch between of the first performance value and the second performance value. The second performance value may be associated with another contemporaneous application of the first actuator signal and the second actuator signal to the motor at a second time instance prior to the first time instance.

In some implementations, the method may comprise storing the first actuator signal, the second actuator signal, an indication associated with the first action, and an indication associated with the second action in a directed tree configured such that (i) the indications correspond to upper layer nodes and (ii) the first actuator signal and the second actuator signals correspond to lower layer nodes relative the upper layer nodes. Selecting the first actuator signal or the second actuator signal as the motor actuator signal may comprise traversing the directed tree along a path from one of the upper layer nodes to one of the lower layer nodes.

In some implementations, effectuating the selecting of the first actuator signal or the second actuator signal during a plurality of training trials may be based on a learning process. The learning process may be configured based on the sensory context and a learning parameter being modified based on the motor actuator signal matching a target signal associated with a target action. For a first portion of trials of the plurality of training trials, the learning process may be configured to cause selection of the first actuator signal based on the sensory context being present. For a second portion of trials of the plurality of training trials, the learning process may be configured to cause selection of the second actuator signal based on the sensory context being present. Modification of the learning parameter may be configured to increase a probability of the selection of the first actuator signal, based on the target action being the first action.

In some implementations, modification of the learning parameter may be configured to increase a proportion of the trials within the first portion compared to the second portion.

In some implementations, the method may comprise, based on the sensory context, generating a third actuator signal configured to effectuate execution of a third action. Responsive to the selection of the first actuator signal during a given trial of the plurality of trials, the learning process may be adapted to enable a winner-takes-all procedure configured to inhibit selection of the second actuator signal and the third actuator signal during the given trial. The modification of the learning parameter may be configured to inhibit selection of the second actuator signal. The second performance value may be determined based on the sensory context being present at the second time instance.

Yet another aspect of the disclosure relates to a non-transitory computer-readable storage medium having instructions embodied thereon. The instructions may be executable by a processor to perform a method of predicting a control signal associated with a robotic apparatus. The method may comprise: detecting an object in sensory input provided by a sensor of the robotic apparatus; determining a control output based on a characteristic of the object; operating the robotic apparatus in accordance with the control output, the control output being capable of causing the robotic apparatus to execute a maneuver that accounts for the characteristic; determining a predicted control output based on the characteristic; determining a combined output based on the control output and the predicted control output, the combined output being characterized by a transform function; based on an error measure, withdrawing control output from the combined output to produce the predicted control output; and providing the predicted control output to the robotic apparatus, the predicted control output being capable of causing the execution of the maneuver.

In some implementations, the predicted control output may be determined based on a plurality of trials. Individual ones of the plurality of trials may involve a teaching signal. The teaching signal for a given trial may be configured based on combined output from a prior trial. The error measure for the given trial may be configured based on a difference between predicted control output and the teaching signal.

Another aspect of the disclosure relates to a computerized system for learning task arbitration by a robot. The system may comprise: an interface configured to detect a training input; a non-transitory memory configured to store a plurality of computer instructions; and a processing component configured to cause the plurality of computer instructions to, when executed: determine during a given training trial of a plurality of training trials a first performance parameter determined based on a simultaneous execution of two physical tasks by the robot, the two tasks comprising a first physical task and a second physical task; based on the first performance parameter being within a range from a second performance parameter obtained during another training trial of the plurality of training trials and prior to the given training trial, evaluate the training input comprising information associated with a target physical task, the target task being one of the two physical tasks; and responsive to the evaluation of the training input, determine an association between a sensory context and the target task, and execute the target task via the robot based on (1) an occurrence of the sensory context after a first training trial during a subsequent training trial of the plurality of training trials, (2) an absence of a receipt of a reinforcement signal during the subsequent training trial, and (3) the determined association.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 6A is a graphical illustration depicting winner-takes-all arbitration based on an inhibition mechanism, according to one or more implementations.

FIG. 6B is a graphical illustration depicting learning of arbitration based on reinforcement-learning, according to one or more implementations.

Figure 1:
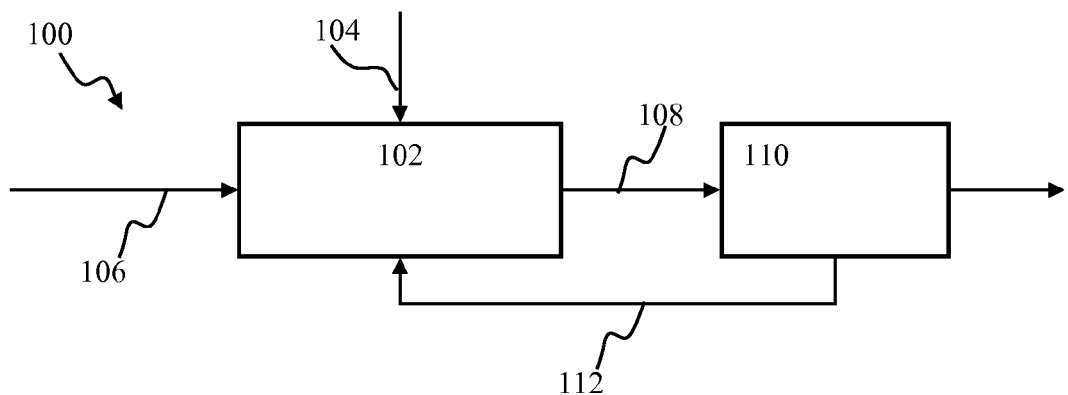
FIG. 1 is a block diagram illustrating a robotic apparatus, according to one or more implementations.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables (e.g., a membrane potential, firing threshold and/or other) used to describe state of a network node.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

FIG. 1 illustrates one implementation of an adaptive robotic apparatus for use with robot training methodologies including the ones described hereinafter. The apparatus 100 of FIG. 1 may comprise an adaptive controller 102 and a robotic platform 110. The controller 102 may be configured to provide control output 108 for the robotic platform 110. The output 108 may comprise one or more motor commands (e.g., pan camera to the right), sensor acquisition parameters (e.g., use high resolution camera mode), commands to the wheels, arms, and/or other actuators on the robot, and/or other parameters. The output 108 may be configured by the controller 102 based on one or more sensory inputs 106. The input 106 may comprise data used for solving a particular control task. In one or more implementations, such as those involving a robotic arm or autonomous robot, the signal 106 may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as that involving object recognition, the signal 106 may comprise an array of pixel values in the input image, or preprocessed data. Pixel data may include data conveying information associated with one or more of RGB, CMYK, HSV, HSL, grayscale, and/or other information. Preprocessed data may include data conveying information associated with one or more of levels of activations of Gabor filters for face recognition, contours, and/or other information. In one or more implementations, the input signal 106 may comprise a target motion trajectory. The motion trajectory may be used to predict a future state of the robot on the basis of a current state and the target state. In one or more implementations, the signals in FIG. 1 may be encoded as spikes.

The controller 102 may be operable in accordance with a learning process (e.g., reinforcement learning and/or supervised learning). In one or more implementations, the controller 102 may optimize performance (e.g., performance of the system 100 of FIG. 1) by minimizing average value of a performance function as described in detail in co-owned U.S. patent application Ser. No. 13/487,533, entitled "SYSTEMS AND APPARATUS FOR IMPLEMENTING TASK-SPECIFIC LEARNING USING SPIKING NEURONS", filed on Jun. 4, 2012 and issued as U.S. Pat. No. 9,146,546 on Sep. 29, 2015, incorporated herein by reference in its entirety.

A learning process of an adaptive controller (e.g., 102 of FIG. 1) may be implemented using a variety of methodologies. In some implementations, the controller 102 may comprise an artificial neuron network e.g., spiking neuron network described in co-owned U.S. patent application Ser. No. 13/487,533, entitled "SYSTEMS AND APPARATUS FOR IMPLEMENTING TASK-SPECIFIC LEARNING USING SPIKING NEURONS", filed Jun. 4, 2012 and issued as U.S. Pat. No. 9,146,546 on Sep. 29, 2015, incorporated supra, configured to control, for example, a robotic rover.

Individual spiking neurons may be characterized by internal state q. The internal state q may, for example, comprise a membrane voltage of the neuron, conductance of the membrane, and/or other parameters. The neuron process may be characterized by one or more learning parameter which may comprise input connection efficacy, output connection efficacy, training input connection efficacy, response provision (firing) threshold, resting potential of the neuron, and/or other parameters. In one or more implementations, some learning parameters may comprise probabilities of signal transmission between the units (e.g., neurons) of the network.

In some implementations, the training input (e.g., 104 in FIG. 1) may be differentiated from sensory inputs (e.g., inputs 106) as follows. During learning, data (e.g., spike events) arriving at neurons of the network via input 106 may cause changes in the neuron state (e.g., increase neuron membrane potential and/or other parameters). Changes in the neuron state may cause the neuron to provide a response (e.g., output a spike). Teaching data arriving to neurons of the network may cause (i) changes in the neuron dynamic model (e.g., modify parameters a, b, c, d of Izhikevich neuron model, described for example in co-owned U.S. patent application Ser. No. 13/623,842, entitled "SPIKING NEURON NETWORK ADAPTIVE CONTROL APPARATUS AND METHODS", filed Sep. 20, 2012, incorporated herein by reference in its entirety); and/or (ii) modification of connection efficacy, based, for example, on timing of input spikes, teacher spikes, and/or output spikes. In some implementations, teaching data may trigger neuron output in order to facilitate learning. In some implementations, teaching signal may be communicated to other components of the control system.

During operation (e.g., subsequent to learning), data (e.g., spike events) arriving at neurons of the network may cause changes in the neuron state (e.g., increase neuron membrane potential and/or other parameters). Changes in the neuron state may cause the neuron to provide a response (e.g., output a spike). Teaching data may be absent during operation, while input data are required for the neuron to provide output.

In one or more implementations, such as object recognition, and/or obstacle avoidance, the input 106 may comprise a stream of pixel values associated with one or more digital images. In one or more implementations of sensing (e.g., video, radar, sonography, x-ray, magnetic resonance imaging, and/or other types of sensing), the input may comprise electromagnetic waves (e.g., visible light, IR, UV, and/or other types of electromagnetic waves) entering an imaging sensor array. In some implementations, the imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a given frame rate (e.g., a 25 Hz frame rate and/or other frame rate). It will be appreciated by those skilled in the arts that the above image parameters are merely exemplary, and many other image representations (e.g., bitmap, CMYK, HSV, HSL, grayscale, and/or other representations) and/or frame rates are equally useful with the present invention. Pixels and/or groups of pixels associated with objects and/or features in the input frames may be encoded using, for example, latency encoding described in co-owned U.S. patent application Ser. No. 12/869,583, filed Aug. 26, 2010 and entitled "INVARIANT PULSE LATENCY CODING SYSTEMS AND METHODS", issued as U.S. Pat. No. 8,467,623 on Jun. 18, 2013; co-owned U.S. Pat. No. 8,315,305, issued Nov. 20, 2012, entitled "SYSTEMS AND METHODS FOR INVARIANT PULSE LATENCY CODING"; co-owned and co-pending U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described co-owned U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", issued as U.S. Pat. No. 9,070,039 on Jun. 30, 2015, each of the foregoing being incorporated herein by reference in its entirety.

In one or more implementations, object recognition and/or classification may be implemented using spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS USING CONDITIONALLY INDEPENDENT SUBSETS", issued as U.S. Pat. No. 9,195,934 on Nov. 24, 2015, and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such neuron excitability described in co-owned U.S. patent application Ser. No. 13/623,820 entitled "APPARATUS AND METHODS FOR ENCODING OF SENSORY DATA USING ARTIFICIAL SPIKING NEURONS", filed Sep. 20, 2012 and issued as U.S. Pat. No. 9,047,568 on Jun. 2, 2015, the foregoing being incorporated herein by reference in its entirety.

In some implementations, analog inputs may be converted into spikes using, for example, kernel expansion techniques described in co-owned U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. In one or more implementations, analog and/or spiking inputs may be processed by mixed signal spiking neurons, such as co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013 and issued as U.S. Pat. No. 9,213,937 on Dec. 15, 2015, each of the foregoing being incorporated herein by reference in its entirety.

The rules may be configured to implement synaptic plasticity in the network. In some implementations, the plastic rules may comprise one or more spike-timing dependent plasticity, such as rule comprising feedback described in co-owned and co-pending U.S. patent application Ser. No. 13/465,903 entitled "SENSORY INPUT PROCESSING APPARATUS IN A SPIKING NEURAL NETWORK", filed May 7, 2012; rules configured to modify of feed forward plasticity due to activity of neighboring neurons, described in co-owned U.S. patent application Ser. No. 13/488,106, entitled "SPIKING NEURON NETWORK APPARATUS AND METHODS", filed Jun. 4, 2012 and issued as U.S. Pat. No. 9,098,811 on Aug. 4, 2015; conditional plasticity rules described in co-owned U.S. patent application Ser. No. 13/541,531, entitled "CONDITIONAL PLASTICITY SPIKING NEURON NETWORK APPARATUS AND METHODS", filed Jul. 3, 2012 and issued as U.S. Pat. No. 9,111,215 on Aug. 18, 2015; plasticity configured to stabilize neuron response rate as described in co-owned and co-pending U.S. patent application Ser. No. 13/691,554, entitled "RATE STABILIZATION THROUGH PLASTICITY IN SPIKING NEURON NETWORK", filed Nov. 30, 2012; activity-based plasticity rules described in co-owned U.S. patent application Ser. No. 13/660,967, entitled "APPARATUS AND METHODS FOR ACTIVITY-BASED PLASTICITY IN A SPIKING NEURON NETWORK", filed Oct. 25, 2012 and issued as U.S. Pat. No. 8,972,315 on Mar. 3, 2015, co-owned U.S. patent application Ser. No. 13/660,945, entitled "MODULATED PLASTICITY APPARATUS AND METHODS FOR SPIKING NEURON NETWORK", filed Oct. 25, 2012 and issued as U.S. Pat. No. 9,111,226 on Aug. 18, 2015; and co-owned and co-pending U.S. patent application Ser. No. 13/774,934, entitled "APPARATUS AND METHODS FOR RATE-MODULATED PLASTICITY IN A SPIKING NEURON NETWORK", filed Feb. 22, 2013; co-owned multi-modal rules described in U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013 and issued as U.S. Pat. No. 9,177,245 on Nov. 3, 2015, each of the foregoing being incorporated herein by reference in its entirety.

In one or more implementations, neuron operation may be configured based on one or more inhibitory connections providing input configured to delay and/or depress response provision by the neuron, as described in co-owned U.S. patent application Ser. No. 13/660,923, entitled "ADAPTIVE PLASTICITY APPARATUS AND METHODS FOR SPIKING NEURON NETWORK", filed Oct. 25, 2012 and issued as U.S. Pat. No. 9,183,493 on Nov. 10, 2015, the foregoing being incorporated herein by reference in its entirety.

Connection efficacy updated may be effectuated using a variety of applicable methodologies such as, for example, event based updates described in detail in co-owned U.S. patent application Ser. No. 13/239,255, filed Sep. 21, 2011, entitled "APPARATUS AND METHODS FOR SYNAPTIC UPDATE IN A PULSE-CODED NETWORK", issued as U.S. Pat. No. 9,147,156 on Sep. 29, 2015; co-owned and co-pending U.S. patent application Ser. No. 13/588,774, entitled "APPARATUS AND METHODS FOR IMPLEMENTING EVENT-BASED UPDATES IN SPIKING NEURON NETWORKS", filed Aug. 17, 2012; and co-owned and co-pending U.S. patent application Ser. No.

13/560,891, filed Jul. 27, 2012 and entitled "APPARATUS AND METHODS FOR EFFICIENT UPDATES IN SPIKING NEURON NETWORK", each of the foregoing being incorporated herein by reference in its entirety.

A neuron process may comprise one or more learning rules configured to adjust neuron state and/or provide neuron output in accordance with neuron inputs.

In some implementations, the one or more learning rules may comprise state dependent learning rules described, for example, in co-owned and co-pending U.S. patent application Ser. No. 13/560,902, entitled "APPARATUS AND METHODS FOR GENERALIZED STATE-DEPENDENT LEARNING IN SPIKING NEURON NETWORKS", filed Jul. 27, 2012 and/or pending U.S. patent application Ser. No. 13/722,769 filed Dec. 20, 2012, and entitled "APPARATUS AND METHODS FOR STATE-DEPENDENT LEARNING IN SPIKING NEURON NETWORKS", each of the foregoing being incorporated herein by reference in its entirety.

In one or more implementations, the one or more learning rules may be configured to comprise one or more reinforcement learning, unsupervised learning, and/or supervised learning as described in co-owned U.S. patent application Ser. No. 13/487,499, entitled "STOCHASTIC APPARATUS AND METHODS FOR IMPLEMENTING GENERALIZED LEARNING RULES," filed on Jun. 4, 2012 and issued as U.S. Pat. No. 9,104,186 on Aug. 11, 2015, incorporated herein by reference in its entirety.

In one or more implementations, the one or more leaning rules may be configured in accordance with focused exploration rules such as described, for example, in co-owned U.S. patent application Ser. No. 13/489,280 entitled "APPARATUS AND METHODS FOR REINFORCEMENT LEARNING IN ARTIFICIAL NEURAL NETWORKS", filed Jun. 5, 2012 and issued as U.S. Pat. No. 8,943,008 on Jan. 27, 2015, the foregoing being incorporated herein by reference in its entirety.

Adaptive controller (e.g., the controller apparatus 102 of FIG. 1) may comprise an adaptable predictor block configured to, inter alia, predict control signal (e.g., 108) based on the sensory input (e.g., 106 in FIG. 1) and teaching input (e.g., 104 in FIG. 1). FIGS. 2A-3B illustrate exemplary adaptive predictor configurations in accordance with one or more implementations.

Figure 2:
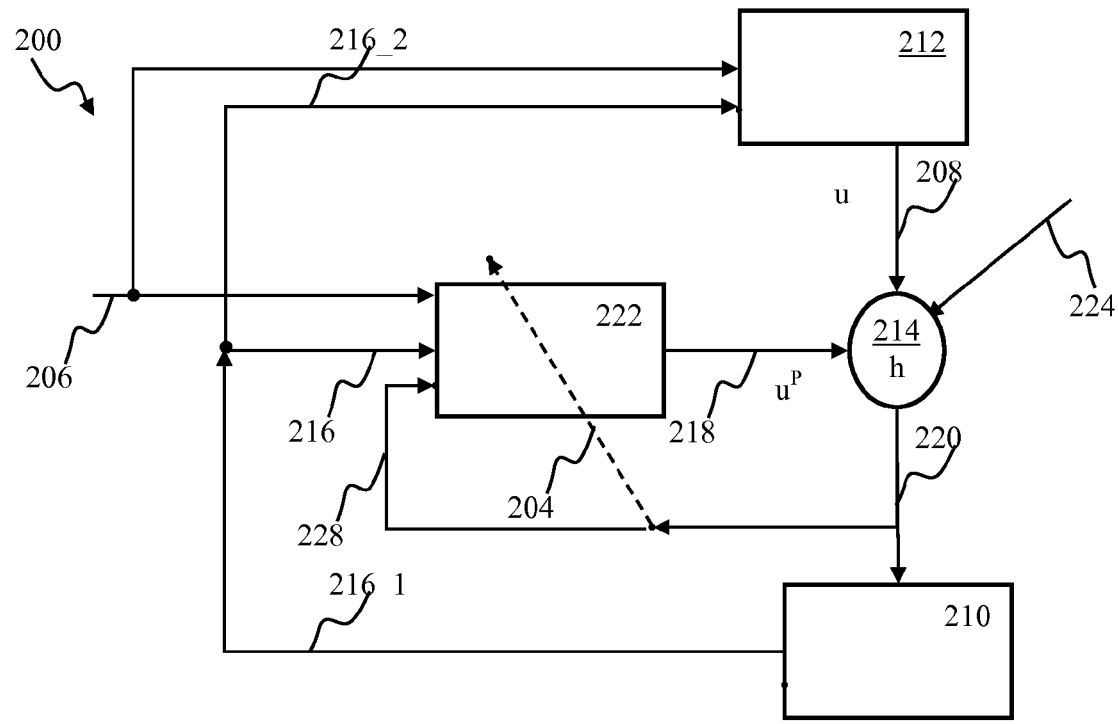
FIG. 2 is a block diagram illustrating a controller apparatus comprising an adaptable predictor block operable in accordance with a teaching signal, according to one or more implementations.

FIG. 2 illustrates an adaptive controller apparatus 200 operable in accordance with a learning process that is based on a teaching signal, according to one or more implementations. The adaptive controller apparatus 200 of FIG. 2 may comprise a control entity 212, an adaptive predictor 222, and a combiner 214. The learning process of the adaptive predictor 222 may comprise supervised learning process, reinforcement learning process, and/or a combination thereof. The control entity 212, the predictor 222 and the combiner 214 may cooperate to produce a control signal 220 for the robotic platform 210. In one or more implementations, the control signal 220 may comprise one or more motor commands (e.g., pan camera to the right, turn right wheel forward), sensor acquisition parameters (e.g., use high resolution camera mode), and/or other parameters.

The control entity 212 may be configured to provide control signal 208 based on one or more of (i) sensory input (denoted 206 in FIG. 2) and robotic platform feedback 216_2. In some implementations, the robotic platform feedback may comprise proprioceptive signals, such as the readings from servo motors, joint position, and/or torque. In some implementations, the sensory input 206 may correspond to the controller sensory input 106, described with respect to FIG. 1, supra. In one or more implementations, the control entity may comprise a human trainer, communicating with the robotic controller via a remote controller and/or joystick. In one or more implementations, the control entity may comprise a computerized agent such as a multifunction adaptive controller operable using reinforcement and/or unsupervised learning and capable of training other robotic devices for one and/or multiple tasks.

The adaptive predictor 222 may be configured to provide predicted control signal $u^P$ 218 based on one or more of (i) the sensory input 206 and the robotic platform feedback 216_1. The predictor 222 may be configured to adapt its internal parameters, e.g., according to a supervised learning rule, and/or other machine learning rules.

Predictor realizations, comprising robotic platform feedback, may be employed in applications such as, for example, wherein (i) the control action may comprise a sequence of purposefully timed commands (e.g., associated with approaching a stationary target (e.g., a cup) by a robotic manipulator arm); and (ii) the robotic platform may be characterized by a platform state time-scale parameter (e.g., arm inertial oscillation period, and/or motor response time) that may be greater than the rate of action updates. Parameters of a subsequent command within the sequence may depend on the platform state (e.g., the exact location and/or position of the arm joints) that may become available to the predictor via the robotic platform feedback.

The sensory input and/or the robotic platform feedback may collectively be referred to as sensory context. The context may be utilized by the predictor 222 in order to produce the predicted output 218. By way of a non-limiting illustration of obstacle avoidance by an autonomous rover, an image of an obstacle (e.g., wall representation in the sensory input 206) may be combined with rover motion (e.g., speed and/or direction) to provide Context_A. When the Context_A is encountered, the control output 220 may comprise one or more commands configured to avoid a collision between the rover and the obstacle. Based on one or more prior encounters of the Context_A—avoidance control output, the predictor may build an association between these events as described in detail below.

The combiner 214 may implement a transfer function h( ) configured to combine the control signal 208 and the predicted control signal 218. In some implementations, the combiner 214 operation may be expressed as described in detail in U.S. patent application Ser. No. 13/842,530 entitled "ADAPTIVE PREDICTOR APPARATUS AND METHODS", filed Mar. 15, 2013, as follows:

$$u \hat{=} h(u, u^P). \tag{Eqn. 1}$$

Various realization of the transfer function of Eqn. 1 may be utilized. In some implementations, the transfer function may comprise addition operation, union, a logical 'AND' operation, and/or other operations.

In one or more implementations, the transfer function may comprise a convolution operation. In spiking network realizations of the combiner function, the convolution operation may be supplemented by use of a finite support kernel such as Gaussian, rectangular, exponential, and/or other finite support kernel. Such a kernel may implement a low pass filtering operation of input spike train(s). In some implementations, the transfer function may be characterized by a commutative property configured such that:

$$\hat{u} = h(u, u^P) = h(u^P, u). \tag{Eqn. 2}$$

In one or more implementations, the transfer function of the combiner 214 may be configured as follows:

$$h(0, u^P) = u^P. \tag{Eqn. 3}$$

In one or more implementations, the transfer function h may be configured as:

$$h(u,0)=u. \quad (\text{Eqn. 4})$$

In some implementations, the transfer function h may be configured as a combination of realizations of Eqn. 3-Eqn. 4 as:

$$h(0,u^P)=u^P, \text{ and } h(u,0)=u, \quad (\text{Eqn. 5})$$

In one exemplary implementation, the transfer function satisfying Eqn. 5 may be expressed as:

$$h(u,u^P)=(1-u)\times(1-u^P)-1. \quad (\text{Eqn. 6})$$

In one such realization, the combiner transfer function configured according to Eqn. 3-Eqn. 6, thereby implementing an additive feedback. In other words, output of the predictor (e.g., 218) may be additively combined with the control signal (208) and the combined signal 220 may be used as the teaching input (204) for the predictor. In some implementations, the combined signal 220 may be utilized as an input (context) signal 228 into the predictor 222.

In some implementations, the combiner transfer function may be characterized by a delay expressed as:

$$\hat{u}(t_{i+1})=h(u(t_i),u^P(t_i)). \quad (\text{Eqn. 7})$$

In Eqn. 7, $\hat{u}(t_{i+1})$ denotes combined output (e.g., 220 in FIG. 2) at time t+Δt. As used herein, symbol $t_N$ may be used to refer to a time instance associated with individual controller update events (e.g., as expressed by Eqn. 7), for example $t_1$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity Δt may be configured to be between 1 ms and 1000 ms.

It will be appreciated by those skilled in the arts that various other realizations of the transfer function of the combiner 214 (e.g., comprising a Heaviside step function, a sigmoidal function, such as the hyperbolic tangent, Gauss error function, or logistic function, and/or a stochastic operation) may be applicable.

Operation of the predictor 222 learning process may be aided by a teaching signal 204. As shown in FIG. 2, the teaching signal 204 may comprise the output 220 of the combiner:

$$u^d=\hat{u}. \quad (\text{Eqn. 8})$$

In some implementations wherein the combiner transfer function may be characterized by a delay τ (e.g., Eqn. 7), the teaching signal at time $t_i$ may be configured based on values of u, $u^P$ at a prior time $t_{i-1}$, for example as:

$$u^d(t_i)=h(u(t_{i-1}),u^P(t_{i-1})). \quad (\text{Eqn. 9})$$

The training signal $u^d$ at time $t_i$ may be utilized by the predictor in order to determine the predicted output $u^P$ at a subsequent time $t_{i+1}$, corresponding to the context (e.g., the sensory input x) at time $t_i$:

$$u^P(t_{i+1})=F[x_i,W(u^d(t_i))]. \quad (\text{Eqn. 10})$$

In Eqn. 10, the function W may refer to a learning process implemented by the predictor.

In one or more implementations, such as illustrated in FIGS. 2A-2B, the sensory input 206/306, the control signal 208/308, the predicted output 218/318, the combined output 220, 340 and/or robotic platform feedback 216, 236 may comprise spiking signal, analog signal, and/or a combination thereof. Analog to spiking and/or spiking to analog signal conversion may be effectuated using, mixed signal spiking neuron networks, such as, for example, described in co-owned and co-pending U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013 and issued as U.S. Pat. No. 9,213,937 on Dec. 15, 2015, incorporated supra.

Output 220 of the combiner e.g., 214 in FIG. 2, may be gated. In some implementations, the gating information may be provided to the combiner by the control entity 242. In one such realization of spiking controller output, the control signal 208 may comprise positive spikes indicative of a control command and configured to be combined with the predicted control signal (e.g., 218); the control signal 208 may comprise negative spikes, where the timing of the negative spikes is configured to communicate the control command, and the (negative) amplitude sign is configured to communicate the combination inhibition information to the combiner 214 so as to enable the combiner to 'ignore' the predicted control signal 218 for constructing the combined output 220.

In some implementations of spiking signal output, the combiner 214 may comprise a spiking neuron network; and the control signal 208 may be communicated via two or more connections. One such connection may be configured to communicate spikes indicative of a control command to the combiner neuron; the other connection may be used to communicate an inhibitory signal to the combiner network. The inhibitory signal may inhibit one or more neurons of the combiner the one or more combiner input neurons of the combiner network thereby effectively removing the predicted control signal from the combined output (e.g., 220 in FIG. 2B).

The gating information may be provided to the combiner via a connection 224 from another entity (e.g., a human operator controlling the system with a remote control, and/or external controller) and/or from another output from the controller 212 (e.g. an adapting block, or an optimal controller). In one or more implementations, the gating information delivered via the connection 224 may comprise one or more of: a command, a memory address of a register storing a flag, a message, an inhibitory efficacy, a value (e.g., a weight of zero to be applied to the predicted control signal 218 by the combiner), and/or other information capable of conveying gating instructions to the combiner.

The gating information may be used by the combiner network to inhibit and/or suppress the transfer function operation. The suppression (or 'veto') may cause the combiner output (e.g., 220) to be comprised solely of the control signal portion 218, e.g., configured in accordance with Eqn. 4.

In one or more implementations, the gating signal 224 may comprise an inhibitory indication that may be configured to inhibit the output from the combiner. Zero combiner output may, in some realizations, may cause zero teaching signal (e.g., 214 in FIG. 2) to be provided to the predictor so as to signal to the predictor a discrepancy between the target action (e.g., controller output 208) and the predicted control signal (e.g., output 218).

The gating signal 224 may be used to veto predictor output 218 based on, for example, the predicted control output 218 being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

By way of a non-limiting illustration, if the turn is to be completed and/or aborted (due to, for example, a trajectory change and/or sensory input change), and the predictor output may still be producing turn instruction to the robotic platform, the gating signal may cause the combiner to veto (ignore) the predictor contribution and to pass through the controller contribution.

Predicted control signal 218 and the control input 208 may be of opposite signs. In one or more implementations, positive predicted control signal (e.g., 218) may exceed the target output that may be appropriate for performance of as task. Control signal 208 may be configured to comprise negative signal (e.g., −10) in order to compensate for overprediction by the predictor.

Gating and/or sign reversal of controller output may be useful, for example, responsive to the predictor output being incompatible with the sensory input (e.g., navigating towards a wrong target). Rapid (compared to the predictor learning time scale) changes in the environment (e.g., appearance of a new obstacle, target disappearance), may require a capability by the controller (and/or supervisor) to 'overwrite' predictor output. In one or more implementations compensation for overprediction may be controlled by a graded form of the gating signal delivered via the connection 224.

Figure 3A:
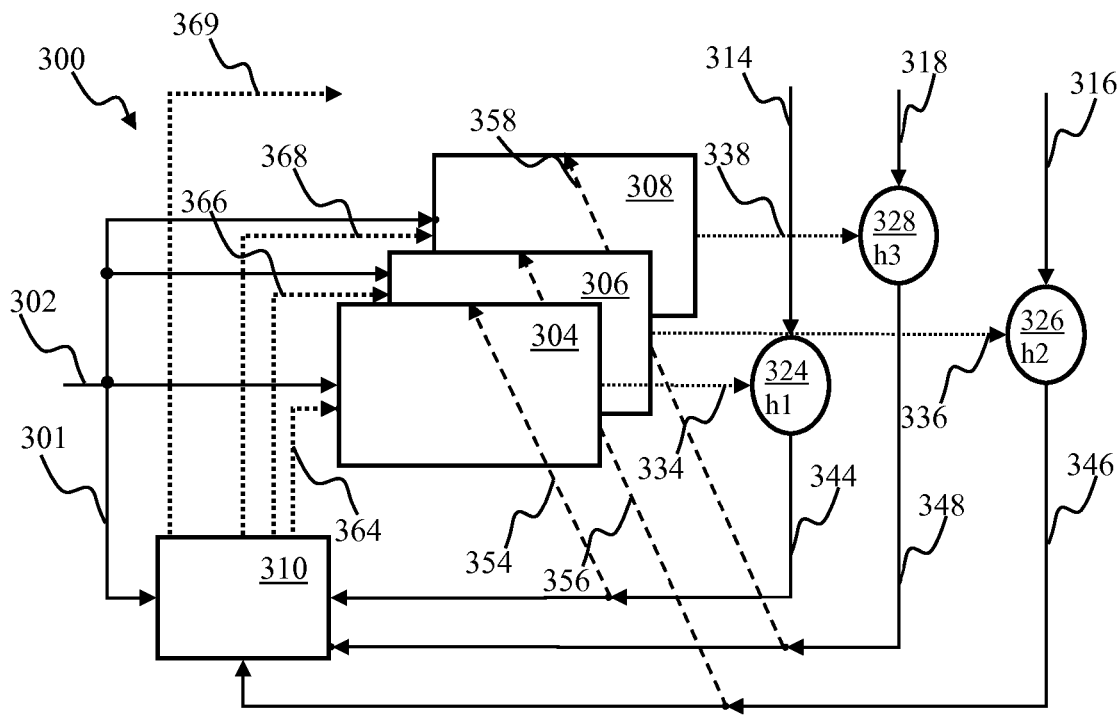
FIG. 3A is a block diagram illustrating an adaptive control system comprising an adaptive arbitrator configured to arbitrate inputs into multiple predictors, according to one or more implementations.

FIG. 3A illustrates an adaptive control system 300 comprising an arbitrator configured to arbitrate inputs into multiple predictors, according to one or more implementations. The system 300 may comprise predictors 304, 306, 308, an adaptive arbitrator 310 operably coupled to combiners 324, 326, 328. In one or more implementations, individual predictors 304, 306, 308 may comprise the adaptive predictor 222 described above with respect to FIG. 2. Individual combiners 324, 326, 328 may comprise the combiner 214 described above with respect to FIG. 2.

The system 300 may receive sensory input 302 and one or more control inputs 314, 316, 318. Individual control inputs 314, 316, 318 may comprise a control command (e.g., turn 30° right) and/or an action indication. In some implementations, as described, e.g., in U.S. patent application Ser. No. 13/842,530 entitled "ADAPTIVE PREDICTOR APPARATUS AND METHODS", filed Mar. 15, 2013, incorporated supra, action indications may comprise a control directive "approach a chair", "follow red ball", and/or other indication. Output 344, 346, 348 of the combiners may be configured based on a combination of the respective control input (e.g., 314, 316, 318, respectively) and predictor output (e.g., 334, 336, 338, respectively) using for example, methodology of Eqn. 4-Eqn. 9 described above.

The predictors 304, 306, 308 may be configured to provide predicted control signals 334, 336, 338, respectively, based on a context. The context may comprise sensory input 302, e.g., as described with respect to FIG. 1, supra, and arbitrator 310 output 364, 366, 368. In one or more implementations, e.g., such as described above with respect to FIG. 2, operation of the predictors 304, 306, 308 may be configured based on a training input 354, 356, 358. Individual training inputs 354, 356, 358 may comprise output of a respective combiner (e.g., 324, 326, 328. In one or more implementations, the training input into the predictor may be configured based on one or more of Eqn. 4-Eqn. 9, described above with respect to FIG. 2.

Figure 15:
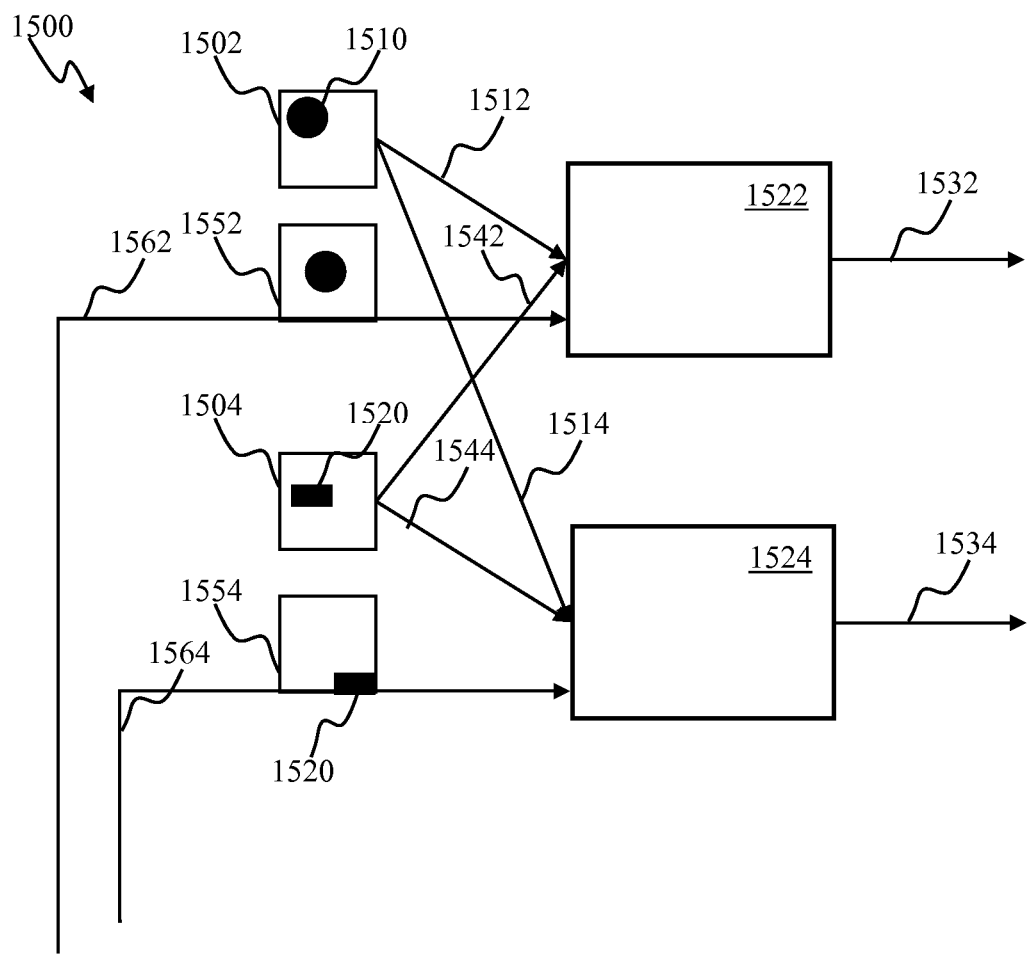
FIG. 15 is a graphical illustration depicting predictor inputs, according to one or more implementations.

In some implementations, the signals 364, 366, 368 may comprise a target state associated with the predictor output (e.g., 334, 336, 338). FIG. 15 illustrates use of arbitrator outputs for configuring target state of multiple predictors in accordance with one or more implementations.

The control system 1500 of FIG. 15 may be configured to control a robotic apparatus to perform target approach (TA) and obstacle avoidance (OA) actions based on visual sensory input. The system 1500 may comprise predictors 1522, 1524 and an arbitrator 1508. The predictor 1522 may be configured (e.g., via learning) to provide actions 1532, which may be configured to effectuate the TA portion of the system 1500 control policy; the predictor 1524 may be configured (e.g., via learning) to provide actions 1534, which may be configured to effectuate the OA portion of the system 1500 control policy. The predictors 1522, 1524 may be configured to receive sensory input 1502, 1504. The sensory input 1502 may comprise a video frame comprising a representation of a target (e.g., a ball 1510). The input 1504 may comprise a video frame comprising a representation of an obstacle (e.g., a box 1520). The input 1502 may be provided to the predictors 1522, 1524 via connections 1512, 1514 and input 1502 via the connections 1542, 1544.

During learning of target approach by the predictor 1522, efficacy of the connection 1542 may be reduced, compared to the connection 1512 efficacy. Such efficacy configuration may cause the predictor 1522 to respond preferentially to the presence of the target (e.g., 1510) in the sensory input frame 1502. During learning of obstacle avoidance by the predictor 1524, efficacy of the connection 1514 may be reduced, compared to the connection 1544 efficacy. Such efficacy configuration may cause the predictor 1524 to respond preferentially to the presence of the obstacle (e.g., 1520) in the sensory input frame 1504. In some implementations, the predictor response to the presence of targets/obstacles may comprise provision of non-trivial/non-zero predicted output control signal. The terms non-trivial and/or non-zero may be used to describe output that is different from a zero (e.g., base state) output. In one or more implementations, the base-state (zero signal) output may comprise a pre-defined signal, a constant (e.g., a DC offset or a bias), a frequency, spiking activity at a mean-firing rate, and/or other zero signal realizations.

The arbitrator 1508 may be configured to receive predicted actions 1532, 1534 and provide the may provide target state information 1562, 1564 to the predictors 1522, 1524, respectively. In one or more implementations of visual-based TA/OA, the target state information 1562 may comprise a preferred (target) position of the target within the view frame (e.g., the target 1510 position in the middle of the frame 1552). The target state information 1564 may comprise a preferred (target) position of the obstacle within the view frame (e.g., the obstacle 1520 proximate an edge of the frame 1554).

An exemplary operation of the control system 1500 may be described as follows. During a given iteration (e.g., the trial 1024 in FIG. 10B):

the sensory input 1502, 1504 may comprise contemporaneous occurrence of the target representation (e.g., 1510) and the obstacle representation (e.g., 1520);

the target state input 1562, 1564 may indicate multiple preferred states: e.g., the target state (e.g., 1510) and the obstacle state (e.g., 1520);

based on the sensory input and the target state, the predictor 1522 may provide TA predicted action 1532, while the predictor 1524 may provide OA predicted action 1534;

contemporaneous execution of both actions (e.g., TA, OA) may be in a conflict with the control policy of the system 1500 (e.g., by causing a collision and/or delaying action execution); and based on receipt of the signals 1532, 1534, the arbitrator (e.g., 410 in FIG. 4) may be configured to suppress one of the target state signals (e.g., 1562 or 1564).

During another iteration (e.g., the trial 1026 in FIG. 10B):

the sensory input 1502, 1504 may comprise contemporaneous occurrence of the target representation (e.g., 1510) and the obstacle representation (e.g., 1520);

the target state input 1562, 1564 may indicate single preferred states: e.g., the target state (e.g., 1510) or the obstacle state (e.g., 1520);

based on the sensory input and the target state, only one of the predictors 1522, 1524 may provide the predicted action (e.g., 1532 or 1534); and single action (e.g., TA or OA) may be executed based on the single predicted action (e.g., 1532 or 1534).

Inputs, outputs and/or state of the control system 300 may be updated at fixed or varying time intervals $t_1$. The arbitrator 310 output at a given time instance $t_2$ may be configured based on predictor output provided at a prior time instance $t_1 < t_2$ and the sensory input 302 at time $t_1$.

In one or more implementations, the system 300 may be embedded in a mobile robotic device (e.g., 702 in FIG. 7) configured to perform target approach and/or obstacle avoidance. Exemplary functionalities of the system 300 are described below.

The sensory input 302, comprising for example, images of one or more targets (e.g., a white ball 704 and a black ball 706 in FIG. 7) may be provided to the system 300. The predictors 304, 306, 308 may be configured to develop an association between the sensory input and the following action indications: "approach white ball", "approach black ball", and "avoid obstacle", respectively. At least one input 314, 316, 318 may comprise an action indication "approach green ball".

During training, predictors 304, 306, 308 may provide predicted control signals 334, 336, 338, respectively, based on the sensory input and/or inputs representing the internal state of the system 300, and/or action indication input. In some implementations, the internal state data may comprise target sensory expectation (e.g., a change in a view object due to an approach maneuver), an intention signal, an efferent copy of a motor command (e.g., lower level commands or motor primitives 1220, 1222 shown in FIG. 12), battery level, and/or other parameters. In one or more implementations, predictor training may be based on user input, for example, as described in U.S. patent application Ser. No. 13/918,338 entitled "ROBOTIC TRAINING APPARATUS AND METHODS", filed Jun. 14, 2013; U.S. patent application Ser. No. 13/918,298 entitled "HIERARCHICAL ROBOTIC CONTROLLER APPARATUS AND METHODS", filed Jun. 14, 2013, the foregoing incorporated by reference supra.

Upon training, the predictors 304, 306 may provide predicted output signals 334, 336 configured respectively, to perform the following: 334 "approach green ball", 336 "approach red ball". The predictor 308 output may comprise zero output in absence of obstacles in the sensory input (e.g., as shown in the configuration of FIG. 7).

The robotic device may comprise one or more motors configured to effectuate actions (e.g., right/left turn). The predicted output 334 may be configured to cause execution of a left turn action 714. The predicted output 336 may be configured to cause execution a right left turn action 716. In absence of arbitration, the robotic device may execute the actions 714, 716 contemporaneous with one another thereby causing unintended forward motion of the device 702, e.g., along the broken line arrow 712 in FIG. 7.

Figure 7:
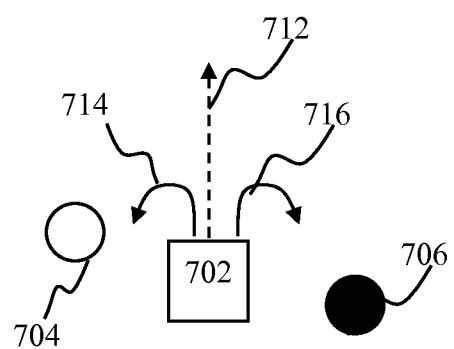
FIG. 7 is a graphical illustration of a robot apparatus configured to select an action from multiple actions, according to one or more implementations.

Using the adaptive arbitrator 310 of FIG. 3A, the controller 300 may select one of the signals (e.g., 344) that may be associated with the action 714 in FIG. 7. Output of the arbitrator (e.g., 369) may be provided to a motor actuator (not shown) and/or another predictor (e.g., as described in detail with respect to FIG. 5A, below). Based on the signal 344 selection, the robotic device 702 may execute the action 714 and to approach white ball 704.

Figure 3B:
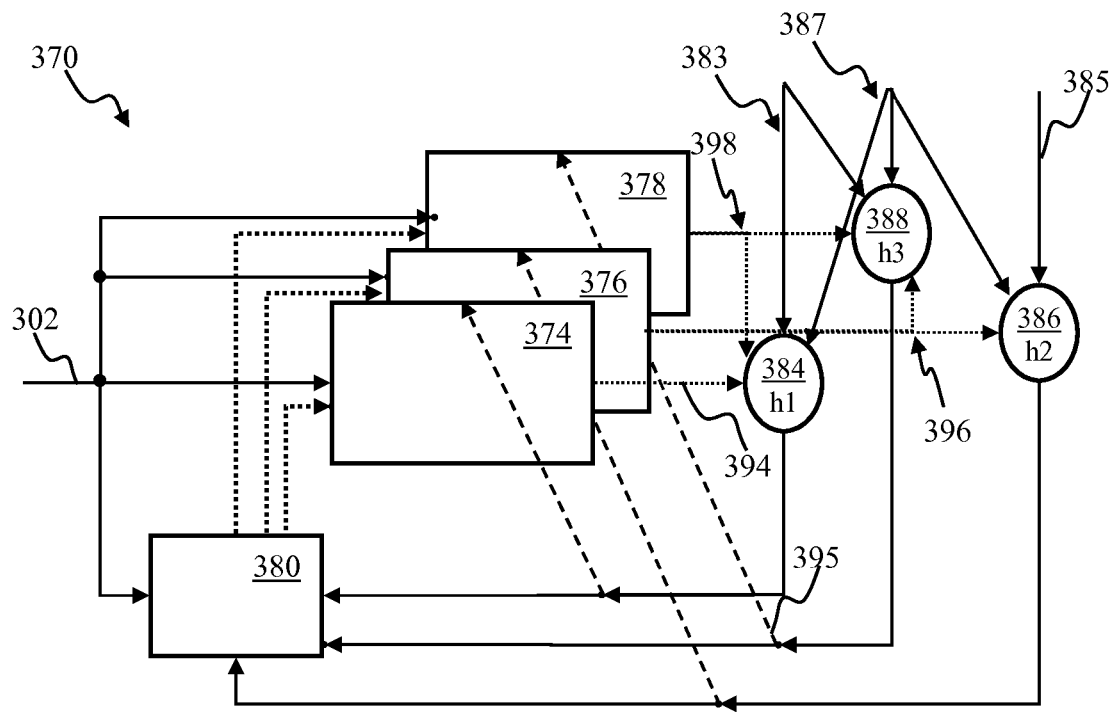
FIG. 3B is a block diagram illustrating an adaptive control system comprising multichannel combiner apparatus used with an adaptive arbitrator, according to one or more implementations.

In one or more implementations, control inputs may be based on a complex teaching signal decomposed into multiple components. FIG. 3B illustrates an adaptive system 370 comprising multiplexing predictors 374, 376, 378 and combiner apparatus 384, 386, 388. Control inputs 383, 385, 387 may correspond to components of the complex teaching signal and may be configured to drive adaptation of multiple predictor blocks (associated with individual predictor output channels, e.g., 394, 396, 398 in FIG. 3B). Learning of a (given) signal 387 may be spread over multiple predictor output channels 394, 396, 398 in FIG. 3B. Once adapted, outputs of multiple predictor blocks may be combined (e.g., by the combiner apparatus 384, 386, 388) thereby providing prediction of the target control signal. Such an implementation may increase the number of teaching signals that can be mediated using a finite set of control signal channels. In one or more implementations, individual predictors 374, 376, 378 may comprise the adaptive predictor 222 described above with respect to FIG. 2.

In one or more implementations, a single output predictor channel may contain prediction of multiple control signals, e.g., as described in U.S. patent application Ser. No. 13/842,647 entitled "MULTICHANNEL ROBOTIC CONTROLLER APPARATUS AND METHODS", filed Mar. 15, 2013, incorporated, supra. Such approach may be utilized responsive to information capacity of the predictor output channel (e.g., how much information may be encoded onto a single channel) is higher than information capacity of teaching signal.

In some implementations, a combination of the above approaches (e.g., comprising two or more teaching signals and two or more predictor output channels) may be employed.

As shown in FIG. 3B, controller signal U may be de-multiplexed into two (e.g., input 383 into the combiners 384, 388) and/or more (input 387 into the combiners 384, 386, 388). Individual combiner apparatus 384, 386, 388 may be configured to multiplex one or more controller inputs 383, 385, 387 and two or more predictor outputs $U^P$ 394, 396, 398 to form a combined signal. In some implementations, the predictor output for a given combiner may be spread (e.g., de-multiplexed) over multiple prediction channels (e.g., 396, 398). In one or more implementations, teaching input to a predictor may be delivered via multiple teaching signals shown by dashed lines (e.g., 395) in FIG. 3B, associated with two or more combiners.

The predictors 374, 376, 378 may operate in accordance with a learning process configured to determine an input-output transformation such that the output of the predictor $U^P$ after learning is configured to match the output of the combiner $h(U, U^P)$ prior to learning (e.g., when $U^P$ comprises a null signal).

Predictor transformation F may be expressed as follows:

$$U^P = F(\hat{U}), \hat{U} = h(U^P). \quad \text{(Eqn. 11)}$$

In some implementations, wherein dimensionality of control signal U matches dimensionality of predictor output $U^P$, the transformation of Eqn. 11 may be expressed in matrix form as:

$$U^P = F\hat{U}, \hat{U} = HU^P, F = inv(H), \quad \text{(Eqn. 12)}$$

where H may denote the combiner transfer matrix composed of transfer vectors for individual combiners 384, 386, 388 H=[h1, h2, . . . , hn], Û=[û1, û2, . . . ûn] may denote output matrix composed of output vectors of individual combiners 384, 386, 388; and F may denote the predictor transform matrix. The combiner output may be provided to the predictors 374, 376, 378 as teaching signal (e.g., 395 in FIG. 3B). In some implementations, the combiner output may be provided (subsequent to the arbitration by the arbitrator 380) to the predictors 374, 376, 378 as sensory input.

In some implementations of multi-channel predictor and/or combiner control apparatus (e.g., 370) various signal mapping relationships may be utilized such as, for example, one to many, many to one, some to some, many to some, and/or other relationships (e.g., one to one).

Transfer function h (and or transfer matrix H) of the combiner (e.g., 384, 386, 388 in FIG. 3B) may be configured to perform a state space transformation of the control input (e.g., 383, 385, 387 in FIG. 3B) and/or predicted signal (e.g., 394, 396, 398 in FIG. 3B). In one or more implementations, the transformation may comprise one or more of a time-domain to frequency domain transformations (e.g., Fourier transform, discrete Fourier transform, discrete cosine transform, wavelet and/or other transformations), frequency domain to time domain transformations (e.g., inverse Fourier transform, inverse discrete Fourier transform, inverse discrete cosine transform, and/or other transformations), wavenumber transform, and/or other transformations. The state space transformation may comprise an application of a function to one (or both) input parameters (e.g., u, $u^P$) into the combiner. In some implementations, the function may be selected from an exponential function, logarithm function, a Heaviside step function, and/or other functions.

In one or more implementations, the arbitrator 380 may be operated in accordance with the methodology described above with respect to FIG. 3A.

Figure 4:
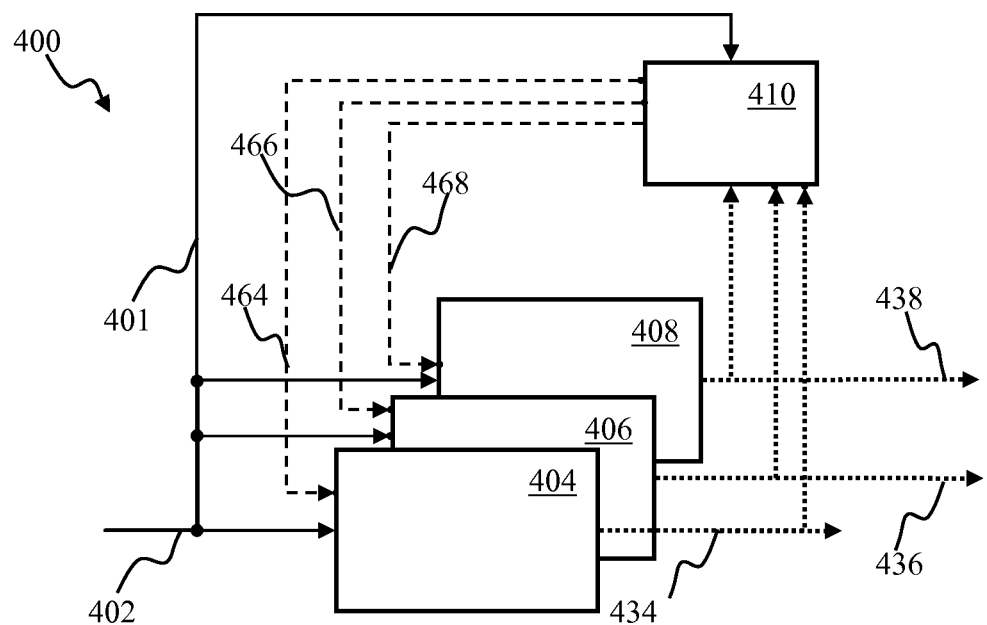
FIG. 4 is a block diagram illustrating an adaptive control system comprising an arbitrator configured to arbitrate outputs of multiple predictors, according to one or more implementations.

FIG. 4 illustrates an adaptive control system 400 comprising an arbitrator configured to arbitrate outputs of multiple predictors, according to one or more implementations. The system 400 may comprise an adaptive arbitrator 410 configured to receive outputs from predictors 404, 406, 408. In one or more implementations, individual predictors 404, 406, 408 may comprise the adaptive predictor 222 described above with respect to FIG. 2.

The system 400 may receive sensory input 402. In some implementations, the sensory input 402 may comprise the input 102 described with respect to FIG. 1, supra. All (or a portion of) the sensory input 402 may be provided to the arbitrator as shown by the arrow 401 in FIG. 4.

In some implementations, the system 400 may be provided with control inputs (e.g., the inputs 314, 316, 318 in FIG. 3A) that may comprise a control command (e.g., turn 30° right, and/or an action indication. In some implementations, as described, e.g., in U.S. patent application Ser. No. 13/842,530 entitled "ADAPTIVE PREDICTOR APPARATUS AND METHODS", filed Mar. 15, 2013, incorporated supra, action indications may comprise a control directive "approach a chair", "follow red ball", and/or other indication.

The predictors 404, 406, 408 may be configured to provide predicted control signals 434, 436, 438, respectively, based on a context. The context may comprise the sensory input 402 and arbitrator 310 outputs 464, 466, 468.

In one or more implementations, e.g., such as described above with respect to FIGS. 2-3B, operation of the predictors 404, 406, 408 may be configured based on a training signal (not shown in FIG. 4). Training input for a given predictor may be configured based on a combination of the predictor output and the control signal using, e.g., one or more of Eqn. 4-Eqn. 9, described above with respect to FIG. 2.

Inputs, outputs and/or state of the control system 400 may be updated at fixed or varying time intervals $t_i$. The arbitrator 410 output at a given time instance $t_2$ may be configured based on predictor output provided at a prior time instance $t_1 < t_2$ and the sensory input 402 at time $t_1$. During training, the arbitrator 410 operation may be based on a teaching signal (e.g., a reinforcement and/or supervisor signal) that may be provided via, e.g., the pathway 401.

In one or more implementations, the system 400 may be embedded in a mobile robotic device (e.g., 702 in FIG. 7) configured to perform target approach and/or obstacle avoidance. The arbitration methodology shown and described with respect to FIG. 4 may be performed subsequent to the predictors (e.g., 404, 406, 408) having learned their outputs (e.g., 434, 436, 438). Such separation in time and implementation of arbitration operations from prediction operation may allow faster and/or more robust learning and/or use of a simpler/lower cost processing platform.

Figure 5A:
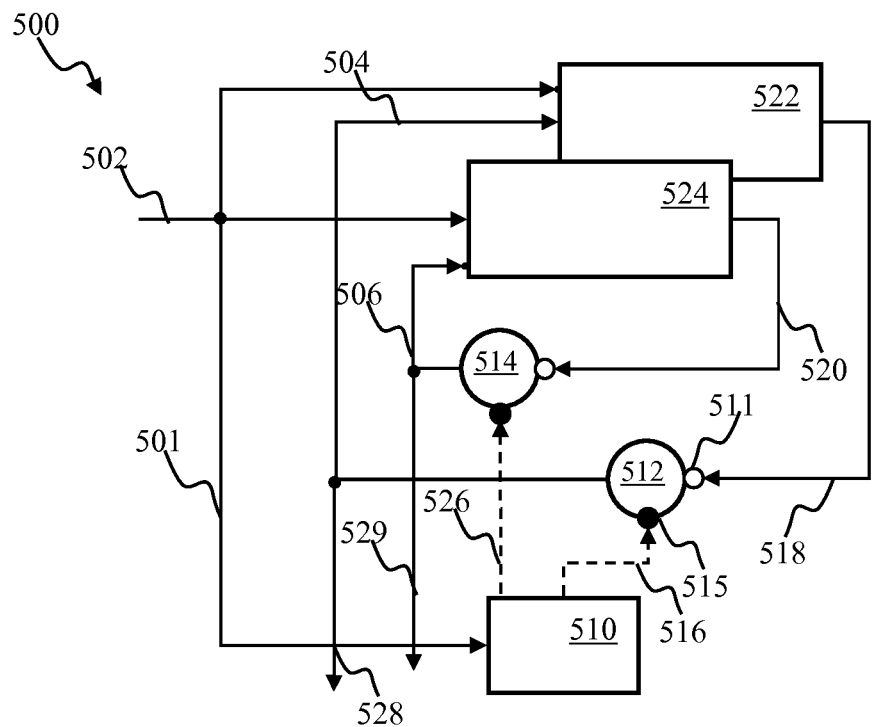
FIG. 5A is a block diagram illustrating an adaptive controller comprising inhibition-based arbitration, according to one or more implementations.

FIG. 5A illustrates inhibition-based arbitration, according to one or more implementations. The control system 520 of FIG. 5A may comprise an arbitrator 532 configured to arbitrate outputs of multiple predictors 522, 524. In one or more implementations, individual predictors 524, 522 may comprise the adaptive predictor 222 described above with respect to FIG. 2.

The system 500 may receive sensory input 502. In some implementations, the sensory input 502 may comprise the input 102 described with respect to FIG. 1, supra. All (or a portion of) the sensory input 502 may be provided to the arbitrator as shown by the arrow 501 in FIG. 5. In one or more implementations, the signal provided via the pathway 501 may comprise a teaching signal (e.g., a reinforcement signal and/or supervisory input), e.g., as described in detail below with respect to FIG. 5B.

As shown in FIG. 5A, predictor 522, 524 output may be provided to relay units 512, 514, respectively, via the pathways 518, 520. In some implementations, the control system 500 may be embodied in a robotic controller. The predicted output may be provided to other portions of the controller (e.g., to other predictors as shown in FIG. 5C, and/or motor actuators) via the pathways 528, 529.

The relay units 512, 514 may be configured to relay the received input (e.g., 518, 520) as their output (e.g., 504, 506, respectively). The arbitrator 510 may be configured to provide selection signals 516, 526 to the relay units 512, 514. In one or more implementations, the relay units 512, 514 may comprise units of a spiking neuron network. The selection signals 516, 526 may be configured to provide inhibitory input characterized by an inhibitory efficacy denoted by solid circles (e.g., 515 in FIG. 5A) to the spiking units 512, 514. The feed-forward input signals 518, 520 may be configured to provide excitatory input characterized by excitatory efficacy denoted by open circles (e.g., 511 in FIG. 5A) to the spiking units 512, 514. In one or more implementations, the excitatory/inhibitory efficacy may refer to a magnitude and/or probability of input influence on the unit output response (e.g., output spike provision/firing). The efficacy may comprise, for example, a parameter (e.g., synaptic weight) used for adaptation of one or more state variables of post-synaptic units (e.g., 512, 514). The efficacy may comprise a latency parameter by characterizing propagation delay from a pre-synaptic unit to a post-synaptic unit. In some implementations, greater efficacy may correspond to a shorter latency. Provision of the excitatory/inhibitory input may be configured to advance/delay response provision by the target neuron (e.g., 512, 514).

In one or more implementations, the units 512, 514 may be operable in accordance with spike-response process, and/or integrate and fire process, e.g., as described in detail in co-owned U.S. patent application Ser. No. 13/487,533, entitled "SYSTEMS AND APPARATUS FOR IMPLEMENTING TASK-SPECIFIC LEARNING USING SPIKING NEURONS", filed on Jun. 4, 2012 and issued as U.S. Pat. No. 9,146,546 on Sep. 29, 2015, incorporated supra. Operation of the units 512, 514 may be characterized by a unit state variable, e.g., unit excitability. In some implementations, the unit excitability may comprise neuron membrane potential. The inputs 518, 520 may be configured to increase the unit excitability. Responsive to the excitability crossing a threshold level (also referred to as the firing threshold), the unit may provide a response thereby relaying the input (e.g., 518, 520) to the output (e.g., 504, 506, respectively).

Inhibitory efficacy may be configured to reduce (and/or prevent altogether) response provision by the post-synaptic unit. By way of a non-limiting illustration, based on receipt by the unit 512 of sufficient inhibitory efficacy via the connection 518, the unit excitability may be reduced below the threshold. The inhibitory efficacy may suppress the response provision by the unit 512 thus preventing the suppressed (inhibited) unit 512 from relaying the input 518, to the output 504. The un-inhibited unit 514 may be configured to provide the response so as to effectuate the relaying of the input 520, to the output 506.

An inhibitory mechanism used for arbitration may be based on reinforcement learning (e.g., as described below with respect to FIGS. 5B, and/or 6B), and/or supervised learning (e.g., as described below with respect to FIGS. 5B, and/or 6C).

In one or more implementations, the arbitrator output may cause an inconsistent (unpredictable) action. The arbitrator may be configured to stop the arbitration process. In some implementations, the inconsistent action may be caused by the arbitrator selecting (and/or causing the selection) multiple actions to be executed contemporaneously with one another. For example, contemporaneous activation of forward/reverse motor actions may cause jerking, stalling, forward/backward motion of the platform to occur at random the same context and/or controller state. The action inconsistency may be characterized as caused by interaction of the robotic platform with environment. In one or more implementations, a teaching input may be utilized in order to aid learning of arbitration when inconsistent action may occur.

By way of an illustration of obstacle avoidance/target approach by a robotic device, an arbitrator may be configured to arbitrate between a target approach maneuver and an obstacle avoidance maneuver. In some implementations, the approach/avoid maneuvers may comprise forward/backward motion of the device platform. The robotic device controller may be configured to detect motion of the device (e.g., using inertial and/or optical sensors) responsive to issuance of the approach/avoid maneuver commands. In one or more implementations wherein the arbitrator may enable contemporaneous execution of the approach and avoid maneuvers (e.g., by issuing signals 636, 635 in FIG. 6B). Contemporaneous forward/backward motor directives may cause no and/or stuttering motion of the device motor actuator that may not give rise to appropriate platform motion signature. A teaching signal may be based on lack of expected platform motion and/or the continued unpredictability of the platform motion.

In some implementations based on a consistent but incorrect (e.g., not consistent with the target) arbitrator output, a teaching signal (e.g., of a supervisor) may be utilized to indicate the correct (e.g., target) output.

In one or more implementation, the arbitrator may be configured to detect action incompatibility based on a consistency measure associated with the arbitration outcome.

By way of an illustration, when evaluating turn left and turn right actions (that may comprise activation of left/right wheel motors), the arbitrator may randomly produce forward, backwards, and/or stationary motion. Lack of predictability (as adjudged for example from navigation data) may indicate to the arbitrator that simultaneous execution of the two actions (e.g., the left/right turn) is incompatible with one another and the two actions may need to be arbitrated.

In some implementations, when evaluating turn left and turn right actions (that may comprise activation of left/right wheel motors), the arbitrator may consistently (e.g., with a probability greater that 90%) produce forward (or backwards) motion. Predictability of the arbitration outcome may indicate to the arbitrator that simultaneous execution of one action (e.g., turn left) may be compatible with the other action (e.g., turn right). A teaching input may be utilized in order to indicate to the arbitrator as to whether the new action (move forward/backwards/remain stationary) comprised an acceptable action.

The inhibitory signal provision by the arbitrator 510 may be configured based on the context 501. The context 501 may comprise a teaching input, e.g., the input 536, 567 described in detail with respect to FIGS. 5B, 5C, below. In some implementations, the teaching input may be provided by a user and/or computerized agent and comprise a signal configured to indicate whether the selection signals 516, 526 provided by the arbitrator 510 match target signal selection as determined by the user/computerized agent. The teaching input provision may be configured based on a sensory input (e.g., pain signal) associated with a control policy used in a particular application. By way of an illustration of an obstacle avoidance applications, the pain signal may be based on a collision/proximity sensor feedback provided based on a robot colliding with (and/or approaching too closely to) an object.

In one or more implementations comprising selection of an active action from multiple actions, a teaching input that is indicative of a target action may be communicated by a user/teaching entity via an interface apparatus comprising multiple activation elements (e.g., multiple switches, multiple buttons, sliders, and/or other elements). In one or more implementations, a target action may be communicated programmatically (e.g., using a script comprising a description of an partially ordered set). By way of an illustration, when learning to selecting an action out of four possible actions a, b, c, d, the partially ordered set may be configured as follows:

$$P=\{c,a,d,b\} \quad \text{(Eqn. 13)}$$

when actions b, d, are present for arbitration, the teaching signal of Eqn. 13 may be used to learn selection of action d; when actions c, d, b are present for arbitration, the teaching signal of Eqn. 13 may be used to learn selection of action c.

In some implementations, the teaching input provision may be configured based on a scalar quantity indicated to the arbitrator 510 via a computerized algorithm and/or a human user interface (e.g., a continuous value knob, and/or a set of binary switches).

Figure 5B:
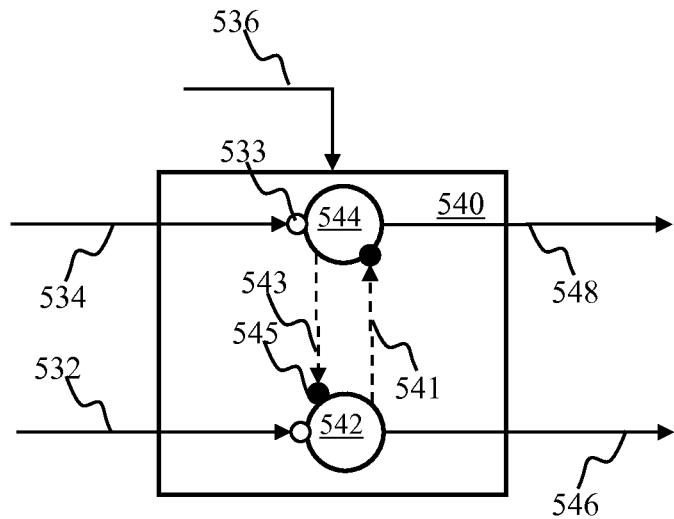
FIG. 5B is a block diagram illustrating a spiking neuron network arbitrator apparatus configured to implement inhibition-based arbitration, according to one or more implementations.
Figure 5C:
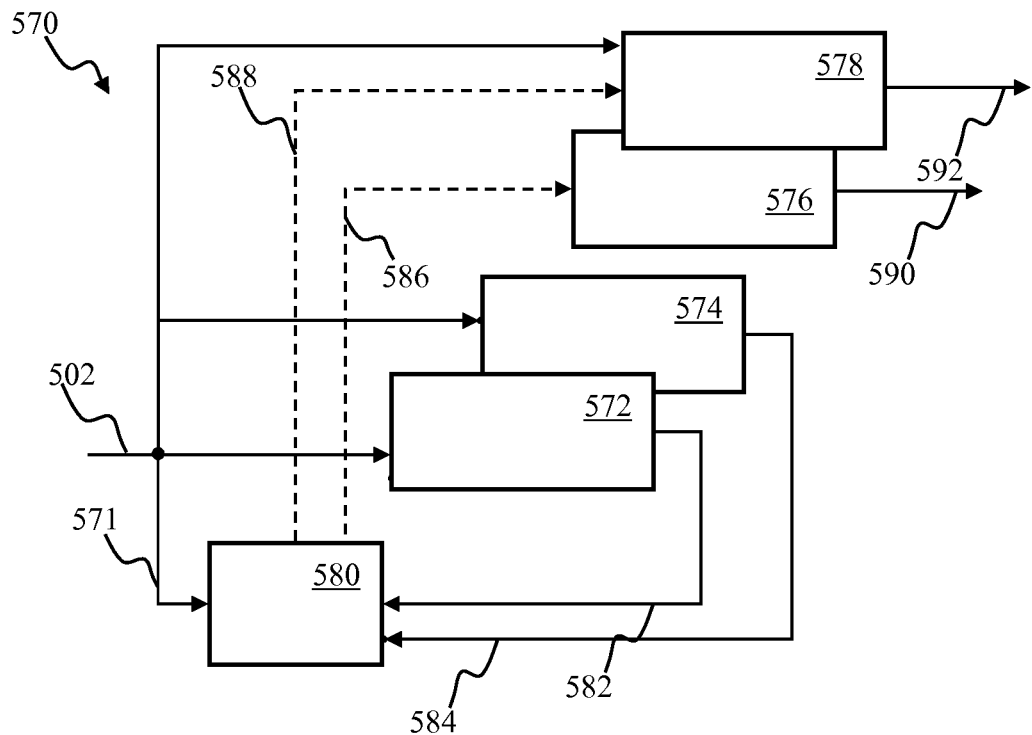
FIG. 5C is a block diagram illustrating an adaptive controller comprising an arbitrator apparatus coupled to a hierarchy of predictors, according to one or more implementations.

FIG. 5B illustrates a spiking neuron network arbitrator apparatus configured to implement inhibition-based arbitration, according to one or more implementations. The arbitrator 540 may comprise spiking neuron units 542, 544 configured to receive inputs via connections 532, 534, respectively, and to provide outputs via connections 546, 548, respectively. In some implementations, the inputs 532, 534 may comprise predicted signals provided by one or more predictor (e.g., 304, 306, 308 in FIG. 3A, and/or 522, 524 in FIG. 5). In one or more implementations, the signals 532, 534 may comprise control signals configured to execute two or more actions (e.g., go forward/go backward and/or other actions). The feed-forward input signals 532, 534 may be configured to provide excitatory input characterized by excitatory efficacy denoted by open circles (e.g., 533 in FIG. 5B) to the spiking units 512, 514.

The arbitrator 540 network may comprise inhibitory lateral connections 541, 543 between the units 542, 544. The connections 541, 543 may be configured to provide inhibitory input characterized by an inhibitory efficacy denoted by solid circles (e.g., 545 in FIG. 5A) from one of the spiking units 512, 514 to another.

The arbitrator 540 may be provided with a signal 536. The signal 536 may comprise context (e.g., 501 in FIG. 5A). In some implementations, the arbitrator may be operable in accordance with a reinforcement learning process and the signal 536 may comprise positive and/or negative reinforcement signal. In one or more implementations, wherein the arbitrator may be operable in accordance with a supervised learning process, the input 536 may comprise supervisory teaching signal.

In absence of inhibition, the units 542, 544 may be configured to relay the received input (e.g., 532, 534) to the output (e.g., 546, 548, respectively). The inhibitory efficacy provided via the connections 541, 543 may be utilized in order to effectuate provision of a single output (e.g., 546 or 548) by the arbitrator responsive to the receipt of multiple inputs. This selection process may be referred to as input arbitration.

FIG. 6A presents an exemplary timing diagram depicting winner-takes-all arbitration based on an inhibition mechanism useful with the apparatus 540 of FIG. 5B, according to one or more implementations. In panel 600, traces 601, 602 depict input into a first and a second units (e.g., the inputs 532, 534 into the units 542, 544 in FIG. 5B); traces 603, 604 depict excitability of the first and the second units; traces 605, 606 depict output into the first and the second units (e.g., the outputs 546, 548 in FIG. 5B); and traces 608, 607 depict inhibitory efficacy provided to the first and the second units (e.g., via the connections 541, 543, respectively, in FIG. 5B) as a function of time.

As shown in FIG. 6A, at time T1 an input spike 612 may arrive at the second unit. The input spike 612 may cause an increase in the second unit excitability, as illustrated by broken line curve 614 in FIG. 6A. Based on the second unit excitability breaching a threshold (denoted by the broken line 610 in FIG. 6A), the second unit may provide an output spike 616. The output spike 616 may be interpreted as relaying of the unit input to the output (e.g., the input 534 to the output 548 in FIG. 5B). Based on the second unit providing the output, inhibitory efficacy provided to the first unit by the second unit may be increased, as illustrated by broken line curve 618. The inhibitory signal 618 may be characterized by a magnitude and a duration denoted 619.

At time T2>T1, an input spike 611 may arrive at the first unit. The input spike 611 may cause an increase in the first unit excitability. Based on the spike 611 occurring within the duration 619 of the inhibitory signal 618, the first unit excitability increase may be reduced, as compared to the first unit excitability in absence of the inhibitory signal 618. As illustrated by the broken line curve 615, the combined excitability of the first unit responsive to the spike 611 may remain below the firing threshold 609. As the first unit may inhibited from providing an output at time T2, the input 601 may not be relayed to the output. The diagram in panel 600 illustrates inhibition based winner takes all arbitration wherein the second input 602 is selected and the first input is suppressed.

FIG. 6B illustrates learning of arbitration based on reinforcement learning, according to one or more implementations. The timing diagram illustrated in panel 620 may be used to describe training of the arbitrator 540 of FIG. 5B. In panel 620, traces 621, 622 depict input into a first and a second units (e.g., the inputs 532, 534 into the units 542, 544 in FIG. 5B); traces 623, 624 depict excitability of the first and the second units; traces 625, 626 depict output into the first and the second units (e.g., the outputs 546, 548 in FIG. 5B); and traces 628, 627 depict inhibitory efficacy provided to the first and the second units (e.g., via the connections 541, 543, respectively, in FIG. 5B) as a function of time.

As shown in FIG. 6B, during training at time T1 an input spike 632 may arrive at the second unit. The input spike 632 may cause an increase in the excitability of the second unit, as illustrated by broken line curve 634 in FIG. 6B. Based on the second unit excitability breaching a threshold (denoted by the broken line 629 in FIG. 6B), the second unit may provide an output spike 636. The output spike 636 may be interpreted as relaying of the unit input to the output (e.g., the input 534 to the output 548 in FIG. 5B). Based on the second unit providing the output 636, inhibitory efficacy provided to the first unit by the second unit may be increased, as illustrated by broken line curve 638. The inhibitory signal 638 may be characterized by a magnitude (denoted 640) and duration.

At time T2>T1 an input spike 631 may arrive at the first unit. The input spike 631 may cause an increase in the first unit excitability. Based on the spike 631 occurring outside the duration of the inhibitory signal 638, the excitability of the first unit may breach the threshold 639 responsive to the input 631. This is illustrated by the broken line curve 633. Based on the first unit excitability breaching the threshold 639, the first unit may provide an output spike 635.

Signal timing corresponding to time instances T1, T2 in FIG. 6B, illustrates that both of the inputs being relayed as the output. Responsive to two (or more) outputs being provided, a teaching signal may be provided to the arbitrator (e.g., 540 in FIG. 5B). The teaching signal may comprise negative reinforcement spike 650 configured to indicate that arbitrator performance associated with processing of signals at times T1, T2 is not in accord with target performance. In one or more implementations, the target performance of the arbitrator may comprise relaying more than one of the inputs to the output (e.g., two output spikes 635, 636 in FIG. 6B).

At time T3>T2 another input spike 642 may arrive at the second unit. The input spike 642 may cause an increase in the excitability of the second unit, as illustrated by broken line curve 644 in FIG. 6B. Based on the second unit excitability breaching a threshold (denoted by the broken line 629 in FIG. 6B), the second unit may provide an output spike 646. The output spike 646 may be interpreted as relaying of the unit input to the output (e.g., the input 534 to the output 548 in FIG. 5B). Based on the second unit providing the output 646, inhibitory efficacy provided to the first unit by the second unit may be increased, as illustrated by broken line curve 648. Based on the occurrence of the negative reinforcement signal (e.g., 650) prior to the occurrence of the output 644, the magnitude 649 of the inhibitory signal 648 may be configured greater than the magnitude 640 of the inhibitory signal.

At time T4>T3, an input spike 641 may arrive at the first unit. The input spike 641 may cause an increase in the first unit excitability. Based on the presence of the inhibitory efficacy of greater magnitude (as compared to the magnitude 640 at time T2) at time T4 and the spike 641 occurring within the duration of the inhibitory signal 648, the first unit excitability increase at time T4 may be diminished, as compared to the first unit excitability increase at time T2. As illustrated by the broken line curve 643, the combined excitability of the first unit responsive to the spike 641 may remain below the firing threshold 639. The first unit may be inhibited from providing an output at time T4 so that the input 641 may not be relayed to the output. The diagram in panel 600 illustrates reinforcement learning of inhibition-based winner takes all arbitration wherein the second input 622 is selected and the first input 621 is suppressed at time instances T3-T4.

While the inhibition based arbitrator operation described above with respect to FIGS. 6A-6B utilizes magnitude-modulated inhibition (e.g., signals 638, 648) other implementations may be utilized. In one or more implementations, spike latency (time-delay), spike rate, and/or frequency modulation, may be employed in order to effectuate the inhibition-based arbitration.

Based on execution of one or more operations described above with respect to FIG. 6B, the arbitrator (e.g., 560 in FIG. 5C) may learn to develop an association between a combination of the sensory context (e.g., obtained from the signal 501, 536, 567 in FIGS. 5A-5C), predictor input (e.g., 532/534 or 582/584), and teaching input (e.g., reinforcement input).

In some implementations, the mapping may be used to characterize a relationship between (i) predictor input and the sensory context and (ii) arbitrator output (same dimension as predictor input), and that learning this mapping is based on the teaching input (may comprise a combination of supervised and reinforcement signal).

In one or more implementations, the association learning process may be configured based on one or more look-up tables (LUT). A LUT may be configured to comprise one or more columns configured to store occurrence of how many times a given control action has been selected for a given input. Responsive to a selection of a given control action (activate Out2 to produce the output 646 in FIG. 6B) based on the context (e.g., the sensory and/or reinforcement input), a counter N for that action may be incremented. In some implementations of learning opposing control actions (e.g., right and left turns), responsive to a selection of one action (e.g., turn right) during learning, the counter for that action may be incremented while the counter for the opposing action (e.g., turn left) may be decremented.

In some implementations, an arbitrator (e.g., 540 in FIG. 5B) may be configured to suppress activity on all output channels (e.g., block all predicted outputs).

For example, when inhibitory efficacy is increased repeatedly based executing left turn/right turn actions during individual trials, such actions may become inhibited. Simultaneous inhibition of left/right turn actions may cause a freeze action (e.g., the robot may remain static). In some implementations, the freeze action may be configured to correspond to another predicted outcome (e.g., in addition to the left/right turn actions) that may be subject to arbitration.

In one or more implementations of arbitrating multiple action, an arbitrator (e.g., 540 in FIG. 5B) may be configured to modify one or more inputs associated with individual actions. By way of an illustration, signal associated with, e.g., turn right action, may be passed unchanged, while signal associated with, e.g., turn left action, may be, at least partly, blocked. In some implementations, output Out of the arbitrator may be characterized by the following transfer function:

$$\text{Out} = a\text{In1} + B\text{In2} \qquad \text{(Eqn. 14)}$$

where In1, In2 denote inputs associated with two actions and a, b may denote transfer parameters.

Figure 6C:
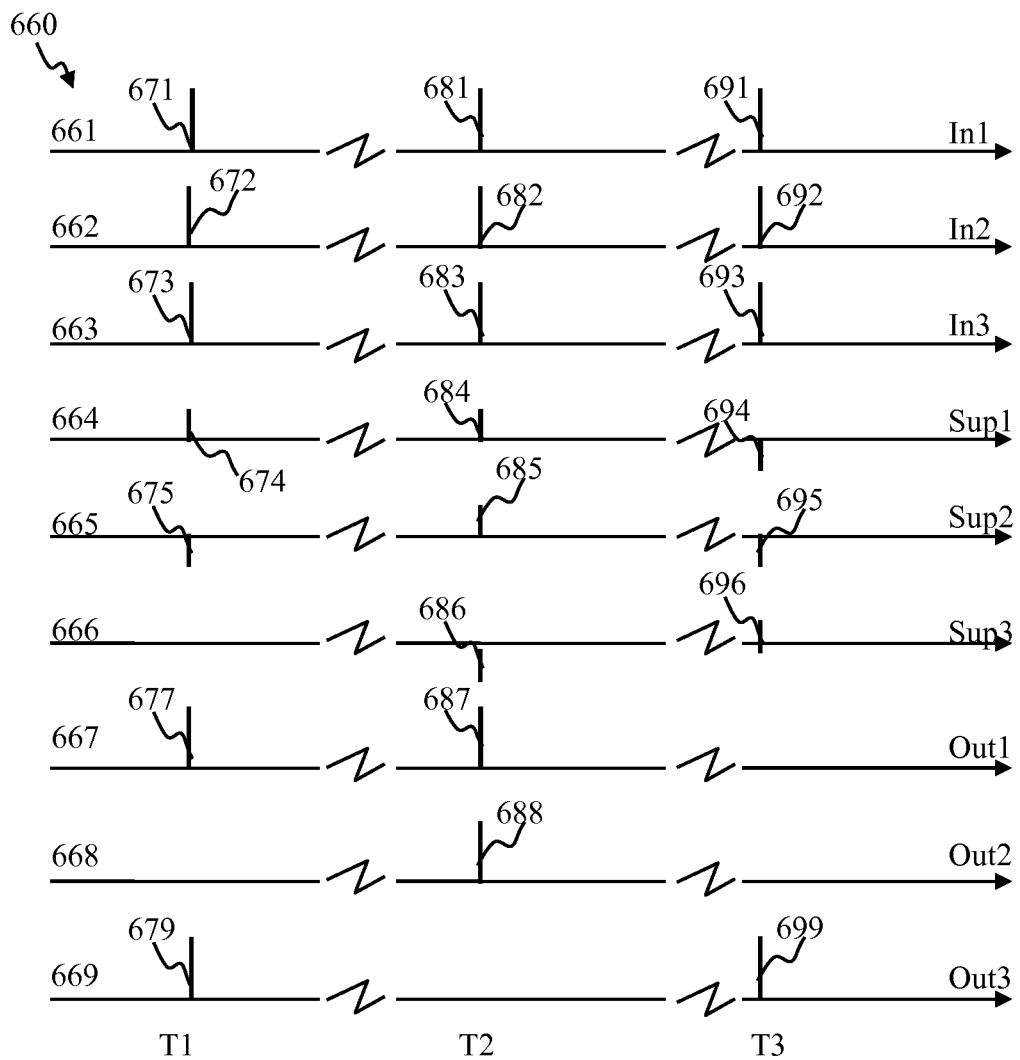
FIG. 6C is a graphical illustration depicting learning of arbitration based on supervised learning, according to one or more implementations.

FIG. 6C illustrates learning of arbitration based on supervised learning, according to one or more implementations. The timing diagram illustrated in panel 660 may be used to describe operation of an arbitrator configured to arbitrate three or more inputs (e.g., the arbitrator 310 in FIG. 3A). In one or more implementations, an arbitrator operable in accordance with the methodology described with respect to FIG. 6C may comprise a spiking neuron network (e.g., comprising multiple neurons 542 of FIG. 5B). In panel 660, traces 661, 662, 663 depict activity first, second and third input channels, traces 664, 665, 666 depict first, second and third supervisory signal channels; and traces 667, 668, 669 depict first, second and third output channels as a function of time.

In one or more implementations of a robotic rover apparatus, individual input channels 661, 662, 663 may correspond to activation of left wheel motor, right wheel motor and brakes, respectively. The supervisory signals 664, 665, 666 may be provided by a supervisor agent in accordance with a control policy. In one or more implementations, the supervisor agent may comprise a user and/or a computerized agent (e.g., an adaptive controller). The control policy may be based on navigating a trajectory using one or more of parameters, such as: shortest time, shortest path, maximum distance from an obstacle, lowest energy use, and/or other criteria. In some implementations, the methodology described with respect to FIG. 6C may be utilized to arbitrate multiple conflicting or incompatible actions. In one or more implementations, the methodology described with respect to FIG. 6C may be utilized to arbitrate multiple conflicting as well as compatible actions. As used herein, the terms incompatible, conflicting, clashing, antagonistic, mutually exclusive actions may be used to describe actions wherein: (i) executing one action may prevent execution of another action at the same time (e.g., stop/go forward, turn left/right, rotate camera lens right while maintaining focus on a stationary object, and/or other actions); executing two actions contemporaneously (e.g., left/right turn) may cause negative reinforcement signal (e.g., pain due to a collision caused by forward motion towards an obstacle); two actions may contend for a given control resource (e.g., left/right turn actions activating the same motor); and/or executing two actions contemporaneously may cause an unpredictable outcome. As used herein, the terms compatible, non-conflicting, not mutually exclusive actions may be used to describe actions wherein executing one action allow for execution of another action at the same time (e.g., stop/focus, pan rotate camera lens right while tracking and focusing on a moving target, walk and talk, and/or other actions).

Figure 14:
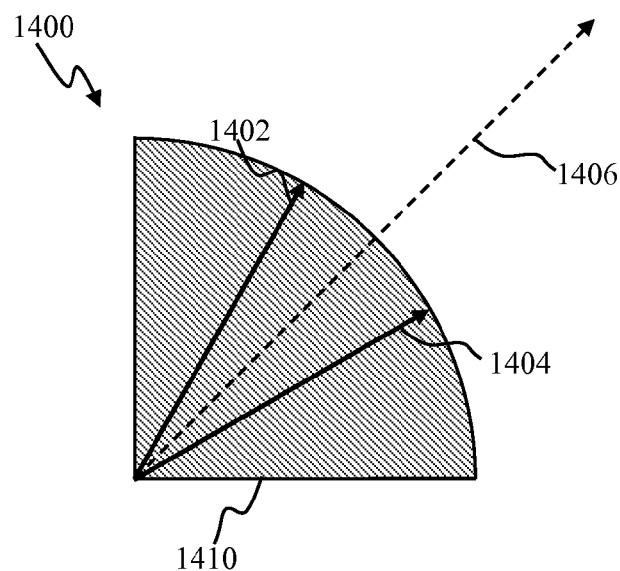
FIG. 14 is a graphical illustration depicting action compatibility, according to one or more implementations.

FIG. 14 illustrates action compatibility, according to one or more implementations. Diagram of FIG. 14 may be utilized in describing actions of the rover 1022 navigating a trajectory. For clarity, the state space 1400 in FIG. 14 is illustrated in two dimensions, although other state space dimensionality may be utilized. By way of illustration, the dimensions of the state space 1400 may be selected form rover spatial coordinates (e.g., (x,y)), speed, acceleration, power use, motor torque, motor position, wheel angle, and/or other parameters. The hashed segment 1410 in FIG. 14 may denote a portion of the state space 1400 corresponding to allowable actions (e.g., the allowable states). In one or more implementations, determination of the allowable states corresponding to the allowable actions may be based on one or more of control policy, physical configuration of the robotic platform, sensory input (e.g., presence and/or location of targets/obstacles), and/or other parameters. An arbitrator may be configured to receive signals configured to cause the robotic platform to navigate the trajectory. The trajectory may be characterized by one or more actions denoted by vectors 1402, 1404 within state space 1400. Contemporaneous execution of the actions associated with the vectors 1402, 1404 may be depicted by a vector 1406 configured based on a vector sum of the individual action vectors 1402, 1404. As shown in FIG. 14, the sum vector 1406 extends outside the allowable state space portion 1410 thereby indicating a non-allowable action. Actions, whose contemporaneous execution may result in a non-allowable action (e.g., outside the allowable state space portion) may be referred to as incompatible and/or conflicting.

As shown in FIG. 6C, at time T1, input spikes 671, 672, 673 may be present on channels 661, 662, 663. The supervisor may determine that a right turn may be executed in accordance with the trajectory. The supervisory input may comprise one or more of positive signal 674 on channel 664 (e.g., "activate left motor"), negative signal 675 on channel 665 (e.g., "do not activate right motor"), and/or other signals. Positive/negative signal on a given supervisory channel (e.g., Sup1 664) may be used to signal to the arbitration process that output on the respective output channel (e.g., Out 1 661) may be provided/suppressed, respectively. In one or more implementations, the remaining supervisory channels (e.g., Sup3 channel 666) may remain inactive indicating that output channel Out3 669 may or may not contain output responsive to presence/absence of activity on the respective input channel (e.g., In3 663). It will be appreciated by those skilled in the arts that other implementations of supervisory inputs may be employed including, for example, signals of different magnitude (e.g., 1, 0.5, 0), frequency, phase, duration, repetition rate, and/or other, e.g., using a clicker device such as described in co-owned U.S. patent application Ser. No. 13/841,980 entitled "ROBOTIC TRAINING APPARATUS AND METHODS", filed Mar. 15, 2013 and issued as U.S. Pat. No. 8,996,177 on Mar. 31, 2015, the foregoing being incorporated herein by reference in its entirety.

Based on the receipt of the input 671 and positive supervisory signal 674 at time T1, the arbitrator may be configured to activate the output channel 667 and to produce output 677. Based on the receipt of the input 672 and negative supervisory signal 675 at time T1, the arbitrator may be configured to suppress the output channel 668. Based on the receipt of the input 673 and absence of the supervisory signal on channel 666 at time T1, the arbitration process may be configured to activate the output channel 669 and to produce output 679.

At time T2, input spikes 681, 682, 683 may be present on channels 661, 662, 663. The supervisor may determine that a forward approach may be executed in accordance with the trajectory. The supervisory input may comprise: positive signals 684, 685 (e.g., "activate left motor" and activate "right motor") present on channels 664, 665, respectively; and negative signal 686 (e.g., "do not activate brakes") present on channel 666.

Based on the receipt of the inputs 681, 682 and positive supervisory signals 684, 685 at time T2, the arbitrator may be configured to activate the output channels 667, 668 and to produce outputs 687, 688. Based on the receipt of the negative supervisory signal 686 at time T2, the arbitrator may be configured to suppress the output channel 669. Based on the receipt of the input 673 and absence of the supervisory signal on channel 666.

At time T3, input spikes 691, 692, 693 may be present on channels 661, 662, 663. The supervisor may determine that a planned stop action may be executed in accordance with the trajectory. The supervisory input may comprise: negative signals 694, 695 (e.g., "do not activate left motor" and do "not activate right motor") present on channels 664, 665, respectively; and positive signal 696 (e.g., "activate brakes") present on channel 666.

Based on the receipt of the input 693 and positive supervisory signal 695 at time T3, the arbitrator may be configured to activate the output channel 669 and to produce output 699. Based on the receipt of the negative supervisory signals 694, 695 at time T3, the arbitrator may be configured to suppress the output channels 667, 668.

Based on execution of one or more operations described above with respect to FIG. 6C, the arbitrator (e.g., 560 in FIG. 5C) may learn to develop an association between the sensory context (e.g., obtained from the signal 501, 536, 567 in FIGS. 5A-5C), predictor input (e.g., 532/534 or 582/584), and teaching input (e.g., supervisor signal 667, 668, 669). In one or more implementations, the association learning process may be configured based on one or more LUTs, e.g., as described above with respect to FIG. 6B.

FIG. 5C illustrates an adaptive control system comprising an arbitrator apparatus configured to arbitrate a hierarchy of predictors, according to one or more implementations. The system 570 may receive sensory input 502. In some implementations, the sensory input 502 may comprise the input 102 described with respect to FIG. 1, supra. All (or a portion of) the sensory input 502 may be provided to the arbitrator as shown by the arrow 571 in FIG. 5C. In one or more implementations, the signal provided via the pathway 571 may comprise a teaching signal (e.g., a reinforcement signal and/or supervisory input), e.g., as described in detail above with respect to FIGS. 5B, 6B-6C).

The control system 570 of FIG. 5C may comprise an arbitrator apparatus 580 configured to arbitrate outputs of multiple predictors 572, 574. Output of the arbitrator 580 may be provided to one or more other predictors (e.g., 576, 578 in FIG. 5C) via connections 586, 588. Broken lines 586, 588 in FIG. 5C indicate that control signals to the predictors 576, 578 may not be active simultaneously on both channels, based on the applicable arbitration policy. The predictors 572, 574, 556, 578 may be configured in a hierarchy of predictors, wherein an output of an upper predictor layer (e.g., comprising the predictors 572, 574) may be provided as an input to a lower layer predictor (e.g., 576, 578 in FIG. 5C). In one or more implementations, individual predictors 572, 574, 576, 578 may comprise the adaptive predictor 222 described above with respect to FIG. 2. The predictor 572, 574, 576, 578 hierarchy may be developed during training, e.g., as described in U.S. patent application Ser. No. 13/842, 616 entitled "ROBOTIC APPARATUS AND METHODS FOR DEVELOPING A HIERARCHY OF MOTOR PRIMITIVES", filed Mar. 15, 2013.

In one or more implementations, the higher level predictor output may comprise an action configured to activate one or more lower level predictors. When a higher level action (e.g., approach, move forward, and/or other actions) is configured to activate multiple lower level predictors (e.g., activate right and left motors, and/or deactivate brakes) such action may be referred to as a composite action.

Figure 12:
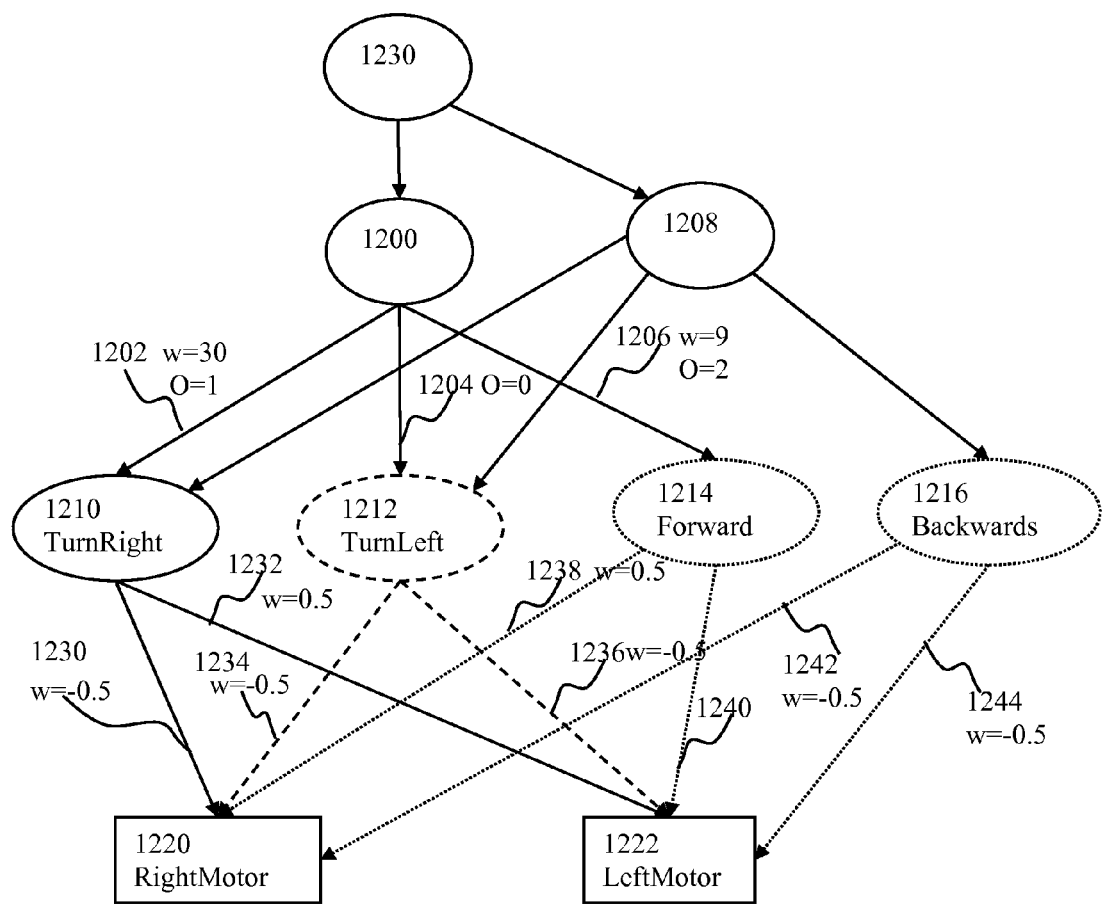
FIG. 12 is a graphical illustration depicting a hierarchy of control actions for use with an adaptive control system of e.g., FIGS. 5C-5D, according to one or more implementations.

FIG. 12 illustrates one example of a hierarchy of actions for use with, for example, controller of FIG. 3B. An action indication 1200 may correspond to a higher level composite action, e.g., 'approach', 'avoid', 'fetch', and/or other. Several action indications may also recruit the same composing actions but with different weights (e.g., "approach cautiously"). The composite action indication 1200 may be configured to trigger execution of or more actions 1210, 1212, 1214 (also referred to as sub-tasks). The sub-tasks 1210, 1212, 1214 may correspond to lower level (in the hierarchy of FIG. 12) actions, such as 'turn right', 'turn left', 'go forward', respectively.

The sub-tasks (e.g., 1210, 1212, 1214 in FIG. 12) may be associated with one (or more) control signal instructions, e.g., signal 208 and/or 314, 316, 318 described with respect to FIGS. 2-3A, supra. Individual second level sub-tasks (e.g., 1210, 1212, 1214 in FIG. 12) may be configured to invoke one or more lower (e.g., third in FIG. 12) level sub-tasks. Actions 1220, 1222 may correspond to instructions configured to activate right/left motors of the robotic platform. In some implementations, subtasks that may be invoked by one or more higher level tasks and that may be configured to provide motor control instructions may be referred to as the motor-primitives (e.g., 1220, 1222 in FIG. 12).

Subtasks of a given level (e.g., 1200, 1208 and/or 1210, 1212, 1214 in FIG. 12) may comprise one or more activation parameters associated with lower level subtasks (e.g., 1210, 1212, 1214, and/or 1220, 1222 respectively in FIG. 12). The parameters (e.g., 1202, 1204, 1206) may comprise one or more of, execution order, weight, turn angle, motion duration, rate of change, torque setting, drive current, shutter speed, aperture setting, and/or other parameters consistent with the robotic platform hardware and/or software configuration.

As illustrated in in FIG. 12, the task 1200 (e.g., approach target) may comprise a 30° right turn followed by a 9 second forward motion. The parameters 1202, 1204, 1206 may be configured as follows:
O=1, w=30;
O=0; and
O=2, w=9; respectively.

The task 1208 may correspond to avoid target and may invoke right/left turn and/or backwards motion tasks 1210, 1212, 1216, respectively.

Individual tasks of the second level (e.g., 1210, 1212, 1214, 1216 in FIG. 12) may cause execution of one or more third level tasks (1220, 1222). The parameters 1230, 1232, 1234, 1236, 1238, 1240 may be configured as follows:
to execute right turn: rotate forward left motor with torque of 0.5; (w=0.5), rotate right motor backwards with torque of 0.5; (w=−0.5);
to execute left turn: rotate right motor backwards with torque of 0.5; (w=−0.5), rotate forward right motor with torque of 0.5; (w=0.5);
to move forward: rotate forward left motor with torque of 0.5; (w=0.5), rotate forward right motor with torque of 0.5; (w=0.5); and
to move backwards: rotate left motor backwards with torque of 0.5; (w=−0.5), rotate right motor backwards with torque of 0.5; (w=−0.5).

The hierarchy illustrated in FIG. 12, may comprise another level (e.g., 1230) that may be configured to implement pursue functionality. In one or more implementations, the pursue functionality mat trigger target approach task 1200 and/or obstacle avoidance task 1208.

In one or more implementations wherein the predictor comprises a spiking neuron network, learning a given behavior (e.g., obstacle avoidance and/or target approach) may be effectuated by storing an array of efficacies of connections within the predictor network. In some implementations, the efficacies may comprise connection weights, adjusted during learning using any applicable methodologies. In some implementations, connection plasticity (e.g., efficacy adjustment) may be implemented based on the teaching input as follows:
based on a teaching input (e.g., spike) and absence of neuron output spike connections delivering input spikes into the neuron (active connection) that precede the teaching spike (within a plasticity window), may be potentiated; and/or
based on neuron output spike in absence of teaching input, active connections delivering input spikes into the neuron (active connection)) that precede the output spike (within a duration specified by plasticity window), may be depressed.

In some implementations wherein the sensory input may be updated at 40 ms intervals and/or control signal may be updated at a rate of 1-1000 Hz, the duration of the plasticity window may be selected between 1 ms and 1000 ms. Upon learning a behavior, network configuration (e.g., an array of weights) may be stored for future use by the predictor.

Individual network portions may be configured to implement individual adaptive predictor realizations. In some implementations, one network portion may implement object approach predictor while another network portion may implement obstacle avoidance predictor. Another network portion may implement a task predictor (e.g., fetch). In some implementations, predictors implemented by individual network portions may form a hierarchy of predictors. Lower-level predictors may be configured to produce control (e.g., motor) primitives (also referred to as the pre-action and/or pre-motor output). Higher level predictors may provide output comprising predicted obstacle avoidance/target approach instructions (e.g., approach, avoid).

In some implementations of a fetch task (comprising for example target approach and/or obstacle avoidance), the lower level predictors may predict execution of basic actions (so called, motor primitives), e.g., rotate left with v=0.5 rad/s for t=10 s.

Predictors of a higher level within the hierarchy, may be trained to specify what motor primitive to run and with what parameters (e.g., v, t).

At a higher level of hierarchy, the predictor may be configured to plan a trajectory and/or predict an optimal trajectory for the robot movement for the given context.

At yet another higher level of the hierarchy, a controller may be configured to determine a behavior that is to be executed at a given time, e.g. now to execute the target approach and/or to avoid the obstacle.

In some implementations, a hierarchy actions may be expressed as:

top level=behavior selection;
2nd level=select trajectory;
3rd level=activate motor primitives to execute given trajectory; and
4th level=issue motor commands (e.g. pulse-width modulated (PWM) signal for motors) to execute the given motor primitives.

In one or more implementations of hierarchy of predictors, lower level predictors may provide inputs to higher level predictors. Such configuration may advantageously alleviate the higher level predictor from performing all of the functionality that may be required in order to implement target approach and/or obstacle avoidance functionality.

The hierarchical predictor configuration described herein may be utilized for teaching a robotic device to perform new task (e.g., behavior B3 comprised of reaching a target (behavior B1) while avoiding obstacles (behavior B2). The hierarchical predictor realization may enable a teacher (e.g., a human and/or computerized operator) to divide the composite behavior B3 into two or more sub-tasks (B1, B2). In one or more implementations, performance of the sub-tasks may be characterized by lower processing requirements by the processing block associated with the respective predictor; and/or may require less time in order to arrive at a target level of performance during training, compared to an implementation wherein all of the behaviors (B1, B2, B3) are learned concurrently with one another. Predictors of lower hierarchy may be trained to perform sub-tasks B1, B2 in a shorter amount of time using fewer computational and/or memory resources, compared to time/resource budget that may be required for training a single predictor to perform behavior B3.

When training a higher hierarchy predictor to perform new task (e.g., B3 acquire a target), the approach described above may enable reuse of the previously learnt task/primitives (B1/B2) and configured the predictor to implement learning of additional aspects that may be associated with the new task B3, such as B3a reaching and/or B3b grasping).

If another behavior is to be added to the trained behavior list (e.g., serving a glass of water), previously learned behavior(s) (e.g., reaching, grasping, and/or others, also referred to as the primitives) may be utilized in order to accelerate learning compared to implementations of the prior art.

Reuse of previously learned behaviors/primitives may enable reduction in memory and/or processing capacity (e.g., number of cores, core clock speed, and/or other parameters), compared to implementations wherein all behaviors are learned concurrently. These advantages may be leveraged to increase processing throughput (for a given neuromorphic hardware resources) and/or perform the same processing with a reduced complexity and/or cost hardware platform, compared to the prior art.

Learning of behaviors and/or primitives may comprise determining an input/output transformation (e.g., the function F in Eqn. 10, and/or a matrix F of Eqn. 12) by the predictor. In some implementations, learning a behavior may comprise determining a look-up table and/or an array of weights of a network as described above. Reuse of previously learned behaviors/primitives may comprise restoring/copying stored LUTs and/or weights into predictor realization configured for implementing learned behavior.

In one or more implementations, an exemplary operation of the arbitrator 560 may be described as follows:

1. based on the presence of a target in the sensory context 502, the predictor 572 in FIG. 5C may provide move forward action indication 582 configured to cause a motor instruction to rotate wheel motor in a positive direction (e.g., clockwise);
2. based on the presence of an obstacle/danger area (e.g., table edge) in the sensory context 502, the predictor 574 may provide move backward action indication 584 configured to cause a motor instruction to rotate wheel motor in a negative direction (e.g., counterclockwise);
3. the predictor 576 may be configured to provide the positive motor instruction 590 (e.g., to rotate wheel motor clockwise);
4. the predictor 578 may be configured to provide the negative motor instruction 592 (e.g., to rotate wheel motor counterclockwise); provision of both motor instructions to the motor driver in absence of arbitration may cause an erroneous action (no movement) and/or motor damage (e.g., due to overheating);
5. the arbitrator 580 may select one of the two signals 582, 584 and relay the selected signal (e.g., 584 move backward) to the output channel (e.g., 588); the arbitrator signal selection may be based on one or more the sensory context, previously developed association between the context input and output; and/or teaching signal (e.g., reinforcement/supervisory);
6. based on the context 502 and the activation signal 588, the lower layer predictor 578 may provide motor primitive 592 configured activate appropriate motor movement consistent with the activation signal.

Figure 5D:
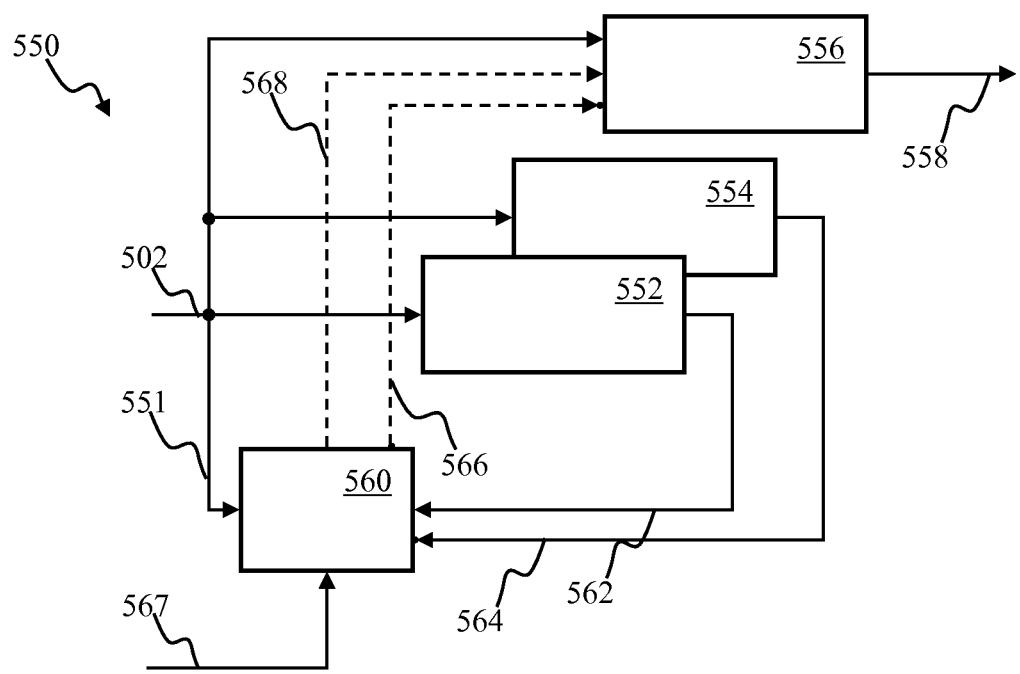
FIG. 5D is a block diagram illustrating an adaptive controller comprising an arbitrator and predictor hierarchy comprising a multi-channel predictor, according to one or more implementations.

In one or more implementations, one or more predictors of predictor hierarchy may be configured to provide multiple predicted outputs. FIG. 5D illustrates an adaptive control system comprising adaptive controller comprising an arbitrator and predictor hierarchy comprising a multi-channel predictor, according to one or more implementations. The system 550 may receive sensory input 502. In some implementations, the sensory input 502 may comprise the input 102 described with respect to FIG. 1, supra. All (or a portion of) the sensory input 502 may be provided to the arbitrator as shown by the arrow 551 in FIG. 5D. In one or more implementations, the signal provided via the pathway 551 may comprise a teaching signal (e.g., a reinforcement signal and/or supervisory input), e.g., as described in detail above with respect to FIGS. 5B, 6B-6C).

The control system 550 of FIG. 5D may comprise an arbitrator apparatus 560 configured to arbitrate outputs of multiple predictors 552, 554. Output of the arbitrator 560 may be provided to one or more other predictors (e.g., 556 in FIG. 5D) via one or more connections (e.g., 566). In some implementations, the connection 566 may be configured to carry output of the predictors 552, 554 (at different time instance). In some implementations, the connection 566 may be configured to carry (when activated) output of the predictor 552. The connection 568 may be configured to carry (when activated) output of the predictor 554. The predictors 552, 554, 556 may be configured in a hierarchy of predictors, wherein an output of an upper predictor layer (e.g., comprising the predictors 552, 554) may be provided as an input to a lower layer predictor (e.g., 556 in FIG. 5D). In one or more implementations, individual predictors 552, 554, 556 may comprise the adaptive predictor 222 described above with respect to FIG. 2. The predictor 552, 554, 556 hierarchy may be developed during training, e.g., as described above with respect to FIG. 5C.

The predictor 556 may be configured to provide predicted output 558. The output 558 may comprise motor instructions configured to be provided to a motor driver. In some implementations of robotic platform navigation, the output 558 may comprise a given motor primitive (e.g., move motor clockwise/counterclockwise, and/or other primitives).

Adaptive controller implementations illustrated in FIGS. 5C-5D may be referred to as comprising two learning modules and an adaptive arbitrator (e.g., 580 or 560 in FIGS. 5C-5D, respectively) disposed there between. In one or more implementations, the first adaptive module may comprise the predictors 572/574 or 552/554 in FIGS. 5C-5D, respectively. The second adaptive module may comprise the predictors 576/576 or 556 in FIGS. 5C-5D, respectively. The arbitrator may be trained to provide a subset of the output (learned by the second first learning module to the second adaptive module.

Figure 10A:
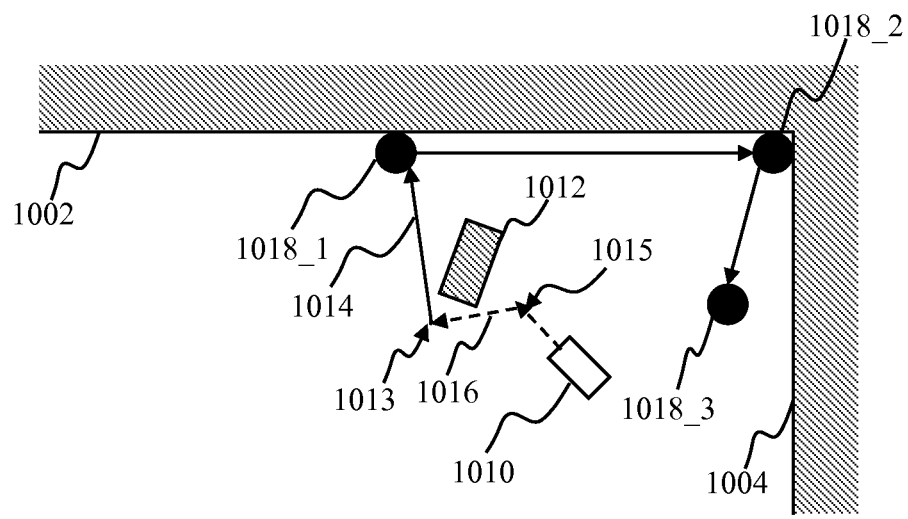
FIG. 10A is a graphical illustration depicting target tracking and obstacle avoidance training of a robotic device, according to one or more implementations.
Figure 10B:
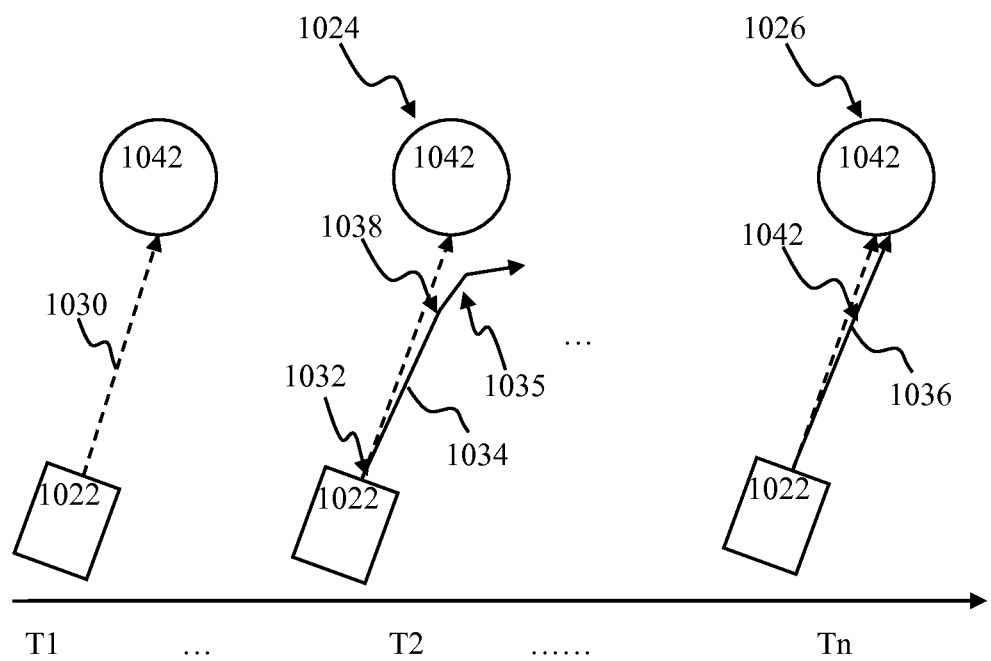
FIG. 10B is a graphical illustration depicting training a robot to perform a target approach task, according to one or more implementations.

FIG. 10A illustrates training of a robotic device (e.g., the rover 1010) configured to follow a target using results of prior training to avoid obstacles and approach targets (e.g., as that described with respect to FIG. 10B, respectively).

The rover 1010 in FIG. 10A may be configured to approach/follow a ball 1018, while avoiding obstacles (e.g., shown by hashed rectangle 1012) and/or the walls 1002, 1004 in FIG. 10A. The environment of FIG. 10A may comprise three individual targets (e.g., balls shown by solid circles 1018_1, 1018_2, 1018_3). In some implementations, the circles 1018_1, 1018_2, 1018_3 may correspond to individual positions of a ball that may be moving (e.g., by a trainer) within the environment. The trainer may utilize a remote control apparatus in order to provide training input to the rover, e.g., as indicated by arrows 1013, 1015 in FIG. 10A. In one or more implementations, the remote control apparatus may comprise an adaptive controller configured based on rover's hardware and/or operational characteristics, e.g., as described in co-owned and co-pending U.S. patent application Ser. No. 13/907,734 entitled "ADAPTIVE ROBOTIC INTERFACE APPARATUS AND METHODS", filed May 31, 2013, incorporated supra. In one or more implementations, the remote control apparatus may comprise a clicker apparatus, and training may comprise determination of a cost-function, e.g., as described in co-owned U.S. patent application Ser. No. 13/841,980 entitled "ROBOTIC TRAINING APPARATUS AND METHODS", filed Mar. 15, 2013 and issued as U.S. Pat. No. 8,996,177 on Mar. 31, 2015, the forgoing being incorporated herein by reference in its entirety. By way of a non-limiting illustration, based on the user input 1015, the rover may respond by altering its trajectory to segment 1016 thereby avoiding the obstacle 1012. Based on the user input 1013, the rover may respond by altering its trajectory to segment 1014 thereby effectuating approach to the target 1018_1. Responsive to movement of the target, the rover may continue target approach maneuvers. In some implementations, during the approach to the targets 1018_2, 1018_3, the user input may diminish with time.

Task execution (e.g. target approach and/or obstacle avoidance) may comprise development of hierarchical control functionality, e.g., described in U.S. patent application Ser. No. 13/918,298 entitled "HIERARCHICAL ROBOTIC CONTROLLER APPARATUS AND METHODS", filed Jun. 14, 2013 ("the '298 application"), incorporated supra.

As described in the '298 application, a control interface may comprise one or more controls configured to activate lower hierarchy level actions (e.g., motor primitives) and/or higher hierarchy level actions (e.g., composite actions). FIG. 10B illustrates training of a robotic rover device to approach a target. The robotic device 1022 in FIG. 10B may be configured to approach the target. In some implementations, such as described with respect to FIG. 13, the target 1042 may comprise a ball. Training may comprise a plurality of trials 1024, 1026, wherein a teacher may train the rover to approach the target, e.g., along a trajectory depicted by broken line arrow 1030. As used herein designators Tn may be used to refer to a time of a given trial (e.g., T1 denoting time off trial 1020). In some implementations, the teacher may comprise a human trainer.

The robotic rover may comprise an adaptive controller, comprising multiple predictors and an arbitrator (e.g., the controller 200 of FIG. 2 and/or 580 of FIG. 5C). Prior to performing arbitration operations described herein, the controller predictors may be trained to provide approach/avoidance action indicators, e.g., as described in U.S. patent application Ser. No. 13/918,298 entitled "HIERARCHICAL ROBOTIC CONTROLLER APPARATUS AND METHODS", filed Jun. 14, 2013, incorporated supra.

The rover 1022 may be configured to utilize optical flow for target approach/obstacle avoidance. In one or more implementations, the rover may comprise a camera, e.g., as described in detail below with respect to FIG. 11.

Figure 13:
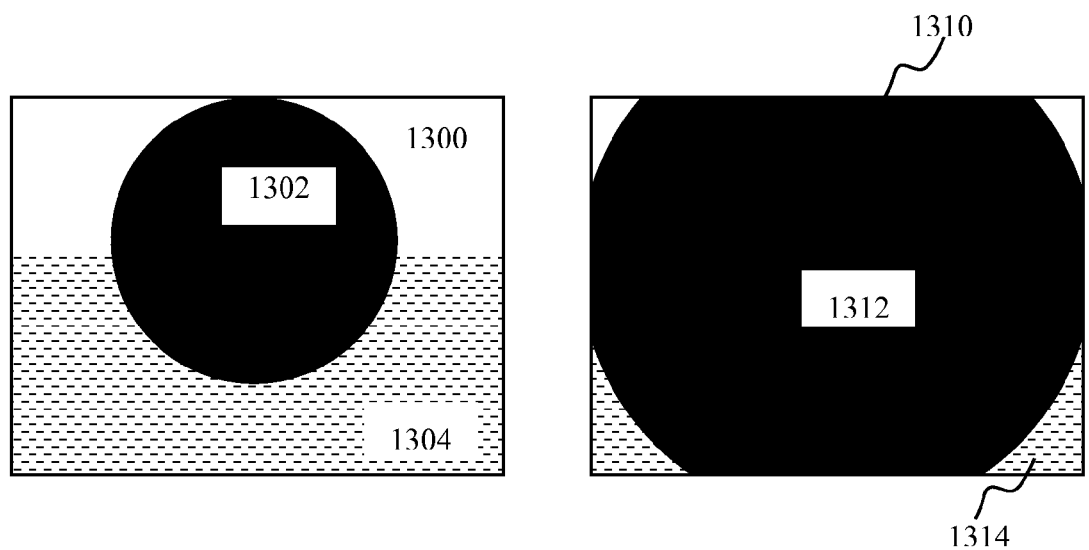
FIG. 13 is a graphical illustration of exemplary visual frames depicting object appearance as a function of distance, according to one or more implementations.

FIG. 13 illustrates exemplary frames that may be obtained by the rover during traverse of the trajectory 1030. The frame 1300 may correspond to the object appearance in the rover camera at a far field distance from the target (e.g., the location 1032 in FIG. 10B); the frame 1310 may correspond to corresponding to the object appearance in the rover camera proximate to (e.g., near field of) the target (e.g., the location 1038 in FIG. 10B). In some implementations, the near/far distance may be differentiated based on a portion (e.g., 50%) of the visual field being covered by the target. The rover optical flow algorithm may utilize location and/or size of the object representation (e.g., 1302, 1312) and/or representation of a floor (shown as texture 1304, 1314 in FIG. 13) for performing tracking/avoidance maneuvers.

Returning now to FIG. 10B, during the trial 1024 the rover may proceed along trajectory 1034 based on receipt of one or more frames 1300. The rover traverse from location 1032 along the trajectory 1034 may be based on a target approach predictor providing action indication "approach". Upon approaching closer to the target (e.g., the location 1032) the rover may receive one or more frames 1310, wherein majority of the floor is masked by the object 1312. While small portions (e.g., 1314) of the floor may be visible in the frame 1310 corners, these portions, absence of the floor in front of the object may indicate presence of an obstacle to the rover control process. Based on lack of visible floor in front of the target, an obstacle avoidance predictor may provide action indication "avoid". The arbitrator of the rover controller may select the "avoid" action thereby effectuating the avoid portion 1035 of the trajectory 1034 subsequent to arrival at the location 1038.

Based on execution of the "avoid" action during the trial 1024, the arbitrator may receive a reinforcement signal (e.g., negative reinforcement). The negative reinforcement may indicate to the arbitrator that the prior selection (e.g., selection of "avoid" action) does not match the control policy objective. Such negative reinforcement may increase competition between individual actions (e.g., approach/avoid) during signal arbitration.

Increased competition may be effectuated based on an increased selectivity between signals associated with multiple actions. In one or more implementations of spiking predicted signals (e.g., as described above with respect to FIGS. 6A-6B), increased selectivity may be configured based on an increased duration of the inhibitory signal, e.g., the duration 619 of FIG. 6A, and/or duration of signal 638 in FIG. 6B. It may be appreciated by those skilled in the arts that the above implementation is exemplary and serves to illustrate the principles of signal selection. Various selectivity implementations may be utilized with signal arbitration described herein, such as, e.g., increasing signal discrimination by setting progressively narrower range of signal magnitude, frequency, phase, and/or other signal property. A given predicted signal (e.g., 582 in FIG. 5C) characterized by the signal property falling within the reduced range may be selected as active and communicated to the output of the arbitrator (e.g., 586). One or more predicted signals (e.g., 584 in FIG. 5C) characterized by the signal property falling outside the reduced range may be restricted such that they are not communicated to the output of the arbitrator.

At a subsequent trial (e.g., 1026 in FIG. 10B), upon arrival at the location 1042 of the trajectory 1036, the rover arbitrator may select the approach action over the avoid action based on the reinforcement from prior trials. It is noteworthy, that two or more trials 1024 (wherein reinforcement is provided to the arbitrator) may be performed.

In one or more implementations, the arbitrator may receive teaching signal during the trial 1026 while navigating the trajectory 1036. Such teaching signal may comprise supervisory signal (e.g., described with respect to FIG. 6C above) configured to indicate to the rover "approach" action selection.

FIGS. 8A-9B illustrate methods of training and/or operating an adaptive arbitrator apparatus of the disclosure in accordance with one or more implementations. The operations of methods 800, 820, 840, 900, 920 presented below are intended to be illustrative. In some implementations, methods 800, 820, 840, 900, 920 may be accomplished with one or more additional operations not described, and/or without one or more of the operations discussed. Additionally, the order in which the operations of methods 800, 820, 840, 900, 920 are illustrated in FIGS. 10A-10C described below is not intended to be limiting.

In some implementations, methods 800, 820, 840, 900, 920 may be implemented in one or more processing devices (e.g., a digital processor, an analog processor, a digital circuit designed to process information, an analog circuit designed to process information, a state machine, and/or other mechanisms for electronically processing information and/or execute computer program modules). The one or more processing devices may include one or more devices executing some or all of the operations of methods 800, 820, 840, 900, 920 in response to instructions stored electronically on an electronic storage medium. The one or more processing devices may include one or more devices configured through hardware, firmware, and/or software to be specifically designed for execution of one or more of the operations of methods 800, 820, 840, 900, 920.

Figure 8A:
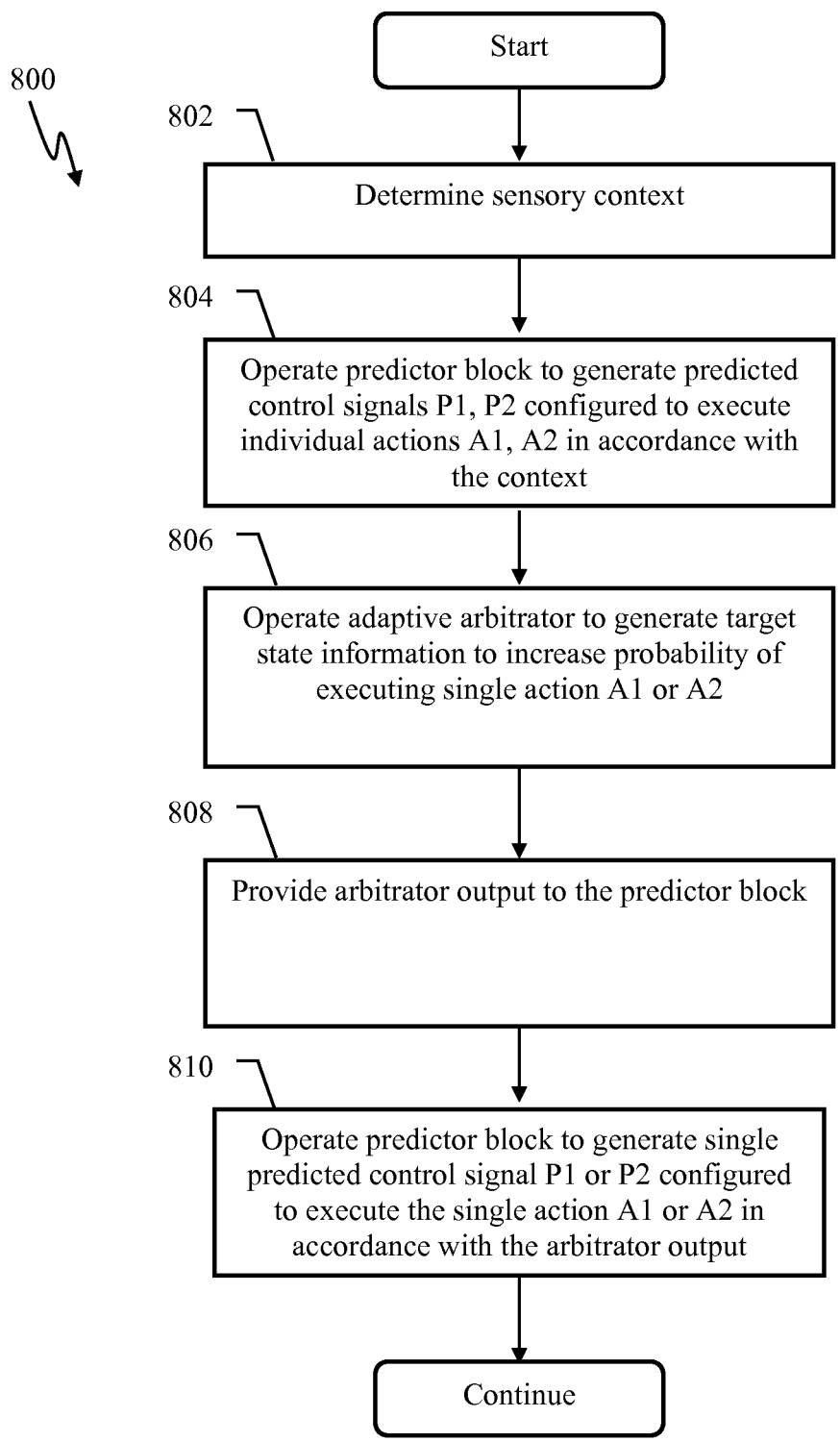
FIG. 8A is a logical flow diagram illustrating a method of task execution based on adaptive arbitration of predictor outputs, in accordance with one or more implementations.

FIG. 8A illustrates a method of action execution by a robotic device based on adaptive arbitration of predictor outputs, in accordance with one or more implementations.

At operation 802 of method 800, illustrated in FIG. 8A, context may be determined by a controller of the robotic device. In some implementations, the context may comprise one or more spatio-temporal aspects of sensory input (e.g., 206 in FIG. 2) and/or robotic platform feedback (216_1 in FIG. 2). In one or more implementations, the context may comprise a teaching signal (e.g., reinforcement and/or supervisory). The sensory aspects may include an object being detected in the input, a location of the object, an object characteristic (color/shape), a sequence of movements (e.g., a turn), a characteristic of an environment (e.g., an apparent motion of a wall and/or other surroundings, turning a turn, approach, and/or other environmental characteristics) responsive to the movement. In some implementations, the sensory input may be received based on performing one or more training trials (e.g., as the trials described with respect to FIG. 10B.

At operation 804, predictor block may be operated in order to provide predicted control signals P1, P2 configured to execute individual actions A1, A2 in accordance with the context determined at operation 802. In one or more implementations, the predictors may comprise predictors 222, 404, 406, 408 of FIGS. 2, 4 and predictor operation may comprise operations described above with respect to FIG. 2. The actions A1, A2 may comprise incompatible and/or conflicting actions. In one or more implementations, the actions A1, A2 may utilize a given resource of the robotic platform (e.g., a motor, and/or an action indication of lower hierarchy level as described with respect to FIG. 12). Execution of motor instructions associated with the action A1 may be incompatible with execution of motor instructions associated with the action A2, so that contemporaneous execution of the actions A1, A2 may result in an outcome that is different when the actions A1, A2 are executed independent from one another. By way of a non-limiting example, the action A1 may comprise left turn, the action A2 may comprise right, and simultaneous activation of these actions may cause forward motion and/or no motion. The predicted signals P1, P2 may comprise signals 434, 436, 438 in FIG. 4.

At operation 806 an adaptive arbitrator may be operated in order to select a given control signal S from P1, P2. The selected control signal S may be configured to cause execution of a single action A1 or A2. Selection of the signal S may be based on one or more methodologies described herein, including, e.g., inhibition based WTA approach described above with respect to FIG. 6A, reinforcement learning and/or supervised learning approach described above with respect to FIG. 6B-6C, respectively.

At operation 808, the arbitrated control signal S may be provided to the predictor block. In one or more implementations, the arbitrator output may comprise a predicted target state associated with a given task (e.g., the frame 1502 or 1504 in FIG. 15). In some implementations, the target state (predictor output) description may comprise a forward model; the predicted action indication may be encoded using a variety of encoding approaches, and may reflect a target state.

At operation 810, the predictor block may be configured to provide single predicted control signal P1 or P2 configured to execute the single action A1 or A2 in accordance with the arbitrator output. In one or more implementations, the predictor operation may comprise operations described above with respect to FIG. 15.

Figure 8B:
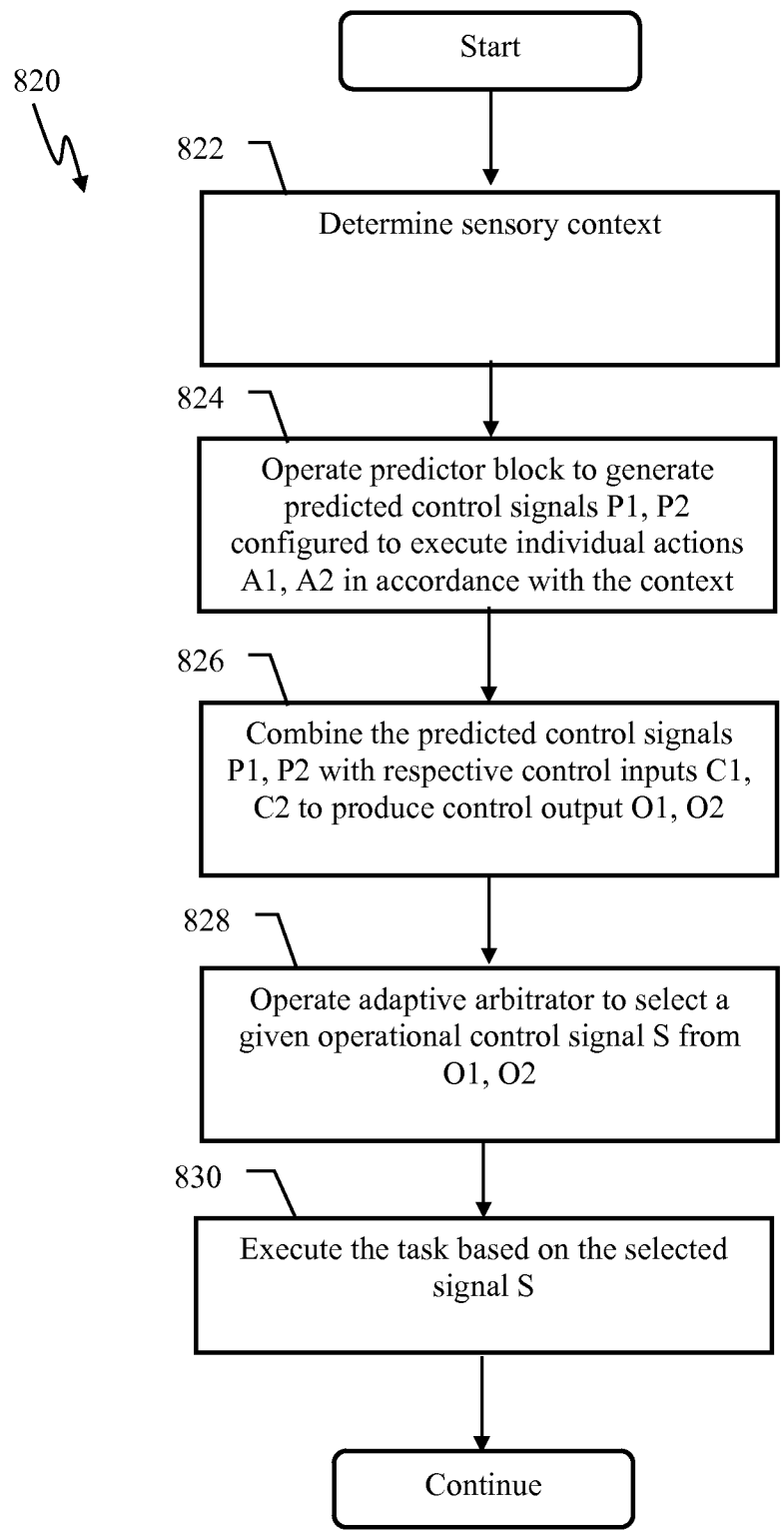
FIG. 8B is a logical flow diagram illustrating a method of task arbitration by adaptive arbitration of combiner outputs, in accordance with one or more implementations.

FIG. 8B illustrates a method of action selection by adaptive arbitration of combiner outputs, in accordance with one or more implementations. In some implementations, operations of method 820 may be performed by an adaptive controller apparatus comprising one or more combiners (e.g., the apparatus 400 of FIG. 4).

At operation 822 of method 820 illustrated in FIG. 8B, context may be determined. In some implementations, the context may comprise one or more sensory input robotic platform feedback, and/or a teaching signal, e.g., as described above with respect to FIG. 8A.

At operation 824, predictor block may be operated in order to provide predicted control signals P1, P2 configured to execute individual actions A1, A2 in accordance with the context determined at operation 802. In one or more implementations, the predictors may comprise predictors 404, 406, 408 of FIG. 4 and predictor operation may comprise operations described above with respect to FIG. 4. The actions A1, A2 may comprise incompatible and/or conflicting actions. In one or more implementations, the actions A1, A2 may utilize a common resource of the robotic platform (e.g., a motor, and/or an action indication of lower hierarchy level as described with respect to FIG. 12). Execution of motor instructions associated with the action A1 may be incompatible with execution of motor instructions associated with the action A2, so that contemporaneous execution of the actions A1, A2 may result in an outcome that is different when the actions A1, A2 are executed independent from one another. By way of a non-limiting example, the action A1 may comprise left turn, the action A2 may comprise right, and simultaneous activation of these actions may cause forward motion and/or no motion. The predicted signals P1, P2 may comprise signals 334, 336, 338 in FIG. 3A.

At operation 826, the predicted control signals P1, P2 may be combined with respective control inputs C1, C2 to produce control output O1, O2. In one or more implementations, the control inputs C1, C2 (e.g., the signals 314, 316, 318 in FIG. 3A) may be provided by a control entity (e.g., a user and/or a controller) and be configured to aid task execution during predictor training. In one or more implementations, the combination may be effectuated by the combiners 324, 326, 328 and the combiner output may be provided to the arbitrator (e.g., 310 in FIG. 3A).

At operation 828 the arbitrator may be operated in order to select a given control signal S from the combined signals O1, O2. The selected control signal S may be configured to cause execution of a single action A1 or A2. Selection of the signal S may be based on one or more methodologies described herein, including, e g, inhibition-based WTA approach described above with respect to FIG. 6A, reinforcement learning and/or supervised learning approach described above with respect to FIG. 6B-6C, respectively.

At operation 830, one of the tasks (e.g., A1 or A2) may be executed based on the selected signal S. In one or more implementations, the arbitrator output S (e.g., 566) may comprise an action indication (e.g., turn left). The signal S may comprise target state information configured to be provided to a lower level predictor of the hierarchy (e.g., the predictor 556 in FIG. 5D). Based on the receipt of the single action indication S, the lower level predictor may provide one or more motor instructions (e.g., turn motor clockwise) in order to execute the selected action.

Figure 8C:
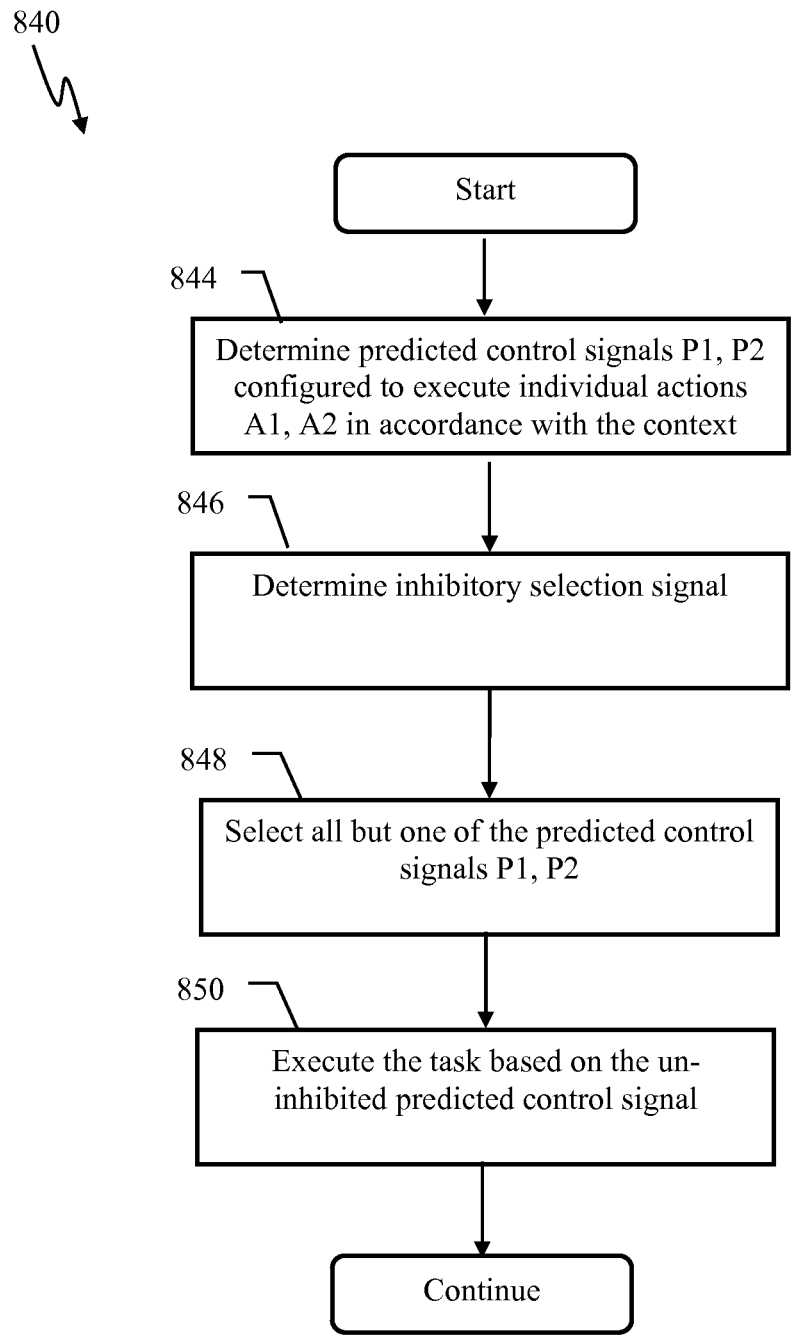
FIG. 8C is a logical flow diagram illustrating a method of task arbitration based on inhibition, in accordance with one or more implementations.

FIG. 8C illustrates a method of action arbitration based on inhibition, in accordance with one or more implementations.

At operation 844, predictor block may be operated in order to provide predicted control signals P1, P2 configured to execute individual actions A1, A2 in accordance with a context. In one or more implementations, the context may comprise one or more of sensory input (e.g., 206 in FIG. 2) robotic platform feedback (216_1 in FIG. 2), and a teaching signal (e.g., reinforcement and/or supervisory), e.g., as described above with respect to operation 802 of FIG. 8A. The predictors may comprise predictors 522, 524 of FIG. 5A and/or 572, 574 of FIG. 5C and predictor operation may comprise operations described above with respect to FIG. 2. The actions A1, A2 may comprise incompatible and/or conflicting actions. In one or more implementations, the actions A1, A2 may utilize a common resource of the robotic platform (e.g., a motor, and/or an action indication of lower hierarchy level as described with respect to FIG. 12). Execution of motor instructions associated with the action A1 may be incompatible with execution of motor instructions associated with the action A2, so that contemporaneous execution of the actions A1, A2 may result in an outcome that is different when the actions A1, A2 are executed independent from one another. The predicted signals P1, P2 may comprise signals 518, 520 in FIG. 5A and/or signals 582, 584 in FIG. 5C.

At operation 846 inhibitory selection signal may be determined. In one or more implementations, the inhibitory selection signal may comprise one or more signals 516, 526 of FIG. 5B, and/or 541, 542 in FIG. 5B. The selection signals may be configured to inhibit propagation of all but one of the predicted control signals P1, P2 determined at operation 844. In one or more implementations of spiking neuron predictors, inhibitory signal provision may be based on arrival of one or more spikes of the predicted signals P1, P2, e.g., as described above with respect to FIGS. 6A-6B.

At operation 848, all but one of the predicted control signals P1, P2 may be selected for relaying by the arbitrator based on the selection signals determined at operation 846. In one or more implementations, the arbitrator may comprise a spiking neuron network and the selection of the relayed predictor signal (e.g., P1) may be based on inhibiting the remaining predicted signals (e.g., P2). In some implementations, predicted signal inhibition may be based on mutual inhibition mechanism, e.g., as described above with respect to FIG. 6A, and/or based on reinforcement learning mechanism described with respect to FIG. 6B.

At operation 850, a given task (e.g., A1 or A2) may be executed based on the selection of the respective predicted control signal (e.g., P1, P2) at operation 848.

Figure 9A:
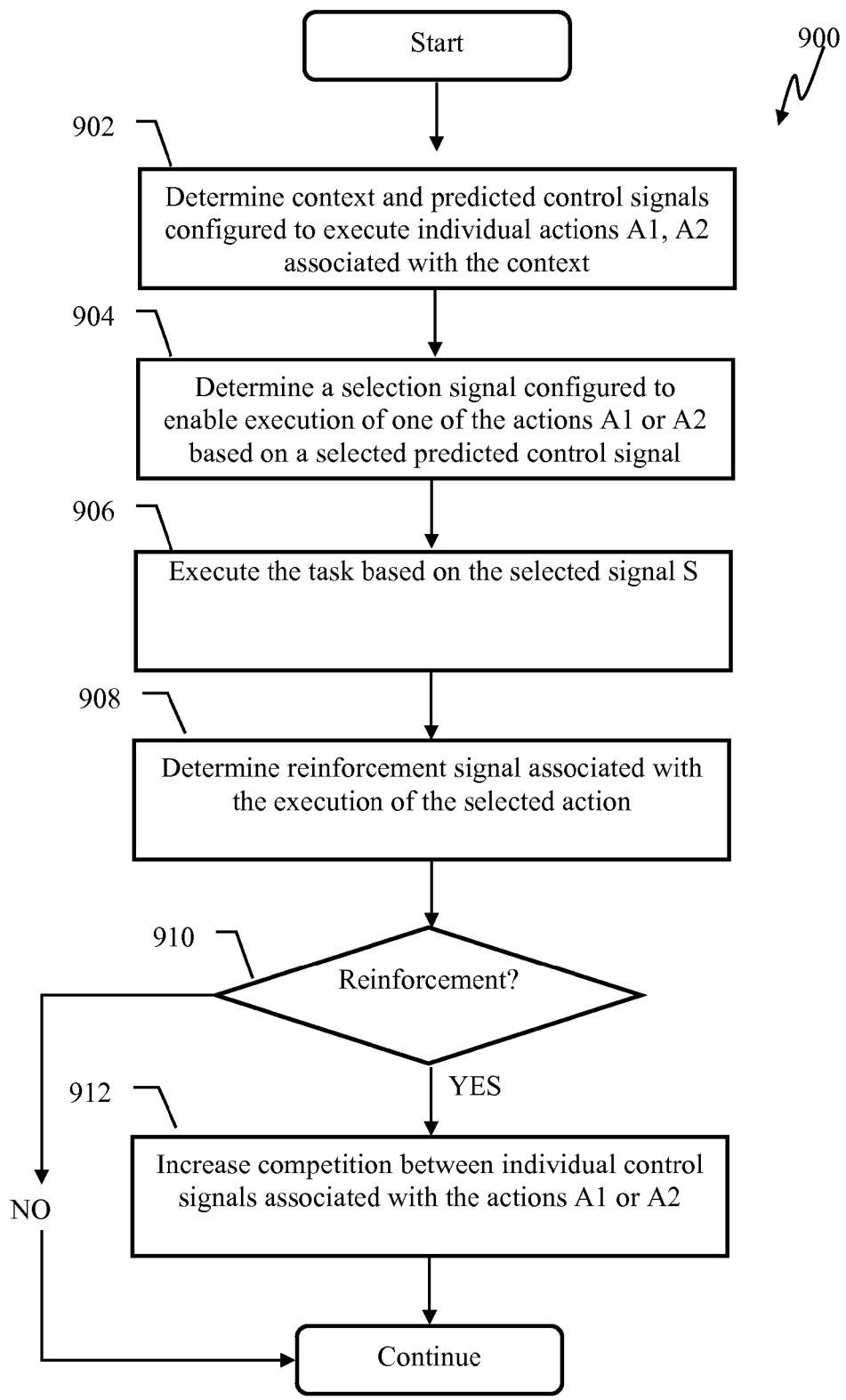
FIG. 9A is a logical flow diagram illustrating a method of reinforcement learning of task arbitration, in accordance with one or more implementations.

FIG. 9A illustrates a method of reinforcement learning of action arbitration, in accordance with one or more implementations. In some implementations, the method 900 of FIG. 9A may be implemented by an adaptive controller, e.g., the controller 570 in FIG. 5B, and/or a predictor apparatus (e.g., 540 in FIG. 5B), described supra.

At operation 902 context and predicted control signals configured to execute individual actions A1, A2 associated with the context may be determined. In one or more implementations, the context may comprise sensory input, feedback, higher level hierarchy predictor input, teaching input, and/or other information associated with context. The predicted control signals may be determined based any of the applicably methodology, such as, described, for example, in U.S. patent application Ser. No. 13/918,338 entitled "ROBOTIC TRAINING APPARATUS AND METHODS", filed Jun. 14, 2013; U.S. patent application Ser. No. 13/918, 620 entitled "PREDICTIVE ROBOTIC CONTROLLER APPARATUS AND METHODS", filed Jun. 14, 2013; and/or U.S. patent application Ser. No. 13/842,530 entitled "ADAPTIVE PREDICTOR APPARATUS AND METHODS", filed Mar. 15, 2013, the foregoing incorporated supra.

At operation 904, a selection signal may be determined. The actions A1, A2 may comprise incompatible and/or conflicting actions. The selection signal may be configured to enable execution of one of the actions A1 or A2 so as to avoid action 'clash'. In some implementations, the selection signal may comprise an inhibitory signal (e.g., 516, 526, in FIG. 5A, 541, 543 in FIG. 5B). In one or more implementations, of inhibition based arbitration, the selection signal may comprise a spike characterized by an inhibitory efficacy (e.g., 618 in FIG. 6A and/or 640, 648 in FIG. 6B).

At operation 906 the action associated with the selection signal may be executed. In one or more implementations, the action execution may be based on relaying one of the predicted control signals (e.g., the spike 612 in FIG. 6A and/or 642 in FIG. 6B) to the output (616 in FIG. 6A and/or 646 in FIG. 6B) the arbitrator. The output of the arbitrator may be provided to a motor actuator and/or lower a level predictor (e.g., the signal 586 to the predictor 576 in FIG. 5C).

At operation 908 reinforcement signal associated with the execution of the selected action at operation 906 may be determined. In one or more implementations, the reinforcement signal may be configured based on an analysis of the executed action and a target action. The analysis may be based on determining a performance measure. In one or more implementations, the performance may be determined based on a deviation between the target action (e.g., the trajectory 1030 in FIG. 10B) and the actual trajectory (e.g., the trajectory 1034, 1035 in FIG. 10B) accomplished as a result of execution of the action at operation 906. In one or more implementations, the performance may be determined based on an error measure, configured as:

$$\epsilon = |A - A^d|, \quad \text{(Eqn. 15)}$$

where A denotes the executed trajectory and $A^d$ denotes the target trajectory. Based on the performance being within the target range (e.g., the error of Eqn. 15 being below a limit), the reinforcement signal may comprise positive reinforcement. Based on the performance being outside the target range (e.g., the error of Eqn. 15 being above the limit), the reinforcement signal may comprise negative reinforcement. As described above, in some implementations, the positive reinforcement may be based on a spike characterized by excitatory efficacy, negative reinforcement may be based on a spike characterized by inhibitory efficacy. In some implementations, the positive reinforcement may be based on an absence of spike while negative reinforcement may be based on a spike. The positive reinforcement may be based on a spike characterized while negative reinforcement may be based on an absence of a spike. The positive reinforcement may be based on a spike characterized by efficacy of one while negative reinforcement may be based on a spike characterized by efficacy of less than one.

At operation 910 a determination may be made as to whether reinforcement has been provided to the arbitration process. In one or more implementations, the reinforcement signal may comprise positive/negative reinforcement, e.g., such as described in co-owned U.S. patent application Ser. No. 13/489,280, filed Jun. 5, 2012 and entitled "APPARATUS AND METHODS FOR REINFORCEMENT LEARNING IN ARTIFICIAL NEURAL NETWORKS", issued as U.S. Pat. No. 8,943,008 on Jan. 27, 2015, and/or co-owned U.S. patent application Ser. No. 13/554,980, filed Jul. 20, 2012 and entitled "APPARATUS AND METHODS FOR REINFORCEMENT LEARNING IN LARGE POPULATIONS OF ARTIFICIAL SPIKING NEURONS", each of the foregoing being incorporated herein by reference in its entirety.

Responsive to a determination that negative has occurred, the method may proceed to operation 912 wherein competition between individual predicted control signals associated with the actions A1 and A2 may be increased. In some implementations, the predicted control signals mat comprise spikes 611, 612 on channels 601, 602 in FIG. 6A and/or spikes 631, 632 on channels 621, 622 in FIG. 6B. In one or more implementations, the increased signal competition may be effectuated based on an increased selectivity between signals associated with multiple actions. In one or more implementations of spiking predicted signals (e.g., as described above with respect to FIGS. 6A-6B), increased selectivity may be configured based on an increased duration of the inhibitory signal, e.g., the duration 619 of FIG. 6A, and/or duration of signal 638 in FIG. 6B. It will be appreciated by those skilled in the arts that the above implementation is exemplary and serves to illustrate the principles of signal selection. Various other selectivity implementations may be utilized with signal arbitration described herein, such as, e.g., increasing signal discrimination by setting progressively narrower range of signal magnitude, frequency, phase, and/or other signal property. A given predicted signal (e.g., 582 in FIG. 5C) characterized by the signal property falling within the reduced range may be selected as active and communicated to the output of the arbitrator (e.g., 586). One or more predicted signals (e.g., 584 in FIG. 5C) characterized by the signal property falling outside the reduced range may be restricted (arbitrated out) and not communicated to the output of the arbitrator.

Figure 9B:
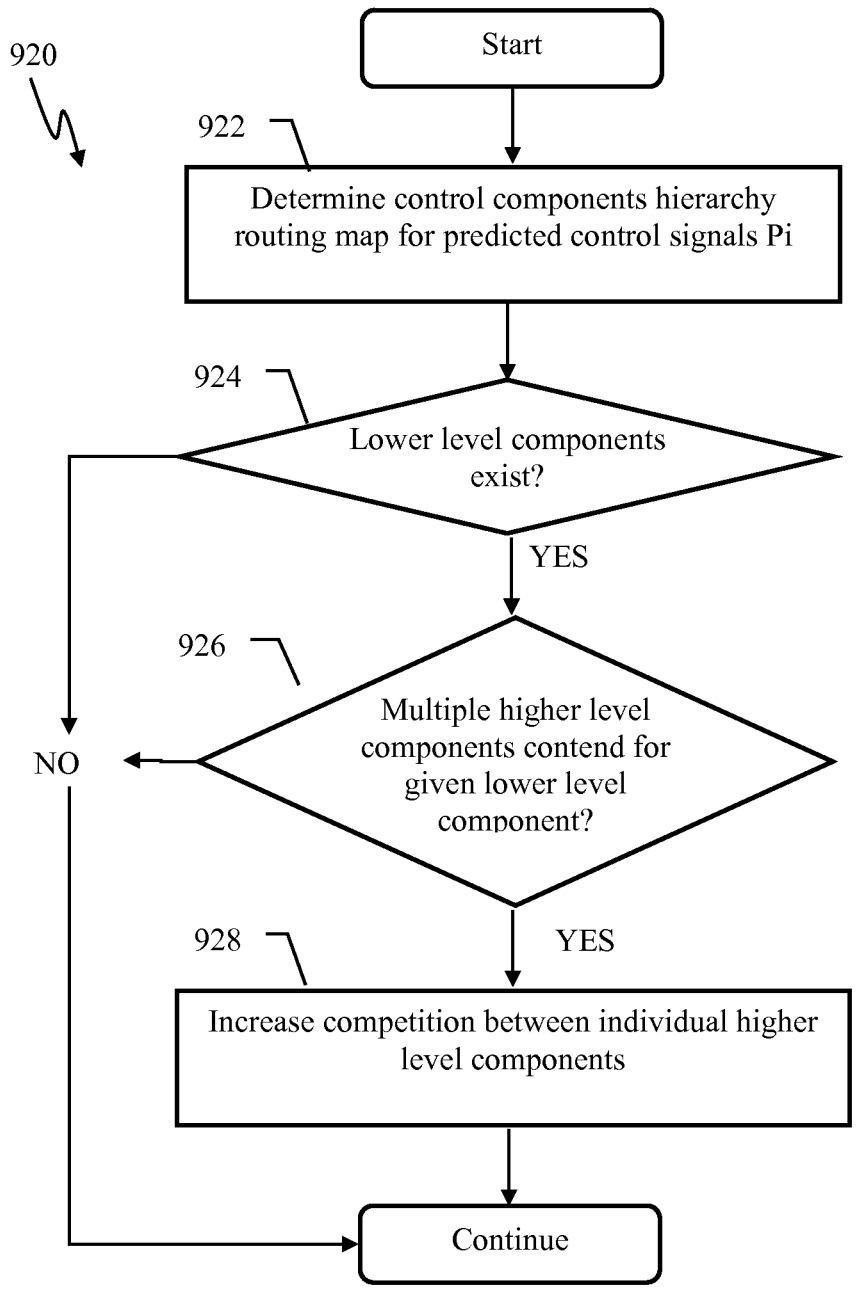
FIG. 9B is a logical flow diagram illustrating a method of hierarchical arbitration of control signals, in accordance with one or more implementations.

FIG. 9B illustrates a method of learning hierarchical arbitration of control signals, in accordance with one or more implementations.

At operation 922 a routing map for predicted control signals P1 may be determined. In some implementations, the routing map may comprise a hierarchy of multiple control components, e.g., as illustrated in FIG. 12. The control components hierarchy may be traversed.

As a part of the hierarchy traverse, at operation 924 a determination may be made as to whether a lower level component exists within the remaining portion of the hierarchy.

Responsive to a determination at operation 924 that a lower level component exists, the method may proceed to operation 926 wherein a determination may be made as to whether two or more higher-level components contend for the lower level component. By way of an illustration, left turn/right turn control actions (components 1210, 1212 in FIG. 12) may contend for the same lower level right motor control component 1220.

Responsive to a determination at operation 926 that multiple upper level components contend for the same lower level component, competition between individual higher level components may be increased. In one or more implementations, the increased competition may be based on an inhibitory mechanism, e.g., as described with respect to FIGS. 6A-6B.

In some implementations, a directed tree representation may be used to store and/or navigate multilevel action hierarchy. By way of an illustration, target approach TA action may be represented as $$TA = \{[RT], [LM=0.5, RM=-0.5]\} \quad \text{(Eqn. 16)}$$

while, obstacle avoid action may be represented as:

$$OA = \{[LT], [LM=-0.5, RM=0.5]\} \quad \text{(Eqn. 17)}$$

where:
LT, RT refer to left/right turn actions; and
RM, LM refer to left motor/right motor activation with appropriate weights.

Representations of Eqn. 16, Eqn. 17 may be utilized in order to determine conflicting actions. In one or more implementations, the tree-based arbitration framework may be employed in order to prohibit the co-activation of multiple actions that target the same lower level actions. In some implementations, co-activation of multiple actions that target the same lower level actions may cause a predictable outcome (e.g., forward/backward motion commands may cause a rover to remain stationary). Based on a determination that such new outcome (e.g., stationary action) is of use, the control apparatus (e.g., 300 of FIG. 3A, 400 of FIG. 4, 570 of FIG. 5C, 550 of FIG. 5D) may be adjusted to include the new remain statuary action into predicted action selection.

Figure 11:
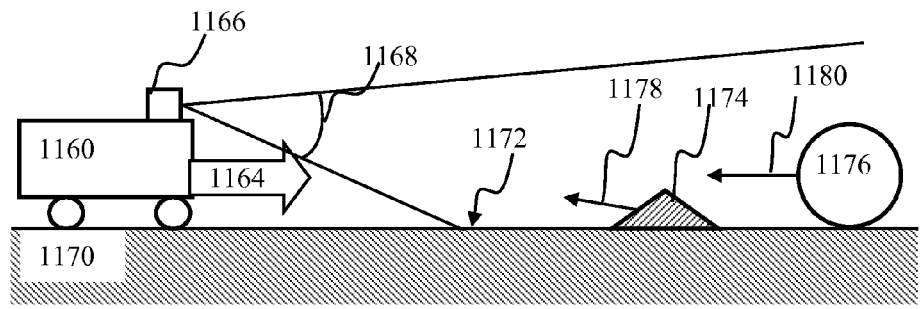
FIG. 11 is a graphical illustration depicting robotic apparatus comprising an adaptive controller apparatus of the disclosure configured for obstacle avoidance, in accordance with one or more implementations.

FIG. 11 illustrates a mobile robotic apparatus that may comprise an adaptive controller (e.g., the controller of FIG. 2). The robotic apparatus 1160 may comprise a camera 1166. The camera 1166 may be characterized by a field of view 1168. The camera 1166 may provide information associated with objects within the field of view. In some implementations, the camera 1166 may provide frames of pixels conveying luminance, refreshed at 25 Hz frame rate.

One or more objects (e.g., an obstacle 1174, a target 1176, and/or other objects) may be present in the camera field of view. The motion of the objects may result in a displacement of pixels representing the objects within successive frames, such as described in co-owned U.S. patent application Ser. No. 13/689,717, entitled "APPARATUS AND METHODS FOR OBJECT DETECTION VIA OPTICAL FLOW CANCELLATION", filed Nov. 29, 2012 and issued as U.S. Pat. No. 9,193,075 on Nov. 24, 2015, incorporated herein by reference in its entirety.

When the robotic apparatus 1160 is in motion, such as shown by arrow 1164 in FIG. 11, the optical flow estimated from the image data may comprise the self-motion component and the object motion component. By way of a non-limiting example, the optical flow measured by the rover of FIG. 11 may comprise one or more of (i) self-motion components of the stationary object 1178 and the boundary (e.g., the component 1172 associated with the floor boundary); (ii) component 1180 associated with the moving objects 1176 that comprises a superposition of the optical flow components due to the object displacement and displacement of the robotic apparatus, and/or other components. In one or more implementation, the robotic apparatus 1160 may be trained to avoid obstacles (e.g., 1174) and/or approach targets (e.g., 1176) using collaborative learning methodology of, e.g., FIG. 10B Various exemplary computerized apparatus may be utilized with the robotic training methodology of the disclosure. In some implementations, the robotic apparatus may comprise one or more processors configured to execute the adaptation methodology described herein. In some implementations, an external processing entity (e.g., a cloud service, computer station and/or cluster) may be utilized in order to perform computations during training of the robot (e.g., operations of methods 800, 820, 840, 900, 920).

Robotic training and control methodology described herein may advantageously enable execution of complex tasks by a robotic device. In some implementations, training of the robot may be based on a collaborative training approach wherein the robot and the user collaborate on performing a task, e.g., as described in detail in co-owned U.S. patent application Ser. No. 13/953,595 entitled "APPARATUS AND METHODS FOR CONTROLLING OF ROBOTIC DEVICES", filed Jul. 29, 2013, incorporated supra. Initially, a user may guide (demonstrate) to a robot the target task.

In one or more implementations of adaptive controllers, the arbitration approach described herein, may advantageously accelerate learning, improve generalization of controller actions to new context(s), and/or offer ability to prioritize actions. For example a new context may comprise a particular combination of visible target and obstacle locations that had not been previously observed/learned by the controller. The proposed arbitrator mechanism may allow the robot to function and "generalize" in conditions wherein the appropriate action for each stimulus had been previously learned separately.

Faster learning may be achieved based on restricting the state-space wherein predictors may be learning input/output associations. The approach described herein may enable arbitration of multiple predicted signals. Reducing training space dimensionality may facilitate the predictor adaptation to new (e.g., previously unobserved) contexts thereby improved prediction generalization.

Generalization may be attained by providing an input to the predictor wherein there exists a previously determined mapping between predictor input/output. In some implementations, such generalization mechanism may be based on a suppression of some of the inputs that may not be germane to execution of a target task. By way of an illustration of obstacle avoidance and/or target approach, when the target task may comprise an obstacle avoidance action, suppressing representation of a target in the sensory input to the obstacle avoidance predictor, may reduce exploration space so as to narrow number of input/output combinations that may be sampled by the obstacle avoidance predictor during learning. By limiting the sensory input to the position of the obstacle, a generalization may be obtained for a variety of position of the target. By way of an illustration of training space restriction, TA/OA tasks may be learned independently from one another by individual predictors (e.g., as described above with respect to FIGS. 3A-5D). When cues (e.g., the target states 1522, 1524 in FIG. 15) for both approach and avoid are present, multiple conflicting predicted outputs may be arbitrated so as to resolve conflicts. In some implementations, the predictors may be configured to receive little or no training in the presence of multiple conflicting outputs.

Arbitration methodology of the present disclosure may alleviate the need for multitask training (e.g., multiple combinations of simultaneous target and object representations) by decoupling individual task training from one another. Eliminating the need for a given predictor to be capable of handling both target and object representations, the predictor architecture may be simplified thereby reducing the overall controller complexity, size and/or cost, and/or increasing overall applicability.

In some implementations, control by the arbitrator of feedback into the predictor may enable filtering out of irrelevant (e.g., not target) state indication from input into the predictor thereby enabling faster learning and/or generalization of predictor learning.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A processor-implemented method of learning arbitration for two physical tasks by a controller of a robot, the method being performed by one or more processors configured to execute computer program modules, the method comprising:
   during a given training trial of a plurality of trials:
      receiving a control signal configured to indicate a simultaneous execution of two physical tasks by the robot;
      selecting one of the two physical tasks;
      evaluating an error measure determined based on a target physical task and an execution of the selected one of the two physical tasks by the robot, the two physical tasks comprising a first physical task and a second physical task;
      based on the error measure being within a target range from a previous error measure obtained during a previous training trial of the plurality of trials and prior to the given training trial, receiving a reinforcement signal comprising information associated with the target physical task, and associating the target physical task to the selected one of the two physical tasks; and
   during a subsequent training trial of a plurality of trials:
      based on the reinforcement signal, determining an association between a sensory context and the target physical task, and when the association is determined, executing the target physical task via the robot based on (1) an occurrence of the sensory context after the given training trial during the subsequent training trial of the plurality of trials, and (2) an absence of receiving the reinforcement signal during the subsequent training trial.

2. The method of claim 1, wherein:
   execution of the first task is based on a first predicted control signal and execution of the second task is based on a second predicted control signal, the first predicted control signal and the second predicted control signal being determined based on the sensory context;
   the execution of the first task obtains a first outcome;
   the execution of the second task obtains a second outcome that is distinct from the first outcome; and
   the first predicted control signal and the second predicted control signal are both configured to activate a same controllable resource of the robot such that the executions of the first and second task are mutually exclusive.

3. The method of claim 2, wherein:
   the association between the sensory context and the target task comprises a basis for selecting the target task from the two tasks, the selecting the target task being based on a learning process characterized by a competition between (i) a first process associated with the first predicted control signal, and (ii) a second process associated with the second predicted control signal;
   a first selection of the first task as the target task is configured to oppose a second selection of the second task as the target task; and
   the reinforcement signal is configured to increase the competition.

4. The method of claim 3, wherein:
   the opposition is configured based on a selectivity range; and
   the target task corresponds to the one of the two tasks based on (i) one of the first and the second predicted control signals being within the selectivity range; and (ii) an other of the first and the second predicted control signals being outside the selectivity range.

5. The method of claim 4, wherein:
   the first and the second predicted control signals are each characterized by one or more of a signal time of occurrence, a signal magnitude, a signal frequency, or a signal phase;
   the selectivity range corresponds to a range of values of one or more of the signal time of occurrence, the signal magnitude, the signal frequency, or the signal phase being evaluated as a part of the determining the association; and
   the method further comprises increasing the opposition based on a reduction of the selectivity range.

6. The method of claim 4, wherein the increasing the opposition results in the first selection of the first task of the two tasks based on one or more of: (i) the first predicted control signal occurring prior to the second predicted control signal, and (ii) the first predicted control signal having a greater magnitude relative to the second predicted control signal.

7. The method of claim 3, wherein:
   the learning process comprises a reinforcement learning process configured to generate the reinforcement signal based on a comparison of the first task, the second task, and the target physical task;
   the reinforcement signal is configured to promote the first process relative the second process when the first task corresponds to the target physical task; and
   the reinforcement signal is configured to demote the first process relative the second process when the second task corresponds to the target physical task.

8. The method of claim 7, wherein:
   the two tasks comprise a target approach task and an obstacle avoidance task;
   the target task comprises the obstacle avoidance task; and
   the reinforcement signal is provided based on a collision indication associated with the robot colliding with an obstacle.

9. The method of claim 3, wherein:
   the learning process comprises a supervised learning process; and
   a supervisor signal associated with the supervised learning process is configured to increase a probability of one of the first process or the second process winning the competition over an other one of the first process or the second process responsive to one of the two tasks associated with either the first process or the second process corresponding to the target task.

10. The method of claim 9, wherein:
    for a number of training trials of the plurality of trials, the learning process is configured to cause execution of a task other than the target task; and
    the supervisor signal is configured to enable the selection of the target task from the two tasks during a training trial of the plurality of trials occurring subsequent to a last-performed training trial of the number of training trials.

11. The method of claim 9, wherein:
the first and the second predicted control signals each comprise an output of a predictor module configured based on a reinforcement learning process; and
the reinforcement learning process is configured based on the sensory context and the reinforcement signal configured based on another output of the predictor module determined at another training trial of the plurality of trials occurring prior to the given training trial.

12. The method of claim 9, wherein:
the first and the second predicted control signals each comprise an output of a predictor module operable in accordance with a reinforcement learning process;
the reinforcement learning process is configured based on the sensory context and a reinforcement signal configured based on an output of a combiner module determined at another training trial occurring prior to the given training trial; and
the output of the combiner module is determined based on a combination of (i) another output of the predictor module determined at the another training trial; and (ii) a control input communicating information relating the target task.

13. The method of claim 3, wherein individual control signals are outputs of a controller programmed in advance prior to the given training trial.

14. The method of claim 2, wherein the execution of the first task is based on a combined output configured based on the reinforcement signal and the first predicted control signal, the combined output being characterized by a transform function.

15. The method of claim 14, wherein:
the first predicted control signal is determined based on the plurality of trials, the plurality of trials involving the reinforcement signal;
the reinforcement signal for a given trial is configured based on the combined output from a prior trial; and
an error measure for the given trial is configured based on a difference between a predicted control output and the reinforcement signal.

16. The method of claim 14, wherein the execution of the second task is based on another combined output configured based on the reinforcement signal and the second predicted control signal, the another combined output being configured based on the transform function.

17. The method of claim 14, wherein the transform function comprises an overriding transformation configured such that for a non-zero teaching signal the combined output is configured regardless of the first predicted control signal.

18. The method of claim 14, wherein the transform function comprises an additive transformation configured such that the combined output comprises a linear combination of the reinforcement signal and the first predicted control signal.

19. The method of claim 14, further comprising:
based on the error measure, withdrawing the reinforcement signal from the combined output to produce the first predicted control signal; and
providing the first predicted control output to the robot, the first predicted control output being capable of causing the execution of the first task by the robot;
wherein the error measure for the given trial is configured based on a difference between the first predicted control output from the previous training trial and the reinforcement signal.

20. A computerized system for learning task arbitration by a robot, the system comprising:
an interface configured to detect a reinforcement signal;
a processing component; and
a non-transitory memory configured to store a plurality of computer instructions that when executed by the processing component, are configured to cause the computerized system to:
during a given training trial of a plurality of training trials:
receive a control signal configured to indicate a simultaneous execution of two physical tasks by the robot;
select one task of the two physical tasks based on a selection signal associated with the selected one task;
determine an error measure based on a target physical task and an execution of the selected one task of the two physical tasks by the robot, the two physical tasks comprising a first physical task and a second physical task;
based on the error measure being within a desired range from a previous error measure obtained during another training trial of the plurality of training trials and prior to the given training trial, evaluate the reinforcement signal comprising information associated with the target physical task, the target physical task being associated with one of the two physical tasks; and
responsive to the evaluation of the reinforcement signal, determine an association between a sensory context and the target physical task, and execute the target physical task via the robot based on (1) an occurrence of the sensory context after the given training trial during a subsequent training trial of the plurality of training trials, (2) an absence of a receipt of the reinforcement signal during the subsequent training trial, and (3) the determined association.

* * * * *